United States Patent
Stayton et al.

(10) Patent No.: US 10,543,828 B2
(45) Date of Patent: Jan. 28, 2020

(54) STRUCTURED MULTIVARIATE CONTEXTUAL VEHICLE OPERATION WITH INTEGRATED SEMIOTIC CONTROL

(71) Applicant: Nissan North America, Inc., Franklin, TN (US)

(72) Inventors: Erik Stayton, Cambridge, MA (US); Jingyi Zhang, San Jose, CA (US); Melissa Cefkin, San Jose, CA (US); Erik Vinkhuyzen, Morgan Hill, CA (US)

(73) Assignee: Nissan North America, Inc., Franklin, TN (US)

( * ) Notice: Subject to any disclaimer, the term of this patent is extended or adjusted under 35 U.S.C. 154(b) by 211 days.

(21) Appl. No.: 15/621,862

(22) Filed: Jun. 13, 2017

(65) Prior Publication Data

US 2018/0354489 A1    Dec. 13, 2018

(51) Int. Cl.
*B60W 10/20*    (2006.01)
*B60W 30/09*    (2012.01)
(Continued)

(52) U.S. Cl.
CPC ............ *B60W 10/20* (2013.01); *B60W 30/09* (2013.01); *B60W 30/10* (2013.01); *G05D 1/0061* (2013.01);
(Continued)

(58) Field of Classification Search
CPC ............... E05F 15/73; E05F 2015/767; E05F 2015/763; G06K 9/00791; G06T 7/11;
(Continued)

(56) References Cited

U.S. PATENT DOCUMENTS

| 7,095,218 B2 | 8/2006 | Kobayashi |
| 8,954,252 B1 | 2/2015 | Urmson et al. |

(Continued)

OTHER PUBLICATIONS

U.S. Appl. No. 15/357,736, filed Nov. 21, 2016.
(Continued)

*Primary Examiner* — Rodney A Butler
(74) *Attorney, Agent, or Firm* — Young Basile Hanlon & MacFarlane, P.C.

(57) ABSTRACT

Structured multivariate contextual vehicle operation with integrated semiotic control may include identifying operational environment information representing a current operational environment for the vehicle, identifying a vehicle control action for controlling the vehicle to traverse a portion of a vehicle transportation network, identifying vehicle control modification information in response to the operational environment information, identifying vehicle control information in response to the vehicle control modification information and the vehicle control action, and controlling the vehicle to traverse a portion of a vehicle transportation network in accordance with the vehicle control information by controlling the vehicle to traverse the portion of the vehicle transportation network in accordance with the vehicle control information such that controlling the vehicle to traverse the portion of the vehicle transportation network in accordance with the vehicle control information includes controlling the vehicle to output a semiotic representation of the vehicle control information.

20 Claims, 16 Drawing Sheets

(51) Int. Cl.
    *B60W 30/10*    (2006.01)
    *G05D 1/00*    (2006.01)
    *G05D 1/02*    (2006.01)

(52) U.S. Cl.
    CPC ......... *G05D 1/0231* (2013.01); *G05D 1/0278* (2013.01)

(58) Field of Classification Search
    CPC ........ G06T 2207/30252; G05D 1/0246; G05D 1/0061; G05D 1/0231; G05D 1/0278; B60W 10/20; B60W 30/09; B60W 30/10
    See application file for complete search history.

(56) References Cited

U.S. PATENT DOCUMENTS

| | | | |
|---|---|---|---|
| 9,475,422 B2 | 10/2016 | Hillis et al. | |
| 9,612,123 B1* | 4/2017 | Levinson | G01C 21/32 |
| 2007/0239314 A1* | 10/2007 | Kuvich | G06K 9/4628 |
| | | | 700/245 |
| 2016/0144867 A1 | 5/2016 | Delp et al. | |
| 2017/0088035 A1 | 3/2017 | Williams et al. | |
| 2017/0088039 A1 | 3/2017 | Williams et al. | |
| 2017/0088040 A1 | 3/2017 | Williams et al. | |
| 2017/0124476 A1* | 5/2017 | Levinson | G05D 1/0088 |
| 2018/0336421 A1* | 11/2018 | Huang | G06K 9/00791 |
| 2019/0144005 A1* | 5/2019 | Lepczyk | B60W 50/0097 |

OTHER PUBLICATIONS

U.S. Appl. No. 15/253,565, filed Aug. 31, 2016.

Nissan IDS Concept: Nissan's vision for the future of EVs and autonomous driving, http://nissannews.com/en-US/nissan/usa/releases/nissan-ids-concept-nissan-s-vision-for-the-future-of-evs-and-autonomous-driving, 2015.

CES 2015: The 'amazing' autonomous Mercedes, http://robohub.org/ces-2015-the-amazing-autonomous-mercedes/, Jan. 12, 2015.

Mercedes-Benz F 015 self-driving car in-depth: AI & lasers, http://www.slashgear.com/mercedes-benz-f-015-self-driving-car-in-depth-ai-lasers-05362237/, Jan. 5, 2015.

Google's self-driving cars could come with gesture-based controls, pedestrian notifications, http://venturebeat.com/2015/03/03/googles-self-driving-cars-could-come-with-gesture-based-controls-pedestrian-notifications/, Mar. 3, 2015.

How Do You Know an Autonomous Vehicle Has Seen You?, http://www.technologyreview.com/view/427743/how-do-you-know-an-autonomous-vehicle-has-seen-you/, Apr. 26, 2012.

Pennycooke, Nicholas, Aevita: Disigning Biomimetic Vehicle-to-Pedestrian Communication Protocols for Autonomously Operating & Parking On-Road Electric Vehicles, Submitted to the Program in Media Arts and Sciences, School of Architecture and Planning, at the Massachusetts Institute of Technology, Sep. 2012, pp. 1-184.

Honda tech warns drivers of pedestrian presence, http://www.cnet.com/news/honda-tech-warns-drivers-of-pedestrian-presence/, Aug. 28, 2013.

Smiling Self-Driving Car is for Pedestrian Safety, http://www.hybridcars.com/smiling-self-driving-car-is-for-pedestrian-safety/, Sep. 19, 2016.

Will Self-Driving Cars Have Road Rage?, http://www.citylab.com/tech/2014/05/will-self-driving-cars-have-road-rage/371709/, May 30, 2014.

* cited by examiner

STRUCTURED MULTIVARIATE CONTEXTUAL VEHICLE OPERATION WITH INTEGRATED SEMIOTIC CONTROL

TECHNICAL FIELD

This disclosure relates to vehicle operational management and driving, including autonomous vehicle operational management and autonomous driving.

BACKGROUND

A vehicle, such as an autonomous vehicle, may traverse a portion of a vehicle transportation network. Traversing the vehicle transportation network, or a portion thereof, may include generating or capturing, such as by a sensor of the vehicle, data, such as data representing an operational environment, or a portion thereof, of the vehicle. Accordingly, a system, method, and apparatus for structured multivariate contextual vehicle operation with integrated semiotic control may be advantageous.

SUMMARY

Disclosed herein are aspects, features, elements, implementations, and embodiments of structured multivariate contextual vehicle operation with integrated semiotic control.

An aspect of the disclosed embodiments is an autonomous vehicle for use in traversing a vehicle transportation network, wherein traversing the vehicle transportation network includes structured multivariate contextual vehicle operation with integrated semiotic control. The autonomous vehicle includes a processor configured to execute instructions stored on a non-transitory computer readable medium to identify operational environment information representing a current operational environment for the autonomous vehicle, such that the operational environment information includes empirical information representing an empirical aspect of the current operational environment, vehicle transportation network information representing a defined aspect of the vehicle transportation network in the current operational environment, external object information representing an external object in the current operational environment, external activity information representing an external activity for the current operational environment, and user-defined configuration information. The processor configured to execute instructions stored on the non-transitory computer readable medium to identify a vehicle control action for controlling the autonomous vehicle to traverse a portion of a vehicle transportation network, wherein the current operational environment for the autonomous vehicle includes the portion of the vehicle transportation network, and wherein identifying the vehicle control action includes identifying a primary vehicle control basis corresponding to the vehicle control action, identify vehicle control modification information in response to the operational environment information, identify vehicle control information in response to the vehicle control modification information and the vehicle control action, and control the autonomous vehicle to traverse a portion of a vehicle transportation network in accordance with the vehicle control information by controlling the autonomous vehicle to traverse the portion of the vehicle transportation network in accordance with the vehicle control information such that controlling the autonomous vehicle to traverse the portion of the vehicle transportation network in accordance with the vehicle control information includes controlling the autonomous vehicle to output a semiotic representation of the vehicle control information such that the semiotic representation of the vehicle control information includes a semiotic representation of an operational state of the autonomous vehicle concurrent with traversing the portion of the vehicle transportation network in accordance with the vehicle control information and a semiotic representation of the primary vehicle control basis.

Another aspect of the disclosed embodiments is a vehicle for use in traversing a vehicle transportation network, wherein traversing the vehicle transportation network includes structured multivariate contextual vehicle operation with integrated semiotic control. The vehicle includes a processor configured to execute instructions stored on a non-transitory computer readable medium to identify operational environment information representing a current operational environment for the vehicle, such that the operational environment information includes information representing an identified aspect of the current operational environment, identify a vehicle control action for controlling the vehicle to traverse a portion of a vehicle transportation network, wherein the current operational environment for the vehicle includes the portion of the vehicle transportation network, identify vehicle control modification information in response to the information representing the identified aspect of the current operational environment, identify vehicle control information in response to the vehicle control modification information and the vehicle control action, and control the vehicle to traverse a portion of a vehicle transportation network in accordance with the vehicle control information by controlling the vehicle to traverse the portion of the vehicle transportation network in accordance with the vehicle control information such that controlling the vehicle to traverse the portion of the vehicle transportation network in accordance with the vehicle control information includes controlling the vehicle to output a semiotic representation of the vehicle control information.

Another aspect of the disclosed embodiments is a vehicle for use in traversing a vehicle transportation network, wherein traversing the vehicle transportation network includes structured multivariate contextual vehicle operation with integrated semiotic control. The vehicle includes a processor configured to execute instructions stored on a non-transitory computer readable medium to identify operational environment information representing a current operational environment for the autonomous vehicle, such that the operational environment information includes information representing an identified aspect of the current operational environment, identify a vehicle control action for controlling the autonomous vehicle to traverse a portion of a vehicle transportation network, wherein the current operational environment for the autonomous vehicle includes the portion of the vehicle transportation network, and wherein identifying the vehicle control action includes identifying a primary vehicle control basis corresponding to the vehicle control action, and identify vehicle control modification information in response to the operational environment information. The processor configured to execute instructions stored on the non-transitory computer readable medium to identify vehicle control modification information in response to the operational environment information by identifying defined vehicle control information such that the defined vehicle control information is independent of the current operational environment, and identifying the vehicle control information such that the vehicle control information includes a combination of the defined vehicle control information and the vehicle control modification information. The processor configured to execute instructions stored on the non-transitory computer readable medium to identify vehicle control information in response to the vehicle control modification information and the vehicle control action, and control the autonomous vehicle to traverse a portion of a vehicle transportation network in accordance with the vehicle control information by controlling the autonomous vehicle to traverse the portion of the vehicle transportation network in accordance with the vehicle control information such that controlling the autonomous vehicle to traverse the portion of the vehicle transportation network in accordance with the vehicle control information includes controlling the autonomous vehicle to output a semiotic representation of the vehicle control information such that the semiotic representation of the vehicle control information includes a semiotic representation of an operational state of the autonomous vehicle concurrent with traversing the portion of the vehicle transportation network in accordance with the vehicle control information and a semiotic representation of the primary vehicle control basis.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A vehicle, such as an autonomous vehicle, or a semi-autonomous vehicle, may traverse a portion of a vehicle transportation network, which may include one or more external objects, such as pedestrians, remote vehicles, other objects within the vehicle operational environment of the vehicle. Efficiently traversing the vehicle transportation network may include effectively providing information describing the current and imminent operations of the vehicle to the pedestrians, remote vehicles, and other relevant external objects, within the operational environment of the vehicle. Mechanisms for providing information describing the current and imminent operations of the vehicle to the pedestrians, remote vehicles, and other relevant external objects, within the operational environment of the vehicle may be limited.

Structured multivariate contextual vehicle operation with integrated semiotic control may include identifying various aspects of the current operational environment of the vehicle, such as the presence of external objects, identifying information regarding current or imminent operations of the vehicle, determining various parameters for outputting a semiotic representation of the current or imminent operations of the vehicle to the pedestrians, remote vehicles, and other relevant external objects, within the operational environment of the vehicle, and outputting the semiotic representation of the current or imminent operations of the vehicle, which may improve the safety and efficiency of vehicle operation. For example, the pedestrians, remote vehicles, and other relevant external objects, within the operational environment of the vehicle may use the information indicated by the semiotic representation to identify an expected path, a current operational state, an imminent operational state, or a combination thereof, for the vehicle.

Outputting the semiotic representation of the current or imminent operations of the vehicle may include controlling one or more modalities for outputting the semiotic representation of the current or imminent operations of the vehicle, which may include controlling the motion of the vehicle to output the semiotic representation of the current or imminent operations of the vehicle or a portion thereof.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

Figure 1:
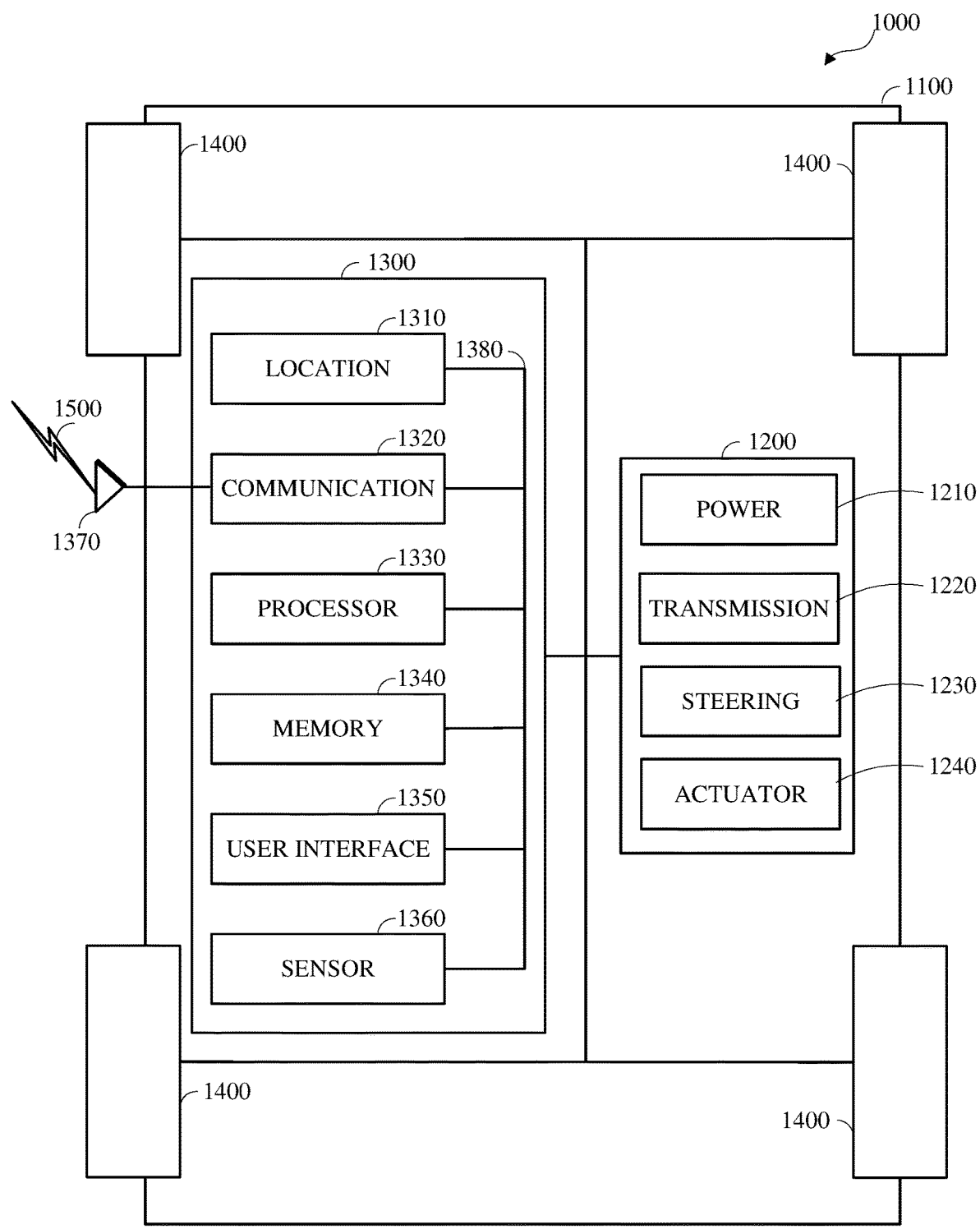
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 1000 includes a chassis 1100, a powertrain 1200, a controller 1300, wheels 1400, and may include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

The controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. The communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensors 1360 may include sensors that are operable to obtain information regarding the physical environment surrounding the vehicle 1000. For example, one or more sensors may detect road geometry and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. The trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle. An autonomous vehicle may be controlled autonomously, without direct human intervention, to traverse a portion of a vehicle transportation network. Although not shown separately in FIG. 1, in some implementations, an autonomous vehicle may include an autonomous vehicle control unit, which may perform autonomous vehicle routing, navigation, and control. In some implementations, the autonomous vehicle control unit may be integrated with another unit of the vehicle. For example, the controller 1300 may include the autonomous vehicle control unit.

In some implementations, the autonomous vehicle control unit may control or operate the vehicle 1000 to traverse the vehicle transportation network, or a portion thereof, in accordance with current vehicle operation parameters. In another example, the autonomous vehicle control unit may control or operate the vehicle 1000 to perform a defined operation or maneuver, such as parking the vehicle. In another example, autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to a trajectory controller that may operate the vehicle 1000 to travel from the origin to the destination using the generated route.

Figure 2:
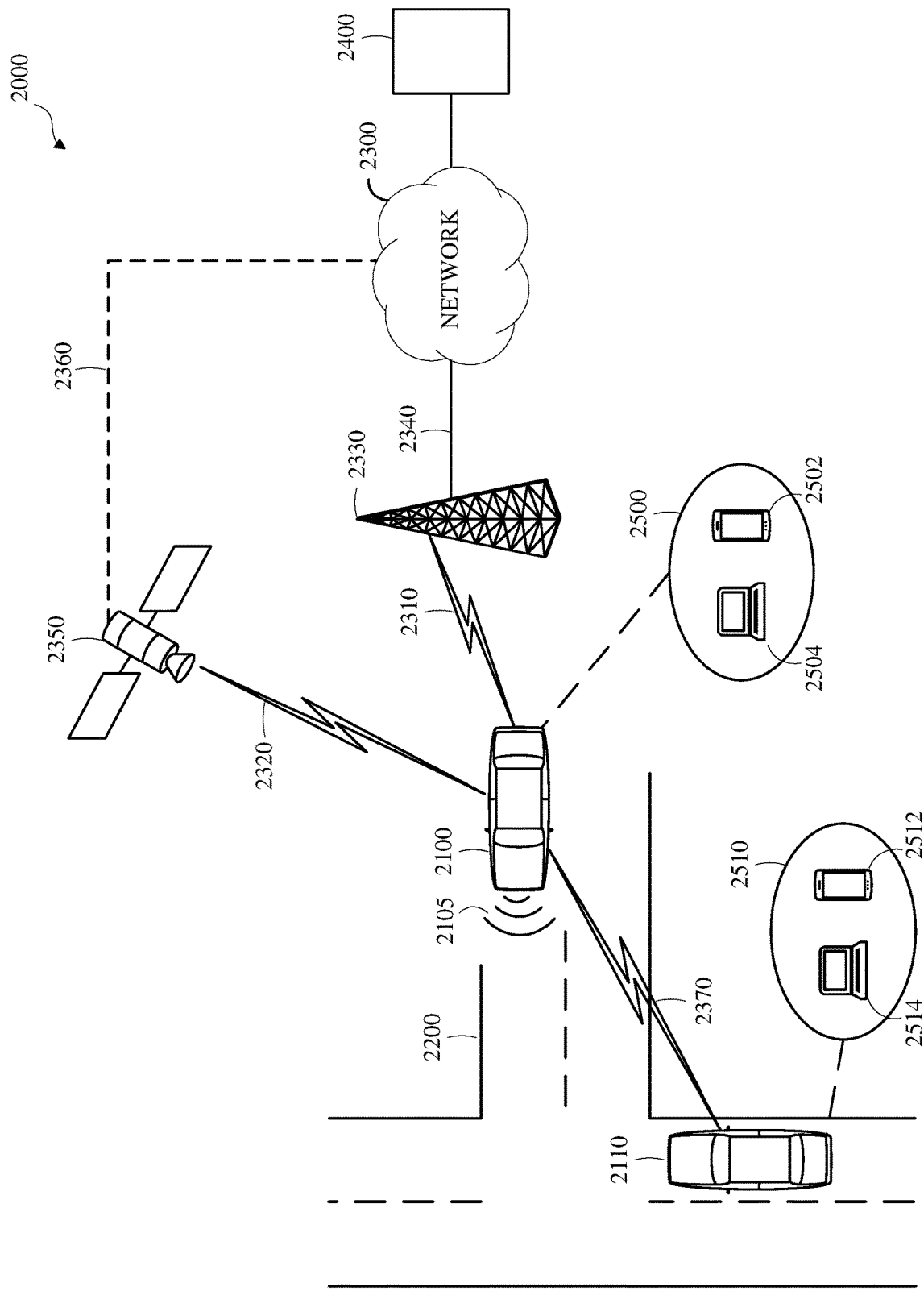
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

A vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

The vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit, an electronic communication network may include any number of interconnected elements.

A vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

A vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

A vehicle 2100/2210 may be associated with an entity 2500/2510, such as a driver, operator, or owner of the vehicle. An entity 2500/2510 associated with a vehicle 2100/2110 may be associated with one or more personal electronic devices 2502/2504/2512/2514, such as a smartphone 2502/2512 or a computer 2504/2514. A personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
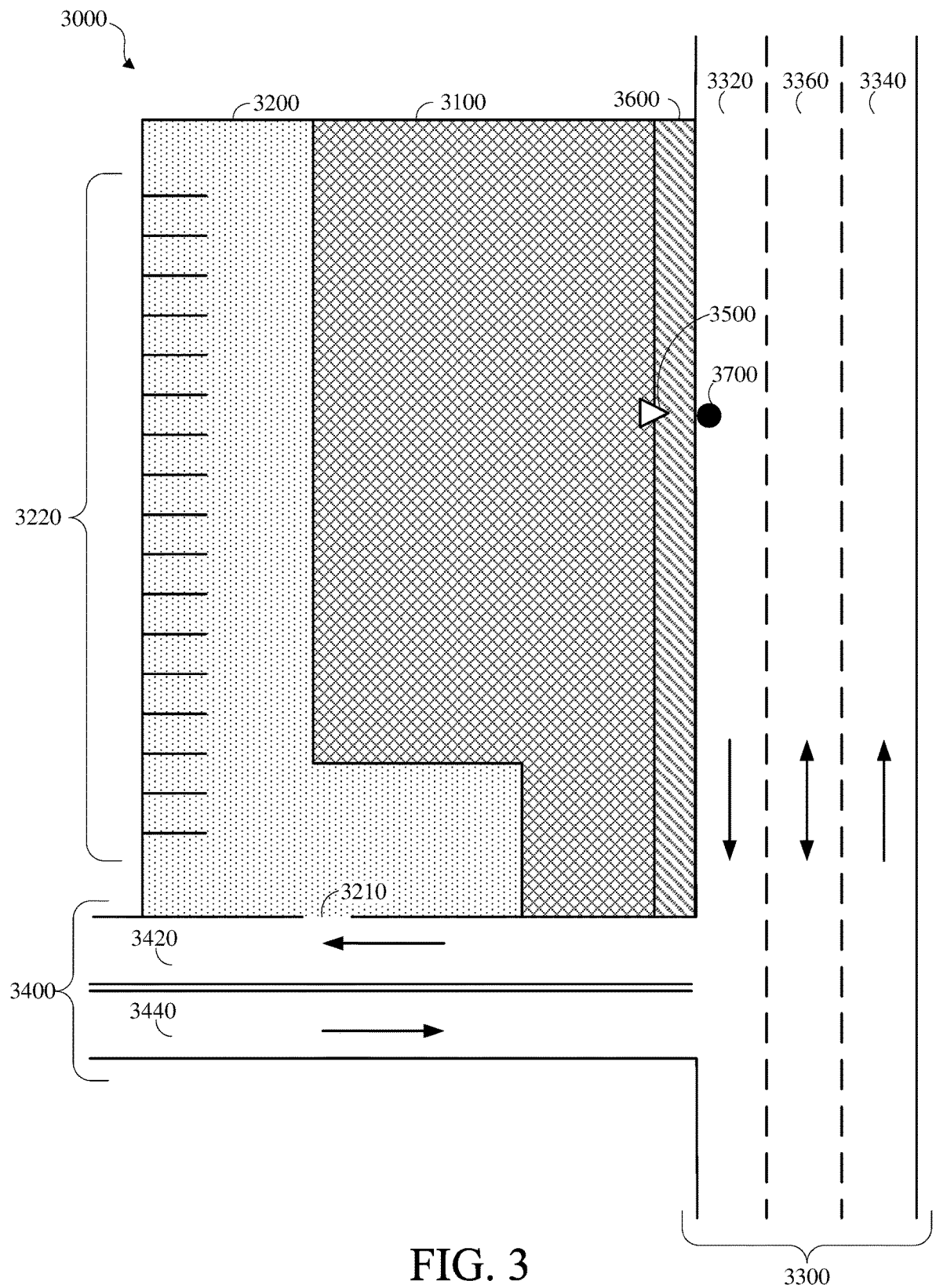
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. An autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information or a combination thereof.

A portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, an autonomous vehicle may identify the point of interest as a destination, and the autonomous vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network information may include defined entrance location information, such as information identifying a geolocation of an entrance associated with a destination. Predicted entrance location information may be determined as described herein.

The vehicle transportation network may be associated with, or may include, a pedestrian transportation network. For example, FIG. 3 includes a portion 3600 of a pedestrian transportation network, which may be a pedestrian walkway. A pedestrian transportation network, or a portion thereof, such as the portion 3600 of the pedestrian transportation network shown in FIG. 3, may be represented as pedestrian transportation network information. The vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network information may include docking location information, such as information identifying a geolocation of one or more docking locations 3700 associated with a destination. The docking location information may be defined docking location information, which may be docking location information manually included in the vehicle transportation network information. For example, defined docking location information may be included in the vehicle transportation network information based on user input. The docking location information may be automatically generated docking location information as described herein. Although not shown separately in FIG. 3, docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

In an example, an autonomous vehicle may identify a point of interest, which may include the unnavigable area 3100, the parking area 3200, and the entrance 3500, as a destination. The autonomous vehicle may identify the unnavigable area 3100, or the entrance 3500, as a primary destination for the point of interest, and may identify the parking area 3200 as a secondary destination. The autonomous vehicle may identify the docking location 3700 as a docking location for the primary destination. The autonomous vehicle may generate a route from an origin (not shown) to the docking location 3700. The autonomous vehicle may traverse the vehicle transportation network from the origin to the docking location 3700 using the route. The autonomous vehicle may stop or park at the docking location 3700 such that passenger loading or unloading may be performed. The autonomous vehicle may generate a subsequent route from the docking location 3700 to the parking area 3200, may traverse the vehicle transportation network from the docking location 3700 to the parking area 3200 using the subsequent route, and may park in the parking area 3200.

Figure 4:
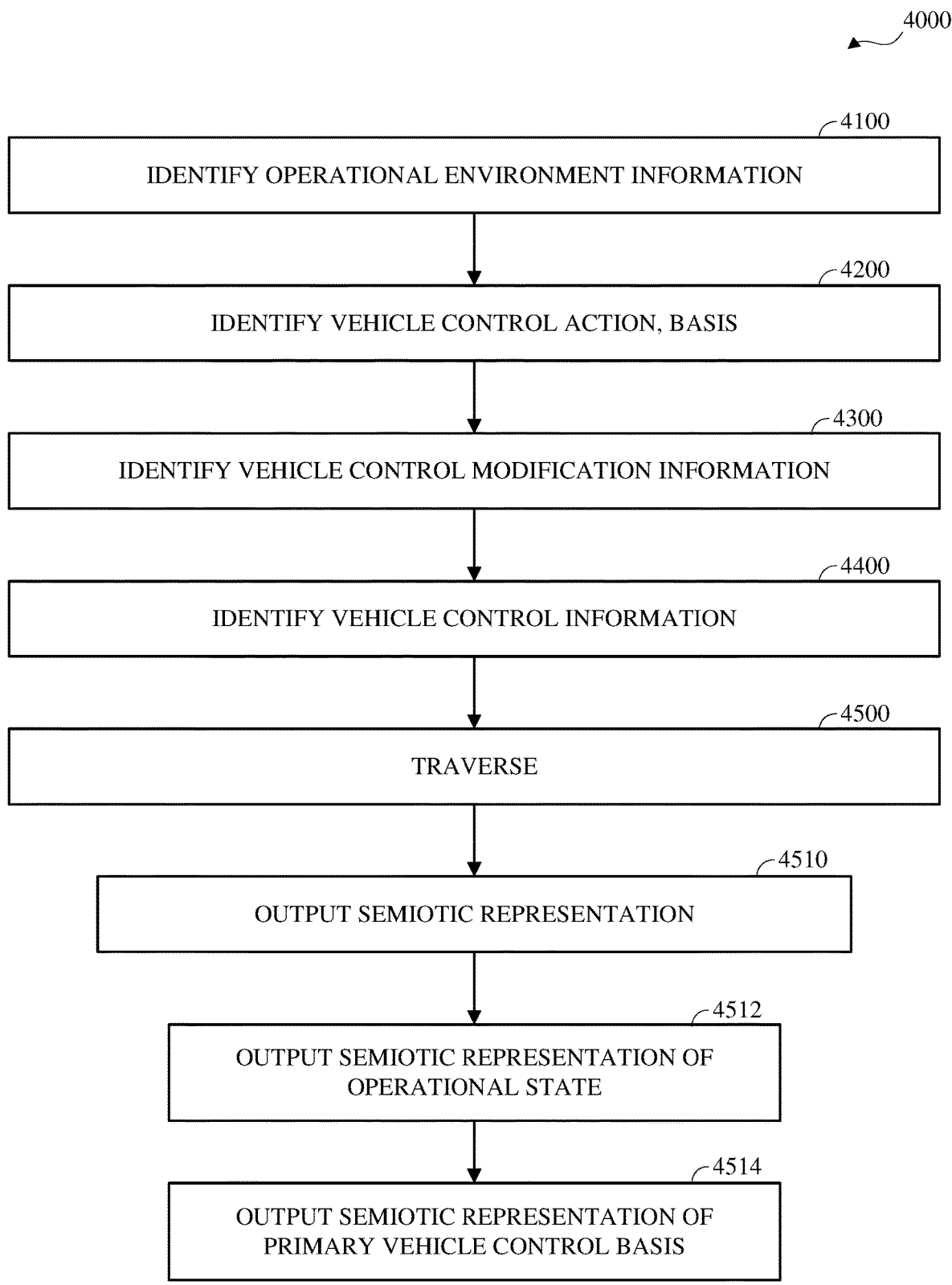
FIG. 4 is a diagram of an example of structured multivariate contextual vehicle operation with integrated semiotic control in accordance with implementations of this disclosure.

FIG. 4 is a diagram of an example of structured multivariate contextual vehicle operation with integrated semiotic control in accordance with implementations of this disclosure. Structured multivariate contextual vehicle operation with integrated semiotic control 4000 may be implemented in a vehicle, such as the vehicle 1000 shown in FIG. 1 or one of the vehicles 2100/2110 shown in FIG. 2, which may be an autonomous vehicle, a semi-autonomous vehicle, or any other vehicle implementing autonomous driving.

A vehicle, such as an autonomous vehicle, may traverse a vehicle transportation network, or a portion thereof, such as the vehicle transportation network portion 3000 shown in FIG. 3, which may include traversing distinct vehicle operational scenarios. A distinct vehicle operational scenario may include any distinctly identifiable set of operative conditions that may affect the operation of the vehicle within a defined spatiotemporal area, or operational environment, of the vehicle, such as within a defined operative distance from a current spatiotemporal location of the vehicle, such as with 1500 meters of a current geospatial location of the vehicle, within 30 seconds of a current temporal location of the vehicle.

For example, a distinct vehicle operational scenario may be based on a number or cardinality of roads, road segments, or lanes that the vehicle may traverse within a defined spatiotemporal distance. In another example, a distinct vehicle operational scenario may be based on one or more traffic control devices that may affect the operation of the vehicle within a defined spatiotemporal area, or operational environment, of the vehicle. In another example, a distinct vehicle operational scenario may be based on one or more identifiable rules, regulations, or laws that may affect the operation of the vehicle within a defined spatiotemporal area, or operational environment, of the vehicle. In another example, a distinct vehicle operational scenario may be based on one or more identifiable external objects that may affect the operation of the vehicle within a defined spatiotemporal area, or operational environment, of the vehicle.

Examples of distinct vehicle operational scenarios include a distinct vehicle operational scenario wherein the vehicle is traversing an intersection; a distinct vehicle operational scenario wherein a pedestrian is crossing, or approaching, the expected path of the vehicle; and a distinct vehicle operational scenario wherein the vehicle is changing lanes. Other distinct vehicle operational scenarios may be used.

Aspects of the operational environment of the vehicle may be represented within respective distinct vehicle operational scenarios. For example, the relative orientation, operational state, trajectory, expected path, or any other information, or combination of information, describing one or more external objects may be represented within respective distinct vehicle operational scenarios. In another example, the relative geometry of the vehicle transportation network may be represented within respective distinct vehicle operational scenarios.

Structured multivariate contextual vehicle operation with integrated semiotic control 4000 may include identifying operational environment information at 4100, identifying a vehicle control action at 4200, identifying vehicle control modification information at 4300, identifying vehicle control information at 4400, controlling the vehicle to traverse the vehicle transportation network, or a portion thereof, at 4500, or a combination thereof.

Operational environment information representing the operational environment of the vehicle may be identified at 4100. Identifying the operational environment information at 4100 may include receiving, identifying, or otherwise accessing, operational environment information representing an operational environment for the vehicle, such as a current operational environment or an expected operational environment, or one or more aspects thereof. The operational environment of the vehicle may include a distinctly identifiable set of operative conditions that may affect the operation of the vehicle within a defined spatiotemporal area of the vehicle. The operational environment information may be identified based on sensor information, information received from an external source, any other data source, or a combination thereof, unless expressly indicated herein, or otherwise unambiguously clear from context.

Identifying the operational environment information may correspond with identifying a distinct vehicle operational scenario. Identifying the operational environment information may include identifying operational environment information according to one or more groups, types, or categories of operational environment information. For example, identifying the operational environment information may include identifying empirical information representing a natural or artificial aspect of the operational environment, identifying vehicle transportation network information representing a defined aspect of the vehicle transportation network in the operational environment, identifying external object information representing an external object in the current operational environment, identifying external activity information representing an external activity for the current operational environment, or identifying vehicle information, which may include vehicle configuration information, such as user configuration information. Other categories, or categorizations, of information representing the operational environment of the vehicle may be used.

For simplicity and clarity, elements of the operational environment information may be described herein using determinative or relativistic terminology. For example, empirical information may be described herein as indicating that weather conditions are dry. However, the values of the operational environment information may be Boolean values, such as a Boolean value indicating that a corresponding metric for a respective aspect of the operational environment exceeds a defined corresponding threshold or varies from a defined corresponding range, or numeric values, such as a value indicating a defined category for the respective aspect of the operational environment or a value indicating a measurement or a level for respective aspect of the operational environment. Identifying the operational environment information may include evaluating, processing, or otherwise determining a correspondence between, for example, a measurement for a respective aspect of the operational environment and a corresponding Boolean value, such as by determining whether a measurement exceeds a defined threshold.

The empirical information may represent a natural or artificial aspect or state of the operational environment that may be identified, determined, predicted, or derived based on sensor information generated by a sensor of the vehicle, such as a temporal aspect, an illumination aspect of the operational environment, a weather related aspect of the operational environment, a road surface condition of the operational environment, or any other natural or artificial condition that may affect the operation of the vehicle within the operational environment. The empirical information may be determined based on a combination of sensor information and other information.

For example, a sensor of the vehicle may be an ambient light sensor and identifying the empirical information may include identifying the empirical information in response to ambient light level information determined by the ambient light sensor. In some embodiments, the ambient light level may exceed a defined daylight threshold, and the empirical information may indicate a day, or daylight, condition of the operational environment. In some embodiments, the ambient light level may be within, such as equal to or less than, a defined daylight threshold and the empirical information may indicate a night, or dark, condition of the operational environment.

In some embodiments, some empirical information may be unavailable and defined or expected empirical information may be used. For example, current weather information may be unavailable, and a defined expected value, such as clear or dry, may be used as the empirical weather information.

The vehicle transportation network information may represent a defined aspect of the vehicle transportation network in the operational environment. The vehicle transportation network information may include information representing the vehicle transportation network proximate to the vehicle, such as within a defined spatial distance of the vehicle, such as 1500 meters, which may include information indicating the geometry of one or more aspects of the vehicle transportation network, information indicating a condition, such as a surface condition, of the vehicle transportation network, or any combination thereof. For example, the vehicle transportation network information identified at 4100 may be similar to the vehicle transportation network information described in relation to FIG. 3.

The vehicle transportation network information may indicate a roadway size, configuration, or geometry, a speed constraint or other vehicle transportation network access or use regulation or standard, an intersection type, a traffic control device, a geographical area type, such as residential or commercial, road or surface material, zoning, weather information received from an external source, or any other defined information regarding the vehicle transportation network that may affect the operation of the vehicle within the operational environment.

The vehicle transportation network information may indicate that the operational environment includes, or is within a defined proximity of, a defined location, such as a school, a hospital, a bar, a museum, a park, a railway, a railway station, or a defined location type, such as a residential area or neighborhood, an urban area, a commercial area, a rural area, an industrial area, a highway area, or any other defined location or location type that may affect the operation of the vehicle within the operational environment.

In another example, the vehicle transportation network information may include received defined information, such as weather information received from an external source, which may indicate a weather condition of the operational environment, such as rain, snow, fog, or any other weather condition, or combination of conditions, that may affect the operation of the vehicle within the operational environment. For example, the vehicle transportation network information may indicate that a probability of an icy road condition exceeds a defined threshold. In another example, the vehicle transportation network information may indicate an amount of rain, or a rate of rainfall, or any other information about the vehicle transportation network that may affect the operation of the vehicle within the operational environment.

In some embodiments, some vehicle transportation network information, such as vehicle transportation network information based on stored vehicle transportation network information, may be unavailable and defined or expected vehicle transportation network information may be used. For example, vehicle transportation network information indicating a number of lanes for a current portion of the vehicle transportation network may be unavailable, and a defined expected value one lane may be used as the vehicle transportation network information. In some embodiments, vehicle transportation network information may be generated based on sensor information.

The external object information may represent an external object in the current operational environment. For example, the external object information may represent external objects within the operational environment of the vehicle, such as road users, pedestrians, non-human animals, non-motorized devices, such as bicycles or skateboards, motorized devices, such as remote vehicles, or any other external object, obstacle, entity, or combination thereof, that may affect the operation of the vehicle within the operational environment. External objects may be identified based on, for example, defined information, such as information received from a remote vehicle, or based on sensor data reported by a sensor of the vehicle.

A relevant external object may be an external object oriented with respect to the vehicle such that traversal of a portion of the current operational environment by the external object, or any other operation of the external object that may affect the traversal of any object, which may include the current vehicle, within the current operational environment may be affected by controlling the vehicle to traverse a portion of the vehicle transportation network in accordance with the vehicle control information such that controlling the vehicle to traverse a portion of the vehicle transportation network in accordance with the vehicle control information includes outputting the semiotic representation of the vehicle control information.

The external object information may include aggregate information, such as information indicating a number, count, or cardinality of external objects within the operational environment, or may indicate an external object state for the operational environment, such as crowded or deserted. The external object information may include, for a respective external object, location information, kinetic, velocity, or motion, or imminent or expected kinetic, velocity, or motion, information, expected path information, information indicating whether the external object is a blocking object, which may prevent the vehicle or another external object from traversing a current or expected location of the blocking external object, a non-blocking object, which may prevent the vehicle from traversing and may allow some or all other external objects to traverse the current or expected location of the non-blocking external object, or any other information regarding the external object that may affect the operation of the vehicle within the operational environment.

In some embodiments, some external object information, such as external object information based on sensor information or external object information based on received information, may be unavailable and defined or expected external object information may be used. For example, sensor information indicating external objects may be unavailable, and a defined expected value indicating the absence of external objects may be used as the external object information.

The external activity information may represent an external activity or event, or an imminent or expected external activity or event, for the current operational environment. The external activity information may be independent of individual external objects or may be identified independently of identifying the external objects. The external activity information may be identified based on received activity information, such as information identified based on social media data, which may include aggregate social media data, such as data indicating an aggregate number, count, or cardinality, of social media postings geographically and temporally proximate to the operational environment, or associated with a defined use of an area geographically and temporally proximate to the operational environment. For example, the external activity information may indicate that an event, such as a sporting event, a concert, a rally, a parade, or the like, is spatially and temporally proximate to the operational environment, or that other social activity, such as high human activity density, or any other activity or event that may affect the operation of the vehicle within the operational environment.

The external activity information may indicate an eventful state, which may indicate an external activity or event, or an imminent or expected external activity or event, geographically and temporally proximate to the operational environment. The external activity information may indicate an uneventful state, which may indicate an absence of any identified external activity or event, or imminent or expected external activity or event, geographically and temporally proximate to the operational environment. In some embodiments, the external activity information may include information indicating other aspects of the external activity, such as an activity type, an activity size, or the like.

In some embodiments, some external activity information, such as external activity information based on sensor information or external activity information based on received information, may be unavailable and defined or expected external activity information may be used. For example, received information indicating external activities may be unavailable, and a defined expected value indicating the absence of external activities may be used as the external activity information.

The user configuration information may include, for example, information indicating a vehicle control optimization priority for one or more users of the vehicle. The user configuration information may be user defined, such as information identified or stored in response to user input indicating the user configuration. The user configuration information may be automatically identified configuration information, such as information identified based on use patterns.

For example, a low vehicle control optimization priority may indicate a user preference for slower acceleration rates, longer lead times, longer signaling times, and the like, and a high vehicle control optimization priority may indicate a user preference for minimizing driving times, such as by minimizing lead times, minimizing signaling times, and increasing acceleration and deceleration rates.

In some embodiments, the user configuration information may include information corresponding to defined aspects of vehicle operation, such as information corresponding to respective vehicle control actions, vehicle operational scenarios, or combinations thereof.

In some embodiments, some user configuration information, such as user configuration information based on user input or automatically generated user configuration information, may be unavailable and defined or expected user configuration information may be used. For example, user input information indicating a user configuration may be unavailable, and a defined expected value for the user configuration may be used as the user configuration information.

The operational environment information may include vehicle state information for the vehicle, such as information indicating a geospatial location of the vehicle, information correlating the geospatial location of the vehicle to the vehicle transportation network information, a route of the vehicle, a velocity of the vehicle, an acceleration state of the vehicle, other vehicle directional, motion, or kinetic state information, passenger information of the vehicle, or any other information about the vehicle or the operation of the vehicle.

In some embodiments, identifying the operational environment information representing the operational environment of the vehicle at 4100 may include monitoring the operational environment of the vehicle, or defined aspects thereof, or receiving operational environment information from another system, device, or unit of the vehicle monitoring the operational environment of the vehicle, such as an operational environment monitor of the vehicle.

Monitoring the operational environment of the vehicle may include identifying and tracking one or more aspects or states of the operational environment, such as external objects, identifying distinct vehicle operational scenarios, or a combination thereof. Identifying and tracking the external objects may include identifying spatiotemporal locations of respective external objects, which may be relative to the vehicle, identifying one or more expected paths for respective external objects, which may include identifying a speed, a trajectory, or both, for an external object.

For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

Identifying the operational environment information may include identifying operational environment information according to multiple aspects within a category of operational environment information. For example, identifying the operational environment information may include identifying empirical information representing an illumination state and identifying empirical information representing a precipitation state.

A vehicle control action may be identified at 4200. The vehicle control action may indicate a vehicle control operation or maneuver, such as accelerating, decelerating, turning, stopping, or any other vehicle operation or combination of vehicle operations that may be performed by the vehicle in conjunction with traversing a portion of the vehicle transportation network, such as a current portion of the vehicle transportation network, which may be a portion of the vehicle transportation network within the operational environment of the vehicle.

The vehicle control action may be a non-semiotic vehicle control action. A non-semiotic vehicle control action may be a vehicle control action for traversing the vehicle transportation network, or a portion thereof, or otherwise controlling or operating the vehicle independent of controlling or operating the vehicle to output a corresponding or related semiotic representation.

The vehicle control action may be received from another system, device, or unit of the vehicle, such as a routing and navigation control unit of the vehicle or an autonomous vehicle operational management controller of the vehicle.

For example, the vehicle control action may be a 'Stop' vehicle control action for controlling the vehicle to traverse the vehicle transportation network, or a portion thereof, by controlling an acceleration unit, a braking unit, another velocity control unit, or combination of velocity control units, to stop the vehicle or otherwise control the vehicle to become or remain stationary.

The vehicle control action may be a 'Yield' vehicle control action for controlling the vehicle to traverse the vehicle transportation network, or a portion thereof, by controlling an acceleration unit, a braking unit, another velocity control unit, or combination of velocity control units, to slow the vehicle or otherwise control the vehicle to move at a speed within a defined threshold or range, which may be lower than or within a defined statutory speed limit.

The vehicle control action may be an 'Advance' vehicle control action for controlling the vehicle to traverse the vehicle transportation network, or a portion thereof, by slowly inching forward a short distance, such as a few inches or a foot.

The vehicle control action may be an 'Accelerate' vehicle control action for controlling the vehicle to traverse the vehicle transportation network, or a portion thereof, by accelerating a defined acceleration rate, or at an acceleration rate within a defined range. Although some vehicle control operations, such as acceleration and deceleration, are described herein as having a value or rate for simplicity, the vehicle control operations may be associated with variable values or rates, such as rates along a curve or a sequence of rates.

The vehicle control action may be a 'Decelerate' vehicle control action for controlling the vehicle to traverse the vehicle transportation network, or a portion thereof, by decelerating a defined deceleration rate, or at a deceleration rate within a defined range.

The vehicle control action may be a 'Maintain' vehicle control action for controlling the vehicle to traverse the vehicle transportation network, or a portion thereof, in accordance with current operational parameters, such as by maintaining a current velocity, maintaining a current path or route, maintaining a current lane orientation, or the like.

The vehicle control action may be a 'Proceed' vehicle control action for controlling the vehicle to traverse the vehicle transportation network, or a portion thereof, by beginning or resuming a previously identified set of operational parameters, which may include controlling the vehicle to traverse the vehicle transportation network, or a portion thereof, in accordance with one or more other vehicle control actions. For example, the vehicle may be stationary at an intersection, an identified route for the vehicle may include traversing through the intersection, and controlling the vehicle in accordance with a 'Proceed' vehicle control action may include controlling the vehicle to accelerate at a defined acceleration rate to a defined velocity along the identified path. In another example, the vehicle may be traversing a portion of the vehicle transportation network at a defined speed, rate, or velocity, a lane change may be identified for the vehicle, and controlling the vehicle in accordance with a 'Proceed' vehicle control action may include controlling the vehicle to perform a sequence of trajectory adjustments in accordance with defined lane change parameters such that the vehicle performs the identified lane change operation.

In some embodiments, a vehicle control action may include, or may be associated with, one or more performance parameters. A performance parameter may indicate a value, or a range of values, for controlling one or more operational elements, or operational control elements, of the vehicle, such as to traverse the vehicle transportation network, or a portion thereof. The operational elements of the vehicle may include systems, devices, or units for controlling a velocity of the vehicle, or other kinetic state of the vehicle, a semiotic representation output operational state of the vehicle, or any other operational state, or combination of operational states, of the vehicle that may be autonomously, or semi-autonomously controlled, which may include internal temperature controls, media system controls, window controls, and the like.

For example, a 'Stop' vehicle control action may include, or may be associated with, a performance parameter indicating a deceleration rate. In another example, performance parameters defined for, indicated by, or associated with a 'Proceed' vehicle control action may indicate route or path information, speed information, an acceleration rate, or a combination thereof, or may expressly or implicitly indicate that a current or previously identified path, speed, acceleration rate, or a combination thereof may be maintained.

In some embodiments, a vehicle control action may be a compound vehicle control action, which may include a sequence, a combination, or both of vehicle control actions. For example, an 'Advance' vehicle control action may indicate a 'Stop' vehicle control action, a subsequent 'Accelerate' vehicle control action associated with a defined acceleration rate, and a subsequent 'Stop' vehicle control action associated with a defined deceleration rate, such that controlling the vehicle in accordance with the 'Advance' vehicle control action includes controlling the vehicle to slowly inch forward a short distance, such as a few inches or a foot.

Identifying the vehicle control action at 4200 may include identifying a primary vehicle control basis. For example, the vehicle control action and the primary vehicle control basis may be received from another system, device, or unit of the vehicle, such as a routing and navigation control unit of the vehicle or an autonomous vehicle operational management controller of the vehicle.

The primary vehicle control basis may indicate a basis, reason, or rationale for the vehicle control action. For example, the vehicle control action may be identified based on multiple vehicle control metrics, each vehicle control metric may be associated with a significance value, such as an immanency metric, an urgency metric, a weight, or a combination thereof, and the vehicle control metric, or combination of metrics, having the greatest, or most significant, significance value may be identified as the primary vehicle control basis.

Vehicle control modification information may be identified at 4300. The vehicle control modification information may indicate one or more vehicle control modification parameters, or vehicle control modifiers, for controlling, or modifying the control of, the vehicle to traverse the vehicle transportation network, or a portion thereof, such that traversing the vehicle transportation network, or a portion thereof, includes outputting a semiotic representation of the vehicle control information, which may include controlling the vehicle to become, or remain, stationary, such as for a defined temporal period. For example, a vehicle control modification parameter may be combined with, or may replace, a performance parameter associated with a vehicle control action for controlling the vehicle in accordance with the vehicle control action.

Each vehicle control modifier may correspond with a respective operational element for controlling the vehicle. A value corresponding to a respective vehicle control modifier may be used to control, or to modify the control, of a respective operational element for controlling the vehicle. For example, the vehicle control action identified at 4200 may include, or may be associated with, one or more performance parameters, and the vehicle control modification information identified at 4300 may include one or more vehicle control modifiers for controlling or modifying respective performance parameters.

Identifying the vehicle control modification information at 4300 may include identifying a vehicle control modification table based on the operational environment information representing the operational environment of the vehicle identified at 4100, the vehicle control action identified at 4200, or both.

For example, the operational environment information representing the operational environment of the vehicle identified at 4100 may include empirical information indicating that weather conditions, or road surface conditions, or both, for the operational environment are dry, empirical information indicating that lighting conditions, such as ambient lighting conditions, for the operational environment are dark, vehicle transportation network information indicating that a residential neighborhood or area is geographically and temporally proximate to the operational environment, external object information indicating an absence of external objects in the current operational environment, external activity information indicating an absence of an external activity for the current operational environment, and user configuration information indicating a preference for minimizing driving time, and a vehicle control modification table may be identified based on the combination of operational environment information (dry, dark, residential, deserted, uneventful, high vehicle control optimization priority), as shown in Table 1.

TABLE 1

| Operational Element (parameter) | Value |
| --- | --- |
| Brightness | 60% |
| Flashing Frequency | 1 Hz |
| Scrolling Speed | 5 ft/s |
| Stopped Threshold | 1 mi/hr |
| States To Show | Yielding, Stopped, Acceleration Imminent |
| Lead time to show Acceleration Imminent | 0.1 s |
| Active Mode Indicator | False |
| States to omit when no other road users are detected | Stopped, Acceleration Imminent |
| Display unchanged state when other road user detected | True |

In Table 1, the parameter 'Brightness' has the value '60%' indicating that the light output of one or more illuminated elements of the vehicle, such as head lamps, tail lights, turn signals, or other external luminous presentation units of the vehicle, may be controlled to output light at 60% of maximum output for traversing a vehicle transportation network, or a portion thereof. Other values may be used.

In Table 1, the parameter 'Flashing Frequency' has the value '1 Hz' indicating that the light output of one or more illuminated elements of the vehicle may be periodically modulated at a frequency of 1 Hertz for traversing a vehicle transportation network, or a portion thereof. Other values may be used.

In Table 1, the parameter 'Scrolling Speed' has the value '5 ft/s' indicating that the output of a semiotic representation, or a portion thereof, using an external luminous presentation unit may be scrolled, or otherwise transitioned in a defined direction, at a defined rate of five feet per second for traversing a vehicle transportation network, or a portion thereof. Other values may be used. Other movement or animation of a semiotic representation may be indicated.

The parameter 'Stopped Threshold' has the value '1 mi/hr' indicating a maximum speed of one mile per hour that may be identified as corresponding to a stopped state. Other values may be used.

The parameter 'States To Show' has the value 'Yielding', 'Stopped', 'Acceleration Imminent' indicating vehicle control states for which a semiotic representation may be output for traversing a vehicle transportation network, or a portion thereof. Other values may be used.

The parameter 'Lead time to show Acceleration Imminent' has the value '0.1 s' indicating a lead time, or temporal period, of one tenth of one second for outputting a semiotic representation of an expected or imminent operational maneuver, such as a velocity change for traversing a vehicle transportation network, or a portion thereof, prior to performing the respective operational maneuver. Other values may be used.

The parameter 'Active Mode Indicator' has the value 'False' indicating that traversing a vehicle transportation network, or a portion thereof omits outputting a semiotic representation of an active or current vehicle control mode, such as "Autonomous Driving Mode" and "Active Mode." Other values may be used.

The parameter 'States to omit when no other road users are detected' has the value 'Stopped, Acceleration Imminent' indicating that outputting the semiotic representation for the operational states or vehicle control actions indicated, such as 'Stopped' and 'Acceleration Imminent', may be omitted in response to determining that the operational environment omits relevant external objects for traversing a vehicle transportation network, or a portion thereof. Other values may be used.

The parameter 'Display unchanged state when other road user detected' has the value 'True' indicating that the vehicle may output a semiotic representation of a current operational state in response to determining that the operational environment includes relevant external objects for traversing a vehicle transportation network, or a portion thereof. Other values may be used. For example, the vehicle may omit outputting a semiotic representation of a current operational state in response to a determination that the operational environment omits relevant external objects, and, subsequently, in response to a determination that the operational environment includes relevant external objects, the vehicle may output the semiotic representation of a current operational state.

In another example, the operational environment information representing the operational environment of the vehicle identified at 4100 may include empirical information indicating that weather conditions, or road surface conditions, for the operational environment are dry, empirical information indicating that ambient lighting conditions for the operational environment are bright, vehicle transportation network information indicating that a residential neighborhood or area is geographically and temporally proximate to the operational environment, external object information indicating an absence of external objects in the current operational environment, external activity information indicating an absence of an external activity for the current operational environment, and user configuration information indicating a preference for minimizing driving time, and a vehicle control modification table may be identified based on the combination of operational environment information (dry, day, residential, deserted, uneventful, high vehicle control optimization priority), as shown in Table 2.

TABLE 2

| Operational Element (parameter) | Value |
| --- | --- |
| Brightness | 100% |
| Flashing Frequency | 1 Hz |
| Scrolling Speed | 5 ft/s |
| Stopped Threshold | 1 mi/hr |
| States To Show | Yielding, Stopped, Acceleration Imminent |
| Lead time to show Acceleration Imminent | 0.1 s |
| Active Mode Indicator | False |
| States to omit when no other road users are detected | Stopped, Acceleration Imminent |
| Display unchanged state when other road user detected | True |

Table 1 and Table 2 show examples of Operational Elements (parameters) and corresponding values, however, other Operational Elements (parameters) and other corresponding values may be used.

For example, identifying the vehicle control modification information may include identifying vehicle control modification information for identifying an orientation of the vehicle, or an external object, relative to a portion of the vehicle transportation network, such as an intersection, indicating that the vehicle, or the external object, is currently proceeding through, or is imminently expected to proceed through, the portion of the vehicle transportation network.

In another example, identifying the vehicle control modification information may include identifying vehicle control modification information for identifying whether outputting the semiotic representation may include outputting a portion of the semiotic representation based on a type of an external object, a relative orientation of an external object, or a combination of a type of an external object and a relative orientation of the external object.

In another example, identifying the vehicle control modification information may include identifying vehicle control modification information for identifying distance parameters, velocity parameters, acceleration rate parameters, or other control parameters for traversing a portion of the vehicle transportation network in accordance with an 'Advance' vehicle control action by controlling the vehicle to traverse the vehicle transportation network, or a portion thereof, by slowly inching forward a short distance as indicated by the identified parameters.

In another example, identifying the vehicle control modification information may include identifying vehicle control modification information for identifying a relative lateral orientation of the vehicle with respect to a current lane for outputting a semiotic representation of traversing the vehicle transportation network in accordance with a 'Turn' vehicle control action corresponding to controlling the vehicle to turn from the current lane onto an intersecting road.

In another example, identifying the vehicle control modification information may include identifying vehicle control modification information for identifying a speed, or acceleration or deceleration rate, for controlling the vehicle to traverse a portion of the vehicle transportation network that includes a change in direction along a defined radius.

In another example, identifying the vehicle control modification information may include identifying vehicle control modification information for identifying a steering angle for controlling the wheels of a stationary vehicle for traversing a portion of the vehicle transportation network in accordance with a 'Turn' vehicle control action such that a semiotic representation output by controlling the steering angle of the wheels corresponds with controlling the vehicle to traverse the portion of the vehicle transportation network in accordance with the 'Turn vehicle control action.

In another example, identifying the vehicle control modification information may include identifying vehicle control modification information for identifying a spatial, temporal, or spatiotemporal distance for controlling the vehicle to traverse the vehicle transportation network such that a distance between the vehicle and an immediately adjacent external object, such as a remote vehicle, ahead of, such as along an expected path of the vehicle, is the identified distance.

In another example, identifying the vehicle control modification information may include identifying vehicle control modification information for identifying a spatial, temporal, or spatiotemporal distance for controlling the vehicle to traverse a portion of the vehicle transportation network by decelerating prior to turning in accordance with a 'Turn' vehicle control action such that controlling the vehicle to traverse the portion of the vehicle transportation network by decelerating prior to turning in accordance with the 'Turn' vehicle control action includes outputting a semiotic representation of controlling the vehicle to traverse the portion of the vehicle transportation network in accordance with the 'Turn' vehicle control action at the identified distance prior to controlling the vehicle to traverse the portion of the vehicle transportation network by turning in accordance with the 'Turn' vehicle control action.

In another example, identifying the vehicle control modification information may include identifying vehicle control modification information for identifying one or more parameters for controlling the vehicle to traverse a portion of the vehicle transportation network proximate to an indirect vehicle operational environment condition such that controlling the vehicle to traverse the portion of the vehicle transportation network proximate to the indirect vehicle operational environment condition includes controlling the vehicle to output a semiotic representation of the indirect vehicle operational environment condition or of a probable effect of the indirect vehicle operational environment condition. For example, the indirect vehicle operational environment condition may be a condition of a portion of the vehicle transportation network adjacent or proximate to the portion of the vehicle transportation network traversed by the vehicle that is omitted from the portion of the vehicle transportation network traversed by the vehicle and that has an identified probability of affecting the operation of the vehicle, or an external object within the portion of the vehicle transportation network, such as a slow traffic condition in a lane adjacent to a current lane of the vehicle.

Identifying the vehicle control modification information at 4300 may include reading the values corresponding to the operational elements from the identified vehicle control modification table as the vehicle control modification information.

Identifying the vehicle control modification information at 4300 may omit identifying a vehicle control modification table and may include identifying vehicle control modifiers based on the operational environment information representing the operational environment of the vehicle identified at 4100, the vehicle control action identified at 4200, or both. For example, a vehicle control modifier may correspond with a respective aspect of the operational environment may be identified for a respective operational element or vehicle control action performance parameter.

Identifying vehicle control modifiers based on the operational environment information representing the operational environment of the vehicle identified at 4100 may include identifying the vehicle control modifiers using Boolean values for the aspects of the operational environment.

For example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a commercial neighborhood or area is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). Identifying the vehicle control modification information at 4300 may include identifying a vehicle control modifier, or a value thereof, for the parameter 'Lead time to show Acceleration Imminent' (L) based on the empirical information indicating wet or rainy weather conditions, such as +0.3 seconds, which may be expressed as 'If(weather=rain): L+=0.3 s'. Identifying the vehicle control modification information at 4300 may include identifying a vehicle control modifier, or a value thereof, for the parameter 'Lead time to show Acceleration Imminent' (L) based on the empirical information indicating daylight conditions, such as +0 seconds, which may be expressed as 'If(light=day): L+=0 s'. Identifying the vehicle control modification information at 4300 may include identifying a vehicle control modifier, or a value thereof, for the parameter 'Lead time to show Acceleration Imminent' (L) based on the vehicle transportation network information indicating a commercial area, such as −0.1 seconds, which may be expressed as 'If(area=commercial): L−=0.1 s'. Identifying the vehicle control modification information at 4300 may include identifying a vehicle control modifier, or a value thereof, for the parameter 'Lead time to show Acceleration Imminent' (L) based on the external object information indicating the presence of a pedestrian in the current operational environment, such as +0.1 seconds, which may be expressed as 'If(pedestrians=true): L+=0.1 s'. Identifying the vehicle control modification information at 4300 may include identifying a vehicle control modifier, or a value thereof, for the parameter 'Lead time to show Acceleration Imminent' (L) based on the external activity information indicating the uneventful conditions, such as +0 seconds, which may be expressed as 'If(uneventful): L+=0 s'. Identifying the vehicle control modification information at 4300 may include identifying a vehicle control modifier, or a value thereof, for the parameter 'Lead time to show Acceleration Imminent' (L) based on the user configuration information indicating high vehicle control optimization priority, such as −0.05 seconds, which may be expressed as 'If(high optimization): L−=0.05 s'.

In another example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are dark (night), vehicle transportation network information indicating that a rural neighborhood or area is geographically and temporally proximate to the operational environment, external object information indicating no external objects are in the current operational environment, external activity information indicating a concert for the current operational environment (eventful), and user configuration information indicating a preference for courteous driving (low vehicle control optimization priority). Identifying the vehicle control modification information at 4300 may include identifying a vehicle control modifier, or a value thereof, for the parameter 'Lead time to show Acceleration Imminent' (L) based on the empirical information indicating wet or rainy weather conditions, such as +0.3 seconds, which may be expressed as 'If(weather=rain): L+=0.3 s'. Identifying the vehicle control modification information at 4300 may include identifying a vehicle control modifier, or a value thereof, for the parameter 'Lead time to show Acceleration Imminent' (L) based on the empirical information indicating dark conditions, such as +0.1 seconds, which may be expressed as 'If(night): L+=0.1 s'. Identifying the vehicle control modification information at 4300 may include identifying a vehicle control modifier, or a value thereof, for the parameter 'Lead time to show Acceleration Imminent' (L) based on the vehicle transportation network information indicating a rural area, such as +0.1 seconds, which may be expressed as 'If(rural): L+=0.1 s'. Identifying the vehicle control modification information at 4300 may include identifying a vehicle control modifier, or a value thereof, for the parameter 'Lead time to show Acceleration Imminent' (L) based on the external object information indicating the absence of external objects in the current operational environment, such as −0.15 seconds, which may be expressed as 'If(deserted): L−=0.15 s'. Identifying the vehicle control modification information at 4300 may include identifying a vehicle control modifier, or a value thereof, for the parameter 'Lead time to show Acceleration Imminent' (L) based on the external activity information indicating the concert, such as +0.2 seconds, which may be expressed as 'If(eventful): L+=0.2 s'. Identifying the vehicle control modification information at 4300 may include identifying a vehicle control modifier, or a value thereof, for the parameter 'Lead time to show Acceleration Imminent' (L) based on the user configuration information indicating low vehicle control optimization priority, such as +0.05 seconds, which may be expressed as 'If(low optimization): L+=0.05 s'.

Identifying vehicle control modifiers based on the operational environment information representing the operational environment of the vehicle identified at 4100 may include identifying the vehicle control modifiers using discrete or numeric values for the aspects of the operational environment.

For example, the operational environment information representing the operational environment of the vehicle identified at 4100 may include empirical information indicating sensor information from an external light sensor of the vehicle, such as illumination sensor information (IL) indicating $10^5$ luminous flux per unit area (lux), and identifying the vehicle control modification information at 4300 may include identifying a vehicle control modifier, or a value thereof, for the parameter 'Lead time to show Acceleration Imminent' (L) as a function ($\Delta L_{light}$) of the empirical information indicating the illumination sensor information (IL), which may be expressed as the following:

$$\Delta L_{light} = \log(IL)/50 + 1/10.  \quad \text{[Equation 1]}$$

In another example, the operational environment information representing the operational environment of the vehicle identified at 4100 may include empirical information indicating sensor information from a rain sensor of the vehicle, such as sensor information indicating a percentage of illuminance (PIR), such as 100%, and identifying the vehicle control modification information at 4300 may include identifying a vehicle control modifier, or a value thereof, for the parameter 'Lead time to show Acceleration Imminent' (L) as a function ($\Delta L_{rain}$) of the empirical information indicating the percentage of illuminance (PR) from the rain sensor, which may be expressed as the following:

$$\Delta L_{rain} = (1-PIR)*1.2.  \quad \text{[Equation 2]}$$

A vehicle control modifier may indicate a constraint, such as a minimum value, a maximum value, or a range of values, for an operational element. For example, the operational environment information representing the operational environment of the vehicle identified at 4100 may include vehicle transportation network information indicating that a school, or school zone, is geographically and temporally proximate, such as included in, adjacent to, or overlapping, to the operational environment, and identifying the vehicle control modification information at 4300 may include identifying a vehicle control constraint, or a value thereof, for the parameter 'Lead time to show Acceleration Imminent' (L) based on the vehicle transportation network information indicating a school zone, such as =1.2 seconds, which may be expressed as 'If(school): L>=1.2 s'.

In some embodiments, a vehicle control modifier may indicate a conditional constraint, such as a minimum value, a maximum value, or a range of values, for a combination of operational elements. For example, the operational environment information representing the operational environment of the vehicle identified at 4100 may include vehicle transportation network information indicating that the operational environment includes a residential neighborhood, empirical information indicating a dark or nighttime illumination state, external object information indicating an absence of external objects, and external activity information indicating an absence of external activities, and identifying the vehicle control modification information at 4300 may include identifying a vehicle control conditional constraint, or a value thereof, for the parameter 'Lead time to show Acceleration Imminent' (L) based on the vehicle transportation network information indicating a combination of a residential neighborhood, a dark illumination state, a deserted state, and an uneventful state, such as =1.0 seconds, which may be a maximum constraint and which may be expressed as 'If(residential, dark, deserted, uneventful): L<=1.0 s'.

In some embodiments, multiple conditional constraints may be identified based on one or more aspects of the operational environment information and the conditional constraint corresponding to the largest cardinality of aspects may be identified as the operative conditional constraint. For example, the operational environment information representing the operational environment of the vehicle identified at 4100 may include vehicle transportation network information indicating that the operational environment includes a residential neighborhood, vehicle transportation network information indicating that a school, or school zone, is geographically and temporally proximate, such as included in, adjacent to, or overlapping, to the operational environment, empirical information indicating a dark or nighttime illumination state, external object information indicating an absence of external objects, and external activity information indicating an absence of external activities, and identifying the vehicle control modification information at 4300 may include identifying a first vehicle control conditional constraint, or a value thereof, for the parameter 'Lead time to show Acceleration Imminent' (L) based on the vehicle transportation network information indicating a combination of a residential neighborhood, a dark illumination state, a deserted state, and an uneventful state, such as =1.0 seconds, which may be a maximum constraint and which may be expressed as 'If(residential, dark, deserted, uneventful): L<=1.0 s', identifying a second vehicle control conditional constraint, or a value thereof, for the parameter 'Lead time to show Acceleration Imminent' (L) based on the vehicle transportation network information indicating a combination of a residential neighborhood, a school zone, a dark illumination state, a deserted state, and an uneventful state, such as =1.2 seconds, which may be a minimum constraint and which may be expressed as 'If(residential, school, dark, deserted, uneventful): L>=1.2 s', and the second conditional constraint may be identified as the operative conditional constraint.

Although identifying vehicle control modifiers is described herein for the parameter 'Lead time to show Acceleration Imminent' (L), other vehicle control modifier values may be used and other vehicle control modifiers may be identified based on the operational environment information for other operational elements.

In an example, the vehicle control modification information may indicate one or more parameters for controlling the information output as a semiotic representation. For example, one or more parameters for controlling the amount, or density, of information output as a semiotic representation may be based on the modalities available for the vehicle to output the semiotic representation.

Vehicle control information may be identified at 4400. Identifying the vehicle control information at 4400 may include identifying the vehicle control information based on the vehicle control action identified at 4200, the vehicle control modification information identified at 4300, or both. For example, the vehicle control modification information identified at 4300 may include vehicle control modifiers, and identifying the vehicle control information at 4400 may include identifying the vehicle control information based on the vehicle control modifiers.

Identifying the vehicle control information at 4400 may include identifying defined vehicle control information for controlling the vehicle to traverse the vehicle transportation network. The defined vehicle control information may include values for respective operational elements or performance parameters for controlling the vehicle to traverse the vehicle transportation network. The defined vehicle control information may be independent of the operational environment. For example, the defined vehicle control information may include a defined value, such as 0.25 seconds, for the parameter 'Lead time to show Acceleration Imminent' (L).

Identifying the defined vehicle control information may include identifying the defined vehicle control information, or a portion thereof, based on a current operational state of the vehicle, based on the vehicle control action identified at 4200, the primary vehicle control basis identified at 4200, based on a defined data source, such as a look-up table, or based on a combination of one or more of the current operational state of the vehicle, the vehicle control action identified at 4200, the primary vehicle control basis identified at 4200, and the defined data source.

Identifying the vehicle control information at 4400 may include identifying a combination of the defined vehicle control information and the vehicle control modification information identified at 4300. For example, identifying the vehicle control information at 4400 may include updating or modifying one or more values from the defined vehicle control information based on corresponding values from the vehicle control modification information.

The vehicle control modification information identified at 4300 may omit constraints and identifying the vehicle control information at 4400 may include identifying, for each operational element, a sum of the defined vehicle control information for the respective operational element and each vehicle control modifier for the respective operational element, as the corresponding vehicle control information.

In an example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a commercial neighborhood or area is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating daylight conditions, such as +0 seconds; a vehicle control modifier based on the vehicle transportation network information indicating a commercial area, such as −0.1 seconds; a vehicle control modifier based on the external object information indicating the presence of a pedestrian in the current operational environment, such as +0.1 seconds; a vehicle control modifier based on the external activity information indicating the uneventful conditions, such as +0 seconds; and a vehicle control modifier based on the user configuration information indicating high vehicle control optimization priority, such as −0.05 seconds. Identifying the vehicle control information at 4400 may include identifying defined vehicle control information for the parameter 'Lead time to show Acceleration Imminent' (L) indicating a primary value of 0.25 second, and may include, for the parameter 'Lead time to show Acceleration Imminent' (L), identifying a sum of the primary value, 0.25 s, and the respective vehicle control modifiers, +0, +0.3, −0.1, +0.1, −0.05, as the vehicle control information for the parameter 'Lead time to show Acceleration Imminent' (L), which may be expressed as the following:

$$L=\Sigma(0.25,0,0.3,-0.1,0.1,-0.05)=0.5. \quad \text{[Equation 3]}$$

In another example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are dark (night), vehicle transportation network information indicating that a rural neighborhood or area is geographically and temporally proximate to the operational environment, external object information indicating no external objects are in the current operational environment, external activity information indicating a concert for the current operational environment (eventful), and user configuration information indicating a preference for courteous driving (low vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating night conditions, such as +0.1 seconds; a vehicle control modifier based on the vehicle transportation network information indicating a rural area, such as +0.1 seconds; a vehicle control modifier based on the external object information indicating the absence of external objects in the current operational environment, such as −0.15 seconds; a vehicle control modifier based on the external activity information indicating the eventful conditions, such as +0.2 seconds; and a vehicle control modifier based on the user configuration information indicating low vehicle control optimization priority, such as +0.05 seconds. Identifying the vehicle control information at 4400 may include identifying defined vehicle control information for the parameter 'Lead time to show Acceleration Imminent' (L) indicating a primary value of 0.25 second, and may include, for the parameter 'Lead time to show Acceleration Imminent' (L), identifying a sum of the primary value, 0.25 s, and the respective vehicle control modifiers, +0.1, +0.3, +0.1, −0.15, +0.2, +0.05, as the vehicle control information for the parameter 'Lead time to show Acceleration Imminent' (L), which may be expressed as the following:

$$L=\Sigma(0.25,0.1,0.3,0.1,-0.15,0.2,0.05)=0.85. \quad \text{[Equation 4]}$$

The vehicle control modification information identified at 4300 may include a constraint and identifying the vehicle control information at 4400 may include identifying, for operational elements corresponding to the constraint, a sum of the defined vehicle control information for the respective operational element and each vehicle control modifier for the respective operational element, determining whether the sum is consistent with the constraint, and determining whether to use the sum as the corresponding vehicle control information or to use the constraint as the corresponding vehicle control information. For example, the sum may be consistent with the constraint and the sum may be used as the corresponding vehicle control information. In another example, the sum may be inconsistent with the constraint and the constraint may be used as the corresponding vehicle control information.

In an example, the constraint may be a minimum value constraint, the sum may be at least the constraint, such as equal to or greater than, and the sum may be used as the corresponding vehicle control information. In another example, the constraint may be a maximum value constraint, the sum may be within the constraint, such as less than, and the sum may be used as the corresponding vehicle control information. In some embodiments, determining the sum may be omitted and the constraint may be used as the corresponding vehicle control information.

In an example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a school zone is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating daylight conditions, such as +0 seconds; a vehicle control modifier constraint based on the vehicle transportation network information indicating a school zone, such as >=1.2 seconds; a vehicle control modifier based on the external object information indicating the presence of a pedestrian in the current operational environment, such as +0.1 seconds; a vehicle control modifier based on the external activity information indicating the uneventful conditions, such as +0 seconds; and a vehicle control modifier based on the user configuration information indicating high vehicle control optimization priority, such as −0.05 seconds. Identifying the vehicle control information at 4400 may include identifying defined vehicle control information for the parameter 'Lead time to show Acceleration Imminent' (L) indicating a primary value of 0.25 second, determining that, for the parameter 'Lead time to show Acceleration Imminent' (L), the vehicle control modification information identified at 4300 includes the school zone constraint, and identifying the value of the school zone constraint, 1.2 seconds, as the vehicle control information for the parameter 'Lead time to show Acceleration Imminent' (L).

Although not shown separately in FIG. 4, in some embodiments, identifying the vehicle control modification information at 4300, identifying the vehicle control information at 4400, or both, may include identifying vehicle control modification weights and identifying the vehicle control information at 4400 may include identifying the vehicle control information using the vehicle control modification weights. The vehicle control modification weights may indicate a weighting for a current vehicle control state relative to a corresponding modified vehicle control state such that controlling the vehicle to traverse the vehicle transportation network by transitioning from the current vehicle control state to the modified vehicle control state includes controlling the vehicle to transition from the current vehicle control state to the modified vehicle control state over a defined period such that a rate of change for the corresponding vehicle control element is within a threshold indicated by the vehicle control information.

The vehicle may traverse the vehicle transportation network, or a portion thereof, at 4500. Traversing the vehicle transportation network, or a portion thereof, at 4500 may include traversing the vehicle transportation network, or a portion thereof, in accordance with the vehicle control information identified at 4400. Traversing the vehicle transportation network, or a portion thereof, at 4500 in accordance with the vehicle control information identified at 4400 may include controlling the vehicle to traverse the vehicle transportation network, or the portion thereof, based on the vehicle control information.

In some embodiments, traversing the vehicle transportation network, or a portion thereof, at 4500 in accordance with the vehicle control information identified at 4400 may include outputting, sending, transmitting, or otherwise providing the vehicle control information to another system, device, or unit of the vehicle, such as a routing and navigation control unit of the vehicle or an autonomous vehicle operational management controller of the vehicle such that the other system, device, or unit controls the vehicle to traverse the vehicle transportation network, or the portion thereof, in accordance with the vehicle control information.

For example, traversing the vehicle transportation network, or a portion thereof, at 4500 may include generating combined vehicle control information by supplementing or modifying the non-semiotic vehicle control action identified at 4200 based on the vehicle control information identified at 4400, such as by modifying a performance parameter for the vehicle control action based on corresponding vehicle control information identified at 4400, and controlling the vehicle to traverse the vehicle transportation network, or the portion thereof, in accordance with the combined vehicle control information.

Traversing the vehicle transportation network, or a portion thereof, at 4500 may include outputting a semiotic representation of the vehicle control information at 4510. Traversing the vehicle transportation network, or a portion thereof, at 4500 may include performing or executing one or more semiotic vehicle control operations by controlling, or modifying the control of, the vehicle to traverse the vehicle transportation network, or a portion thereof, such that traversing the vehicle transportation network, or a portion thereof, includes outputting a semiotic representation of the vehicle control information at 4510. Although not shown expressly in FIG. 4, traversing the vehicle transportation network, or a portion thereof, at 4500 may include performing or implementing one or more non-semiotic vehicle control operations or actions.

Traversing the vehicle transportation network, or a portion thereof, at 4500 in accordance with vehicle control information may include performing or executing a combination of vehicle control operations or actions, or a sequence or series of vehicle control operations or actions, or combinations of vehicle control operations or actions.

The vehicle control operations may include semiotic vehicle control operations, and traversing the vehicle transportation network, or a portion thereof, in accordance with semiotic vehicle control information or a semiotic vehicle control operation, controlling the vehicle to perform or execute a semiotic vehicle operation, or otherwise performing or executing a semiotic vehicle operation may include signaling, presenting, displaying, performing, or otherwise outputting a semiotic representation of the vehicle control information, which may include a meaningful expression or communication of the vehicle control information, or a portion thereof, or of information indicative of the vehicle control information, or a portion thereof.

The vehicle control operations may include non-semiotic vehicle control operations, and traversing the vehicle transportation network, or a portion thereof, in accordance with non-semiotic vehicle control information or a non-semiotic vehicle control operation, controlling the vehicle to perform or execute a non-semiotic vehicle operation, or otherwise performing or executing a non-semiotic vehicle operation may include controlling or operating the vehicle independent of outputting a semiotic representation.

Outputting the semiotic representation of the vehicle control information may include controlling one or more signaling or communication modalities of the vehicle to output the semiotic representation of the vehicle control information, or a portion thereof. In some embodiments, identifying the vehicle control modification information at 4300 may include identifying the available modalities of the vehicle for outputting the semiotic representation of the vehicle control information and identifying the vehicle control modification information based on the available modalities. For example, the modalities available for the vehicle to output the semiotic representation, or output devices, may include one or more external luminous presentation units, one or more external aural presentation units, one or more electronic communication network control units, one or more velocity, kinetic state, or motion control units, or a combination thereof. Other modalities may be used.

Outputting the semiotic representation of the vehicle control information at 4510 may include controlling an external luminous presentation unit, or a combination of external luminous presentation units, of the vehicle to output at least a portion of the semiotic representation of the vehicle control information. An external luminous presentation unit may be, for example, one or more headlights, taillights, turn signals, individual lights, groups of lights, such as light bars, light strips, light emitting diode (LED) strips, color-changing light strips, on-vehicle graphic displays, image projectors, augmented reality devices, text displays, or any other unit or device capable of outputting any portion of the semiotic representation of the vehicle control information through the control or manipulation of light. For example, controlling the external luminous presentation unit may include controlling a brightness or luminance of the external luminous presentation unit, controlling a color or combination of colors of the external luminous presentation unit, controlling a direction of output of the external luminous presentation unit, controlling an output frequency, rate, timing, or period of the external luminous presentation unit, controlling motion of the luminous output or the external luminous presentation unit, controlling a pattern of the luminous output, controlling an animation of the luminous output, or otherwise modulate the output of the external luminous presentation unit, controlling the external luminous presentation unit to display, or otherwise output, text, graphics, or a combination thereof, controlling the external luminous presentation unit to animate the output of the external luminous presentation unit, or any combination thereof.

Outputting the semiotic representation of the vehicle control information at 4510 may include controlling an external aural presentation unit, or a combination of external aural presentation units, of the vehicle to output at least a portion of the semiotic representation of the vehicle control information. An external aural presentation unit may be, for example, a horn, a speaker, or any other unit or device capable of outputting any portion of the semiotic representation of the vehicle control information through the control or manipulation of sound. For example, controlling the external aural presentation unit may include controlling a frequency, tone, phase, or amplitude of the external luminous presentation unit, which may include controlling the external luminous presentation unit to output a sequence or series of sounds.

Outputting the semiotic representation of the vehicle control information at 4510 may include controlling an electronic communication network control unit of the vehicle to output information indicating at least a portion of the semiotic representation of the vehicle control information, such as by outputting, sending, broadcasting, or transmitting an electronic communication signal via an electronic communication medium to an external device, such as a remote vehicle or an infrastructure device.

Outputting the semiotic representation of the vehicle control information at 4510 may include controlling a velocity control unit, which may include controlling a directional state control unit of the vehicle, a kinetic state control unit of the vehicle, or both, to output at least a portion of the semiotic representation of the vehicle control information.

Controlling a directional state control unit, such as a steering unit, of the vehicle to output at least a portion of the semiotic representation of the vehicle control information may include controlling the directional state control unit to control, or alter, a directional state of the vehicle, such as by turning or steering the vehicle, such that at least a portion of the semiotic representation of the vehicle control information is output. Controlling the directional state may include maintaining a current directional state such that at least a portion of the semiotic representation of the vehicle control information is output.

Controlling a kinetic state control unit, such as an accelerator or a braking unit, of the vehicle to output at least a portion of the semiotic representation of the vehicle control information may include controlling the kinetic state control unit to control, or alter, a kinetic state of the vehicle, such as by accelerating or decelerating the vehicle, such that at least a portion of the semiotic representation of the vehicle control information is output. Controlling the kinetic state may include maintaining a current kinetic state such that at least a portion of the semiotic representation of the vehicle control information is output.

Outputting the semiotic representation of the vehicle control information at 4510 may include outputting a semiotic representation of at least a portion of an operational state of the vehicle concurrent with traversing the vehicle transportation network, or a portion thereof, at 4512, outputting a semiotic representation of the primary vehicle control basis at 4514, or a combination thereof.

Outputting a semiotic representation of an operational state of the vehicle concurrent with traversing the vehicle transportation network, or a portion thereof, at 4512, may include outputting a semiotic representation of a current operational state of the vehicle, outputting a semiotic representation of an expected operational state of the vehicle, or a combination thereof.

For example, the current operational state of the vehicle may be accelerating from a stationary state through an intersection, and outputting the semiotic representation of the current operational state of the vehicle may include outputting a semiotic representation indicating that the vehicle is proceeding, or accelerating, through the intersection.

In another example, the current operational state of the vehicle may be stationary at an intersection, the expected, imminent, or probable, operational state of the vehicle, which may be associated with a temporal location, such as a temporally proximate future temporal location, may be accelerating through the intersection, and outputting the semiotic representation of the expected operational state of the vehicle may include outputting a semiotic representation indicating that the expected, imminent, or probable temporally proximate future velocity of the vehicle is proceeding, or accelerating, through the intersection. An expected, probable, or projected operational state of the vehicle may be an imminent, expected, probable, or projected operational state of the vehicle at a temporally proximate future temporal location subsequent to or concurrent with controlling the vehicle to perform an identified vehicle control operation or action, or a sequence or combination thereof.

Temporally prior to, or concurrent with, controlling the vehicle to perform an identified vehicle control operation or action, or a sequence or combination of identified vehicle control operations or actions, the identified vehicle control operation or action, or sequence or combination of identified vehicle control operations or actions, or the imminent, expected, probable, or projected operational state of the vehicle at a temporally proximate future temporal location subsequent to, or concurrent with, controlling the vehicle to perform the identified vehicle control operation or action, or the sequence or combination of identified vehicle control operations or actions, may be referred to herein as the intent or intention of the vehicle and the semiotic representation of the vehicle control information indicating the identified vehicle control operation or action, or the sequence or combination of identified vehicle control operations or actions, may be referred to herein as the intent or intention indicator or indication.

Outputting a semiotic representation of the primary vehicle control basis at 4514 may include generating an indication or representation, which may be referred to herein as a rationale indication or indicator, of the primary vehicle control basis identified at 4100 based on the vehicle control information identified at 4400.

Other implementations of structured multivariate contextual vehicle operation with integrated semiotic control may be used. For example, one or more of identifying operational environment information at 4100, identifying a vehicle control action at 4200, identifying vehicle control modification information at 4300, identifying vehicle control information at 4400, controlling the vehicle to traverse the vehicle transportation network, or a portion thereof, at 4500 may be combined or performed concurrently or in parallel.

In some embodiments, identifying the vehicle control modification information at 4300 may include determining that a probability of ambiguity for outputting the semiotic representation exceeds a defined ambiguity threshold and identifying the vehicle control modification information to minimize the probability of ambiguity.

For example, identifying the operational environment information at 4100 may include determining that the vehicle is traversing a highway approaching a series of two or more exit ramps in relatively close proximity. Identifying the vehicle control action at 4200 may include identifying an 'Exit' vehicle control action for exiting at a sequentially second exit ramp. Identifying the vehicle control modification information at 4300 may include identifying signal timing modifiers extending or increasing a signal timing parameter for outputting a semiotic representation of the 'Exit' vehicle control action such that outputting the semiotic representation of the 'Exit' vehicle control action as modified by the signal timing parameter may include outputting at least a portion of the semiotic representation of the 'Exit' vehicle control action as modified by the signal timing parameter substantially prior to passing a sequentially first exit ramp, and a probability of ambiguity for outputting the portion of the semiotic representation of the 'Exit' vehicle control action as modified by the signal timing parameter substantially prior to passing the sequentially first exit ramp may exceed the defined ambiguity threshold which may indicate a determined probability that outputting the portion of the semiotic representation of the 'Exit' vehicle control action as modified by the signal timing parameter substantially prior to passing the sequentially first exit ramp may communicate an indication that the imminent or expected path for the vehicle includes traversing the first exit ramp.

Minimizing the probability of ambiguity may include identifying vehicle control modifiers that reduce, minimize, or eliminate the probability that outputting the portion of the semiotic representation of the 'Exit' vehicle control action as modified by the signal timing parameter may communicate an indication that the imminent or expected path for the vehicle includes traversing the first exit ramp.

In some embodiments, the vehicle control modification information identified at 4300, the defined vehicle control information identified at 4400, or both may be based in part on one or more regional factors. For example, identifying the vehicle control modification information at 4300, identifying the defined vehicle control information at 4400, or both may include adjusting or weighting the respective information based on one or more regional factors. The regional factors may indicate modifications to outputting semiotic representations based on a relatively large geospatial area, such as a geospatial area extending multiples of the current operational environment beyond the current operational environment.

Figure 5:
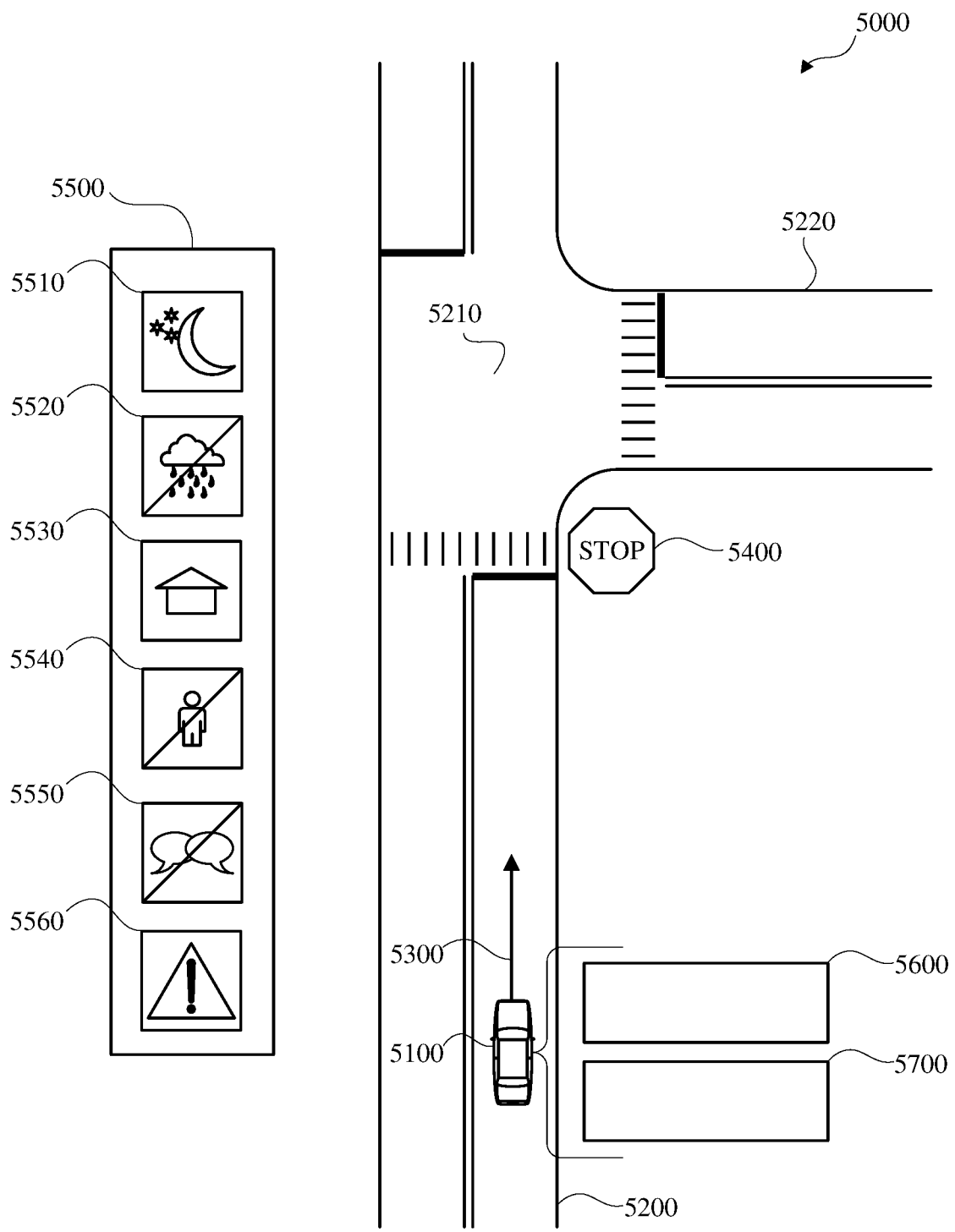
FIG. 5 is a diagram, corresponding to a first temporal location, from a sequence of diagrams of an example of structured multivariate contextual vehicle operation with integrated semiotic control for traversing a stop-and-go scenario in accordance with implementations of this disclosure.
Figure 6:
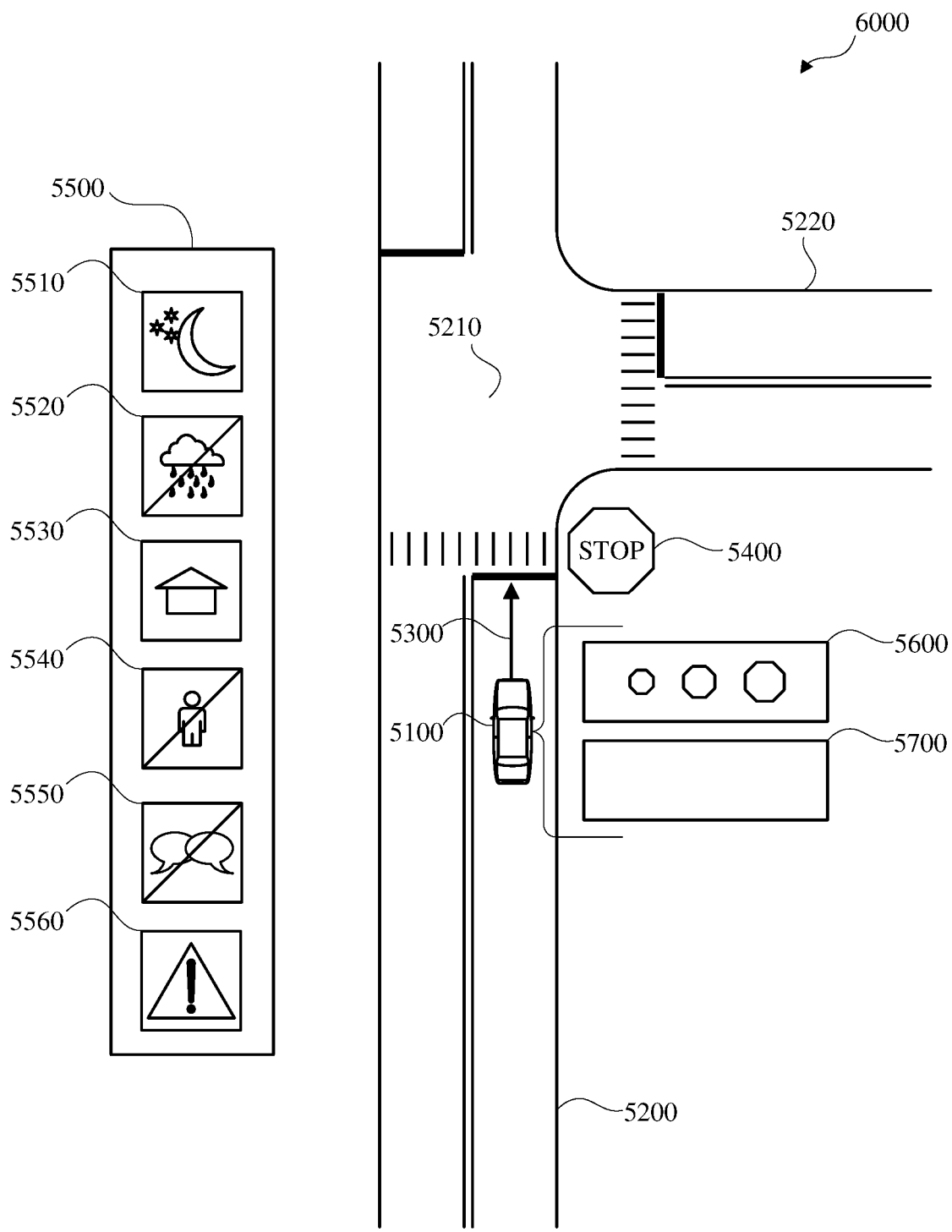
FIG. 6 is a diagram, corresponding to a second temporal location, from a sequence of diagrams of an example of structured multivariate contextual vehicle operation with integrated semiotic control for traversing a stop-and-go scenario in accordance with implementations of this disclosure.
Figure 7:
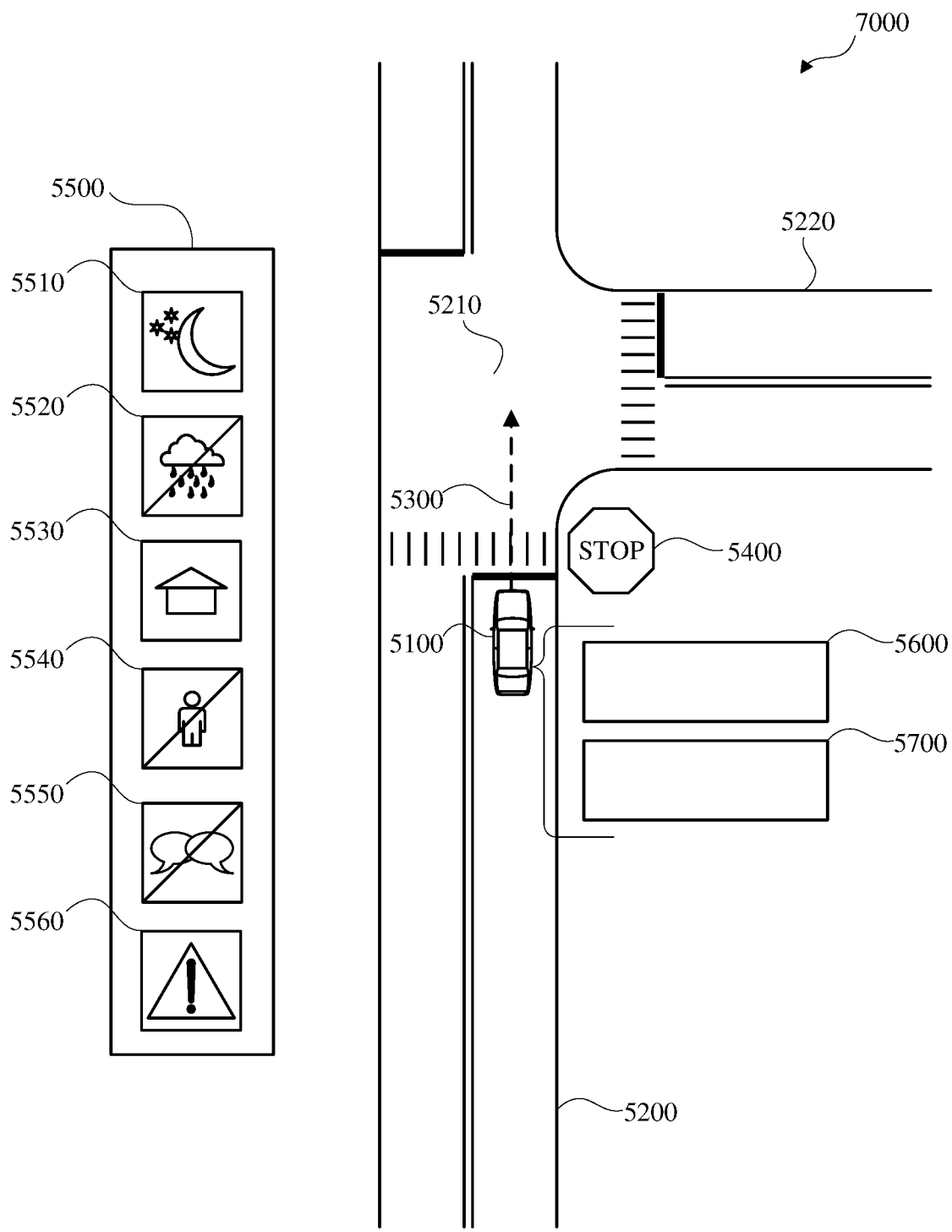
FIG. 7 is a diagram, corresponding to a third temporal location, from a sequence of diagrams of an example of structured multivariate contextual vehicle operation with integrated semiotic control for traversing a stop-and-go scenario in accordance with implementations of this disclosure.

FIG. 5, FIG. 6, and FIG. 7 are a sequence of diagrams of an example of structured multivariate contextual vehicle operation with integrated semiotic control for traversing a stop-and-go scenario in accordance with implementations of this disclosure. In FIG. 5, FIG. 6, and FIG. 7 some aspects of structured multivariate contextual vehicle operation with integrated semiotic control for traversing a stop-and-go scenario are shown and other aspects are omitted for simplicity and clarity.

FIG. 5 is a diagram of the example of structured multivariate contextual vehicle operation with integrated semiotic control for traversing the stop-and-go scenario at a first temporal location. FIG. 6 is a diagram of the example of structured multivariate contextual vehicle operation with integrated semiotic control for traversing the stop-and-go scenario at a second temporal location that is subsequent to the first temporal location shown in FIG. 5. FIG. 7 is a diagram of the example of structured multivariate contextual vehicle operation with integrated semiotic control for traversing the stop-and-go scenario at a third temporal location that is subsequent to the second temporal location shown in FIG. 6.

In FIG. 5, the stop-and-go scenario 5000 includes a vehicle 5100, such as the vehicle 1000 shown in FIG. 1, one of the vehicles 2100/2110 shown in FIG. 2, or any other vehicle implementing structured multivariate contextual vehicle operation with integrated semiotic control, such as an autonomous vehicle, a semi-autonomous vehicle, or any other vehicle implementing autonomous driving, traversing a portion of a current road 5200 approaching an intersection 5210 with an intersecting road 5220. A current expected path 5300 for the vehicle 5100 is shown using a solid directional line, indicating that a current velocity of the vehicle 5100 is such that the vehicle moving towards the intersection. The stop-and-go scenario 5000 includes a traffic control device 5400, such as a stop sign, for the intersection.

Structured multivariate contextual vehicle operation with integrated semiotic control for traversing the stop-and-go scenario 5000 at the first temporal location may include identifying operational environment information, which may be similar to the operational environment information identification shown at 4100 in FIG. 4, except as described herein.

For example, traversing the current portion of the vehicle transportation network shown in FIG. 5 at the first temporal location may include identifying operational environment information indicating that the current operational environment has a dark or nighttime illumination state, has a dry or clear weather or precipitation state, includes a residential neighborhood, omits external objects, omits external activities, and includes user configuration information indicating high vehicle control optimization priority.

Aspects of the current operational environment are indicated at 5500. For example, the dark or nighttime illumination state is indicated at 5510, the dry or clear weather or precipitation state is indicated at 5520, the residential neighborhood is indicated at 5530, the omission of external objects is indicated at 5540, the omission of external activities is indicated at 5550, and user configuration information indicating high vehicle control optimization priority is indicated at 5560. The indications 5510, 5520, 5530, 5540, 5550, 5560 are shown for simplicity and clarity of explanation.

Structured multivariate contextual vehicle operation with integrated semiotic control for traversing the stop-and-go scenario 5000 at the first temporal location may include identifying a vehicle control action, which may be similar to the vehicle control action identification shown at 4200 in FIG. 4, except as described herein.

For example, for traversing the current portion of the vehicle transportation network shown in FIG. 5 at the first temporal location, a 'Maintain' vehicle control action may be identified, corresponding to controlling the vehicle to maintain current operational parameters to traverse the road 5200 toward the intersection 5210.

Structured multivariate contextual vehicle operation with integrated semiotic control for traversing the stop-and-go scenario 5000 at the first temporal location may include identifying vehicle control modification information, which may be similar to the vehicle control modification information identification shown at 4300 in FIG. 4, except as described herein.

For example, for traversing the current portion of the vehicle transportation network shown in FIG. 5 at the first temporal location, identifying the vehicle control modification information may include identifying vehicle control modification information corresponding to the dark or nighttime illumination state, the dry or clear weather or precipitation state, the residential neighborhood, the omission of external objects, the omission of external activities, and the user configuration information indicating high vehicle control optimization priority.

Structured multivariate contextual vehicle operation with integrated semiotic control for traversing the stop-and-go scenario 5000 at the first temporal location may include identifying vehicle control information, which may be similar to the vehicle control information identification shown at 4400 in FIG. 4, except as described herein.

For example, for traversing the current portion of the vehicle transportation network shown in FIG. 5 at the first temporal location, the vehicle control information may be identified based on current operational parameters for the vehicle, the identified vehicle control action, the identified vehicle control modification information, or a combination thereof, and may indicate operational parameters consistent with the current operational parameters.

Structured multivariate contextual vehicle operation with integrated semiotic control for traversing the stop-and-go scenario 5000 at the first temporal location may include controlling the vehicle to traverse the vehicle transportation network, or a portion thereof, which may be similar to the traversing shown at 4500 in FIG. 4, except as described herein, and which may include controlling the vehicle 5100 to traverse the road 5200 toward the intersection 5210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 5100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 5100 to traverse the road 5200 toward the intersection 5210 in accordance with the vehicle control information, which may include using a velocity control unit of the vehicle 5100 as an output device, or a portion thereof, for outputting the semiotic representation, or a portion thereof, by controlling the velocity control unit of the vehicle 5100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by, controlling a velocity, the timing of performing a velocity vehicle control action, or a combination thereof.

Controlling the velocity control unit of the vehicle 5100 to output the semiotic representation of the vehicle control information, or a portion thereof, in accordance with the vehicle control information may include controlling the speed of the vehicle 5100, such as by maintaining a current speed of the vehicle 5100 in accordance with the 'Maintain' vehicle control action as modified by related vehicle control modification information, such as 25 miles-per-hour, which may output at least a portion of the semiotic representation of at least a portion of the vehicle control information indicating that the vehicle is traversing the road 5200 toward the intersection 5210.

A current intention indicator 5600 is shown as a blank box to indicate that traversing the portion of the vehicle transportation network shown in FIG. 5 may omit outputting a portion of the semiotic representation of controlling the vehicle 5100 to perform the 'Maintain' vehicle control action using an external luminous presentation unit of the vehicle 5100.

A current rationale indicator 5700 is shown as a blank box to indicate that traversing the portion of the vehicle transportation network shown in FIG. 5 may omit outputting a semiotic representation of the current primary vehicle control basis.

In FIG. 6, the stop-and-go scenario 6000 is similar to the stop-and-go scenario 5000 shown in FIG. 5 except as described herein. For example, in the stop-and-go scenario 6000 shown in FIG. 6, the vehicle 5100 is approaching the intersection 5210.

Structured multivariate contextual vehicle operation with integrated semiotic control for traversing the stop-and-go scenario 6000 at the second temporal location may include identifying operational environment information, which may be similar to the operational environment information identification described in relation to the stop-and-go scenario 5000 shown in FIG. 5, except as described herein.

For example, for traversing the current portion of the vehicle transportation network shown in FIG. 6 at the second temporal location, identifying the operational environment information may include identifying that a distance between the vehicle 5100 and the intersection 5120 as shown in FIG. 6 is less than a distance between the vehicle 5100 and the intersection 5120 as shown in FIG. 5.

Structured multivariate contextual vehicle operation with integrated semiotic control for traversing the stop-and-go scenario 6000 at the second temporal location may include identifying a vehicle control action, which may be similar to the vehicle control action identification described in relation to the stop-and-go scenario 5000 shown in FIG. 5, except as described herein.

For example, for traversing the current portion of the vehicle transportation network shown in FIG. 6 at the second temporal location, a 'Stop' vehicle control action may be identified, corresponding to controlling the vehicle to become stationary in accordance with the traffic control device 5400 at the intersection 5210, which may include controlling the vehicle to control a velocity of the vehicle, such as by braking to transition from a current velocity of the vehicle to a stationary velocity at a defined deceleration rate.

Structured multivariate contextual vehicle operation with integrated semiotic control for traversing the stop-and-go scenario 6000 at the second temporal location may include identifying vehicle control modification information, which may be similar to the vehicle control modification information identification described in relation to the stop-and-go scenario 5000 shown in FIG. 5, except as described herein.

For example, traversing the current portion of the vehicle transportation network shown in FIG. 6 at the second temporal location may include identifying vehicle control modification information for a 'Stop Signaling Time' vehicle control parameter corresponding to the identified 'Stop' vehicle control action, which may indicate a temporal period for outputting a semiotic representation of an operational state of the vehicle concurrent with controlling the vehicle to traverse the current portion of the vehicle transportation network in accordance with the identified 'Stop' vehicle control action.

In an example, identifying the vehicle control modification information may include identifying defined vehicle control information indicating a defined 'Stop Signaling Time' vehicle control parameter of 0.75 corresponding to the identified 'Stop' vehicle control action, identifying vehicle control modification information corresponding to the dark or nighttime illumination state indicating a 'Stop Signaling Time' vehicle control modifier of +0.1 corresponding to the identified 'Stop' vehicle control action, identifying vehicle control modification information corresponding to the dry or clear weather or precipitation state indicating a 'Stop Signaling Time' vehicle control modifier of +0.0 corresponding to the identified 'Stop' vehicle control action, identifying vehicle control modification information corresponding to the residential neighborhood indicating a 'Stop Signaling Time' vehicle control modifier of +0.2 corresponding to the identified 'Stop' vehicle control action, identifying vehicle control modification information corresponding to the omission of external objects indicating a 'Stop Signaling Time' vehicle control modifier of −0.15 corresponding to the identified 'Stop' vehicle control action, identifying vehicle control modification information corresponding to the omission of external activities indicating a 'Stop Signaling Time' vehicle control modifier of +0.0 corresponding to the identified 'Stop' vehicle control action, and identifying vehicle control modification information corresponding to the user configuration information indicating high vehicle control optimization priority indicating a 'Stop Signaling Time' vehicle control modifier of −0.05 corresponding to the identified 'Stop' vehicle control action.

Structured multivariate contextual vehicle operation with integrated semiotic control for traversing the stop-and-go scenario 6000 at the second temporal location may include identifying vehicle control information, which may be similar to the vehicle control information identification described in relation to the stop-and-go scenario 5000 shown in FIG. 5, except as described herein.

For example, for traversing the current portion of the vehicle transportation network shown in FIG. 6 at the second temporal location, identifying the vehicle control information may include identifying a value of the 'Stop Signaling Time' vehicle control parameter corresponding to the identified 'Stop' vehicle control action, such as based on a combination, such as a sum, of the defined 'Stop Signaling Time' vehicle control parameter value of 0.75 corresponding to the identified 'Stop' vehicle control action, the dark or nighttime illumination state 'Stop Signaling Time' vehicle control modifier of +0.1 corresponding to the identified 'Stop' vehicle control action, the dry or clear weather or precipitation state 'Stop Signaling Time' vehicle control modifier of +0.0 corresponding to the identified 'Stop' vehicle control action, the residential neighborhood 'Stop Signaling Time' vehicle control modifier of +0.2 corresponding to the identified 'Stop' vehicle control action, the omission of external objects 'Stop Signaling Time' vehicle control modifier of −0.15 corresponding to the identified 'Stop' vehicle control action, the omission of external activities 'Stop Signaling Time' vehicle control modifier of +0.0 corresponding to the identified 'Stop' vehicle control action, and the high vehicle control optimization priority 'Stop Signaling Time' vehicle control modifier of −0.05 corresponding to the identified 'Stop' vehicle control action, which may be 0.85.

Structured multivariate contextual vehicle operation with integrated semiotic control for traversing the stop-and-go scenario 6000 at the second temporal location may include controlling the vehicle to traverse the vehicle transportation network, or a portion thereof, which may be similar to the traversing described in relation to the stop-and-go scenario 5000 shown in FIG. 5, except as described herein, and which may include controlling the vehicle 5100 to traverse the road 5200 toward the intersection 5210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

Controlling the vehicle 5100 to traverse the road 5200 toward the intersection 5210 in accordance with the vehicle control information by controlling the vehicle 5100 to output the semiotic representation of the vehicle control information may include controlling an output device, a portion thereof, or a combination of output devices, or portions thereof, of the vehicle to output the semiotic representation of the vehicle control information, or a portion thereof.

For example, the vehicle control information may include information for controlling the velocity of the vehicle 5100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 5100 to traverse the road 5200 toward the intersection 5210 in accordance with the vehicle control information, which may include using a velocity control unit of the vehicle 5100 as an output device, or a portion thereof, for outputting the semiotic representation, or a portion thereof, by controlling the velocity control unit of the vehicle 5100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by, controlling a deceleration rate, a velocity, the timing of performing a velocity vehicle control action, or a combination thereof.

Controlling the velocity control unit of the vehicle 5100 to output the semiotic representation of the vehicle control information, or a portion thereof, in accordance with the vehicle control information may include controlling the speed of the vehicle 5100, such as by deceleration, or braking, to transition from a current speed of the vehicle 5100, such as 25 miles-per-hour, to stationary state in accordance with the 'Stop' vehicle control action as modified by related vehicle control modification information, which may output at least a portion of the semiotic representation of at least a portion of the vehicle control information indicating that the vehicle is stopping at the intersection 5210.

The vehicle 5100 may include an external luminous presentation unit, the vehicle control information may include information for outputting the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, using the external luminous presentation unit, and controlling the vehicle 5100 to traverse the road 5200 toward the intersection 5210 in accordance with the vehicle control information may include using the external luminous presentation unit of the vehicle 5100 as the output device, or a portion thereof, by controlling the external luminous presentation unit of the vehicle 5100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by illuminating a break light.

Although not expressly shown in FIG. 6, the vehicle 5100 may include an external aural presentation unit, the vehicle control information may include information for outputting the semiotic representation of the vehicle control information, or a portion thereof, using the external aural presentation unit, and controlling the vehicle 5100 to traverse the road 5200 toward the intersection 5210 in accordance with the vehicle control information may include using the external aural presentation unit of the vehicle 5100 as the output device, or a portion thereof, by controlling the external aural presentation unit of the vehicle 5100 to output the semiotic representation of the vehicle control information, or a portion thereof, in accordance with the vehicle control information.

In an example, an expected deceleration period for controlling the vehicle 5100 to become stationary at the intersection 5210 in accordance with the vehicle control information may be three seconds, the value of the 'Stop Signaling Time' vehicle control parameter indicated by the vehicle control information may be 0.85 seconds, and subsequent to initiating deceleration and 0.85 seconds, as indicated by the 'Stop Signaling Time' vehicle control parameter, prior to becoming stationary, the vehicle may output, or being outputting, using the external luminous presentation unit, the semiotic representation of the vehicle control information, or a portion thereof, indicating that the vehicle is currently stopping, such as for the 0.85 seconds indicated by the 'Stop Signaling Time' vehicle control parameter. Other sequences of operations or timing may be used. For example, the vehicle may output the portion of the semiotic representation of the vehicle control information using the external luminous presentation unit prior to controlling the vehicle to decelerate.

The current intention indicator 5600 is shown as including a sequence of three octagons to indicate that traversing the portion of the vehicle transportation network shown in FIG. 6 may include outputting the semiotic representation, or a portion thereof, of controlling the vehicle to perform the 'Stop' vehicle control action using an external luminous presentation unit. The semiotic representation of controlling the vehicle to perform the 'Stop' vehicle control action, or a portion thereof, may be output using the external luminous presentation unit for a temporal period, such as 0.85 seconds, in accordance with the 'Stop Signaling Time' vehicle control parameter corresponding to the identified 'Stop' vehicle control action prior to, or concurrent with, controlling the vehicle to become stationary in accordance with the 'Stop' vehicle control action.

Outputting the semiotic representation of controlling the vehicle to perform the 'Stop' vehicle control action as shown in FIG. 6 may overlap with a stationary period for the vehicle in accordance with the traffic control device 5400, which may include outputting the semiotic representation of controlling the vehicle to perform the 'Stop' vehicle control action for a period greater than the 'Stop Signaling Time' indicated by the vehicle control action, such as a period ending in response to determining a different subsequent vehicle control action as shown in FIG. 7.

The current rationale indicator 5700 is shown as a blank box to indicate that traversing the portion of the vehicle transportation network shown in FIG. 6 may omit outputting a semiotic representation of the current primary vehicle control basis.

In FIG. 7, the stop-and-go scenario 7000 is similar to the stop-and-go scenario 5000 shown in FIG. 5 and the stop-and-go scenario 6000 shown in FIG. 6, except as described herein. For example, in the stop-and-go scenario 7000 shown in FIG. 7, the vehicle 5100 is stationary at the intersection 5210.

Structured multivariate contextual vehicle operation with integrated semiotic control for traversing the stop-and-go scenario 7000 at the third temporal location may include identifying operational environment information, which may be similar to the operational environment information identification described in relation to the stop-and-go scenario 5000 shown in FIG. 5 or the operational environment information identification described in relation to the stop-and-go scenario 6000 shown in FIG. 6, except as described herein.

For example, for traversing the current portion of the vehicle transportation network shown in FIG. 7 at the third temporal location, identifying the operational environment information may include identifying information indicating that the expected path for proceeding by accelerating through the intersection is clear.

Structured multivariate contextual vehicle operation with integrated semiotic control for traversing the stop-and-go scenario 7000 at the third temporal location may include identifying a vehicle control action, which may be similar to the vehicle control action identification described in relation to the stop-and-go scenario 5000 shown in FIG. 5 or the vehicle control action identification described in relation to the stop-and-go scenario 6000 shown in FIG. 6, except as described herein.

For example, for traversing the current portion of the vehicle transportation network shown in FIG. 7 at the third temporal location, a 'Proceed' vehicle control action may be identified, corresponding to controlling the vehicle to proceed by accelerating through the intersection 5210, such as at a defined acceleration rate.

Structured multivariate contextual vehicle operation with integrated semiotic control for traversing the stop-and-go scenario 7000 at the third temporal location may include identifying vehicle control modification information, which may be similar to the vehicle control modification information identification described in relation to the stop-and-go scenario 5000 shown in FIG. 5 or the vehicle control modification information identification described in relation to the stop-and-go scenario 6000 shown in FIG. 6, except as described herein.

For example, traversing the current portion of the vehicle transportation network shown in FIG. 7 at the third temporal location may include identifying vehicle control modification information for a 'Proceed Signaling' vehicle control parameter corresponding to the identified 'Proceed' vehicle control action, which may indicate whether to output a semiotic representation of an operational state of the vehicle concurrent with controlling the vehicle to traverse the current portion of the vehicle transportation network in accordance with the identified 'Proceed' vehicle control action.

In an example, the 'Proceed Signaling' vehicle control parameter corresponding to the identified 'Proceed' vehicle control action may have a value of 'False', 0, 'omit', 'do not show', or another value indicating that outputting a semiotic representation of an operational state of the vehicle concurrent with controlling the vehicle to traverse the current portion of the vehicle transportation network in accordance with the identified 'Proceed' vehicle control action may be omitted. Although not shown in FIG. 7, the 'Proceed Signaling' vehicle control parameter corresponding to the identified 'Proceed' vehicle control action may have a value of 'True', 1, 'include', 'show', or another value indicating that a semiotic representation of an operational state of the vehicle concurrent with controlling the vehicle to traverse the current portion of the vehicle transportation network in accordance with the identified 'Proceed' vehicle control action may be output.

In another example, identifying the vehicle control modification information may include identifying defined vehicle control information indicating a defined 'Proceed Signaling' vehicle control parameter of 'True' corresponding to the identified 'Proceed' vehicle control action, identifying vehicle control modification information corresponding to the dark or nighttime illumination state indicating a 'Proceed Signaling' vehicle control modifier of 'True' corresponding to the identified 'Proceed' vehicle control action, identifying vehicle control modification information corresponding to the dry or clear weather or precipitation state indicating a 'Proceed Signaling' vehicle control modifier of 'True' corresponding to the identified 'Proceed' vehicle control action, identifying vehicle control modification information corresponding to the residential neighborhood indicating a 'Proceed Signaling' vehicle control modifier of 'True' corresponding to the identified 'Proceed' vehicle control action, identifying vehicle control modification information corresponding to the omission of external objects indicating a 'Proceed Signaling' vehicle control modifier of 'False' corresponding to the identified 'Proceed' vehicle control action, identifying vehicle control modification information corresponding to the omission of external activities indicating a 'Proceed Signaling' vehicle control modifier of 'False' corresponding to the identified 'Proceed' vehicle control action, identifying vehicle control modification information corresponding to the user configuration information indicating high vehicle control optimization priority indicating a 'Proceed Signaling' vehicle control modifier of 'False' corresponding to the identified 'Proceed' vehicle control action, and identifying vehicle control modification information corresponding to the combination of the dark or nighttime illumination state, the residential neighborhood, the absence of external objects, and the uneventful state indicating a 'Proceed Signaling' vehicle control conditional constraint modifier of 'False' corresponding to the identified 'Proceed' vehicle control action.

Structured multivariate contextual vehicle operation with integrated semiotic control for traversing the stop-and-go scenario 7000 at the third temporal location may include identifying vehicle control information, which may be similar to the vehicle control information identification described in relation to the stop-and-go scenario 5000 shown in FIG. 5 or the vehicle control information identification described in relation to the stop-and-go scenario 6000 shown in FIG. 6, except as described herein.

For example, for traversing the current portion of the vehicle transportation network shown in FIG. 7 at the third temporal location, identifying the vehicle control information may include identifying a value, such as 'False', of the 'Proceed Signaling' vehicle control parameter corresponding to the identified 'Proceed' vehicle control action, such as based on a combination of the defined 'Proceed Signaling' vehicle control parameter value of 'False' corresponding to the identified 'Proceed' vehicle control action, the dark or nighttime illumination state 'Proceed Signaling' vehicle control modifier of 'True' corresponding to the identified 'Proceed' vehicle control action, the dry or clear weather or precipitation state 'Proceed Signaling' vehicle control modifier of 'True' corresponding to the identified 'Proceed' vehicle control action, the residential neighborhood 'Proceed Signaling' vehicle control modifier of 'True' corresponding to the identified 'Proceed' vehicle control action, the omission of external objects 'Proceed Signaling' vehicle control modifier of 'False' corresponding to the identified 'Proceed' vehicle control action, the omission of external activities 'Proceed Signaling' vehicle control modifier of 'False' corresponding to the identified 'Proceed' vehicle control action, the high vehicle control optimization priority 'Proceed Signaling' vehicle control modifier of 'False' corresponding to the identified 'Proceed' vehicle control action, and the 'Proceed Signaling' vehicle control conditional constraint modifier of 'False' corresponding to the identified 'Proceed' vehicle control action for the combination of the dark or nighttime illumination state, the residential neighborhood, the absence of external objects, and the uneventful state.

Structured multivariate contextual vehicle operation with integrated semiotic control for traversing the stop-and-go scenario 7000 at the third temporal location may include controlling the vehicle to traverse the vehicle transportation network, or a portion thereof, which may be similar to the traversing described in relation to the stop-and-go scenario 5000 shown in FIG. 5 or the traversing described in relation to the stop-and-go scenario 6000 shown in FIG. 6, except as described herein, and which may include controlling the vehicle 5100 to traverse the road 5200 through the intersection 5210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 5100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 5100 to traverse the road 5200 through the intersection 5210 in accordance with the vehicle control information, which may include using a velocity control unit of the vehicle 5100 as an output device, or a portion thereof, for outputting the semiotic representation, or a portion thereof, by controlling the velocity control unit of the vehicle 5100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 5100 to output the semiotic representation of the vehicle control information, or a portion thereof, in accordance with the vehicle control information may include controlling the speed of the vehicle 5100, such as by accelerating to transition from a stationary state of the vehicle 5100 to a defined operational speed in accordance with the 'Proceed' vehicle control action as modified by related vehicle control modification information, such as 25 miles-per-hour, which may output at least a portion of the semiotic representation of at least a portion of the vehicle control information indicating that the vehicle is proceeding through the intersection 5210.

In FIG. 7, the current intention indicator 5600 is shown as including three directional indicators to indicate that traversing the portion of the vehicle transportation network shown in FIG. 7 may include outputting a portion of the semiotic representation of controlling the vehicle 5100 to perform the 'Proceed' vehicle control action using the external luminous presentation unit of the vehicle 5100.

The portion of the semiotic representation of controlling the vehicle 5100 to perform the 'Proceed' vehicle control action output using the external luminous presentation unit may be output using the external luminous presentation unit for a temporal period, which may be concurrent with a temporal period for outputting the portion of the semiotic representation of controlling the vehicle 5100 to perform the 'Proceed' vehicle control action output by controlling the velocity of the vehicle 5100.

A current rationale indicator 5700 is shown as a blank box to indicate that traversing the portion of the vehicle transportation network shown in FIG. 7 may omit outputting a semiotic representation of a current primary vehicle control basis.

Although not shown in FIG. 7, subsequent to traversing the intersection 5210 the vehicle 5100 may cease outputting the semiotic representation of the vehicle control information.

FIG. 8, FIG. 9, FIG. 10, FIG. 11, and FIG. 12 are a sequence of diagrams of an example of structured multivariate contextual vehicle operation with integrated semiotic control for traversing a yield-stop scenario in accordance with implementations of this disclosure. In FIG. 8, FIG. 9, FIG. 10, FIG. 11, and FIG. 12 some aspects of structured multivariate contextual vehicle operation with integrated semiotic control for traversing a yield-stop scenario are shown and other aspects are omitted for simplicity and clarity.

Figure 8:
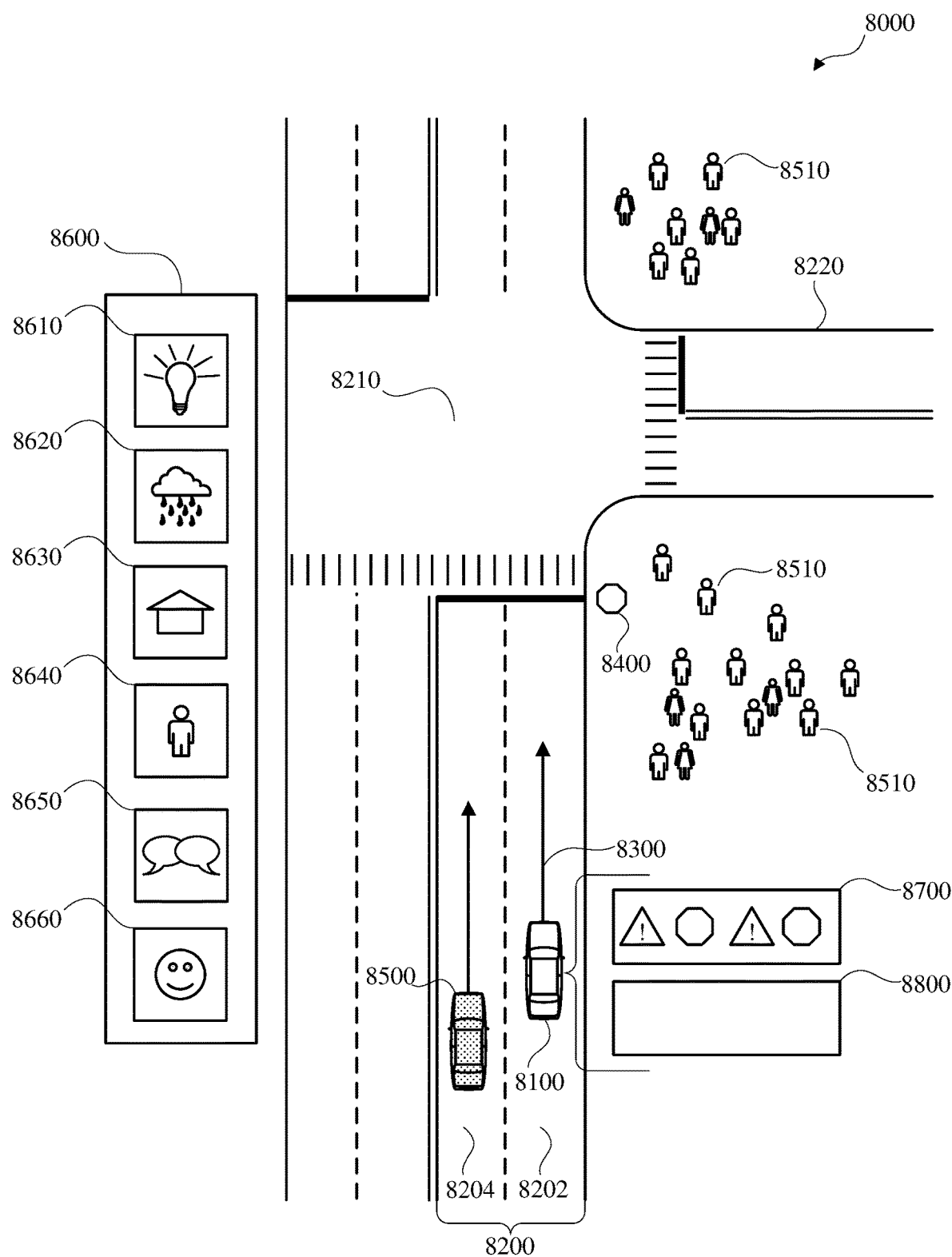
FIG. 8 is a diagram, corresponding to a first temporal location, from a sequence of diagrams of an example of structured multivariate contextual vehicle operation with integrated semiotic control for traversing a yield-stop scenario in accordance with implementations of this disclosure.
Figure 9:
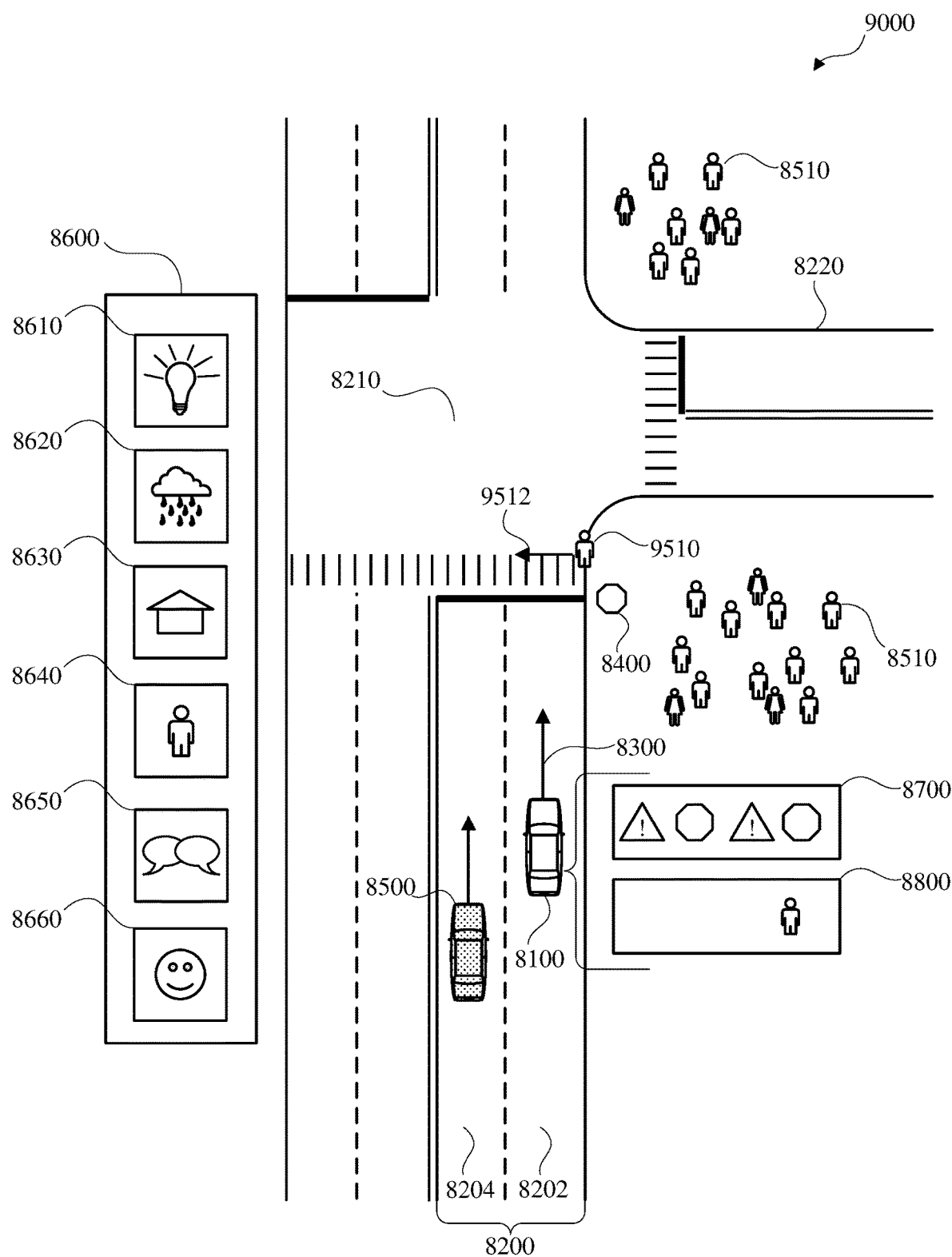
FIG. 9 is a diagram, corresponding to a second temporal location, from a sequence of diagrams of an example of structured multivariate contextual vehicle operation with integrated semiotic control for traversing a yield-stop scenario in accordance with implementations of this disclosure.
Figure 10:
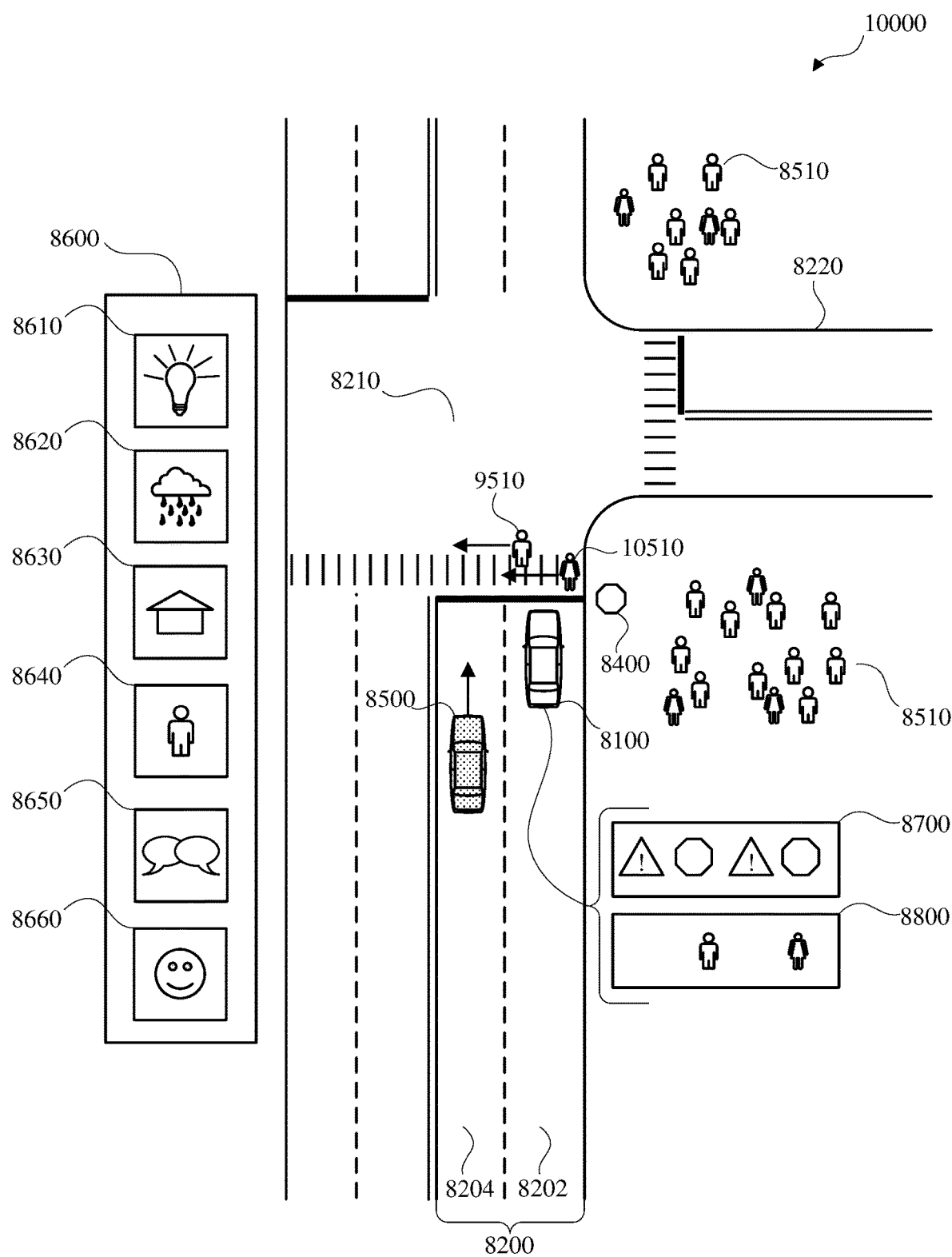
FIG. 10 is a diagram, corresponding to a third temporal location, from a sequence of diagrams of an example of structured multivariate contextual vehicle operation with integrated semiotic control for traversing a yield-stop scenario in accordance with implementations of this disclosure.
Figure 11:
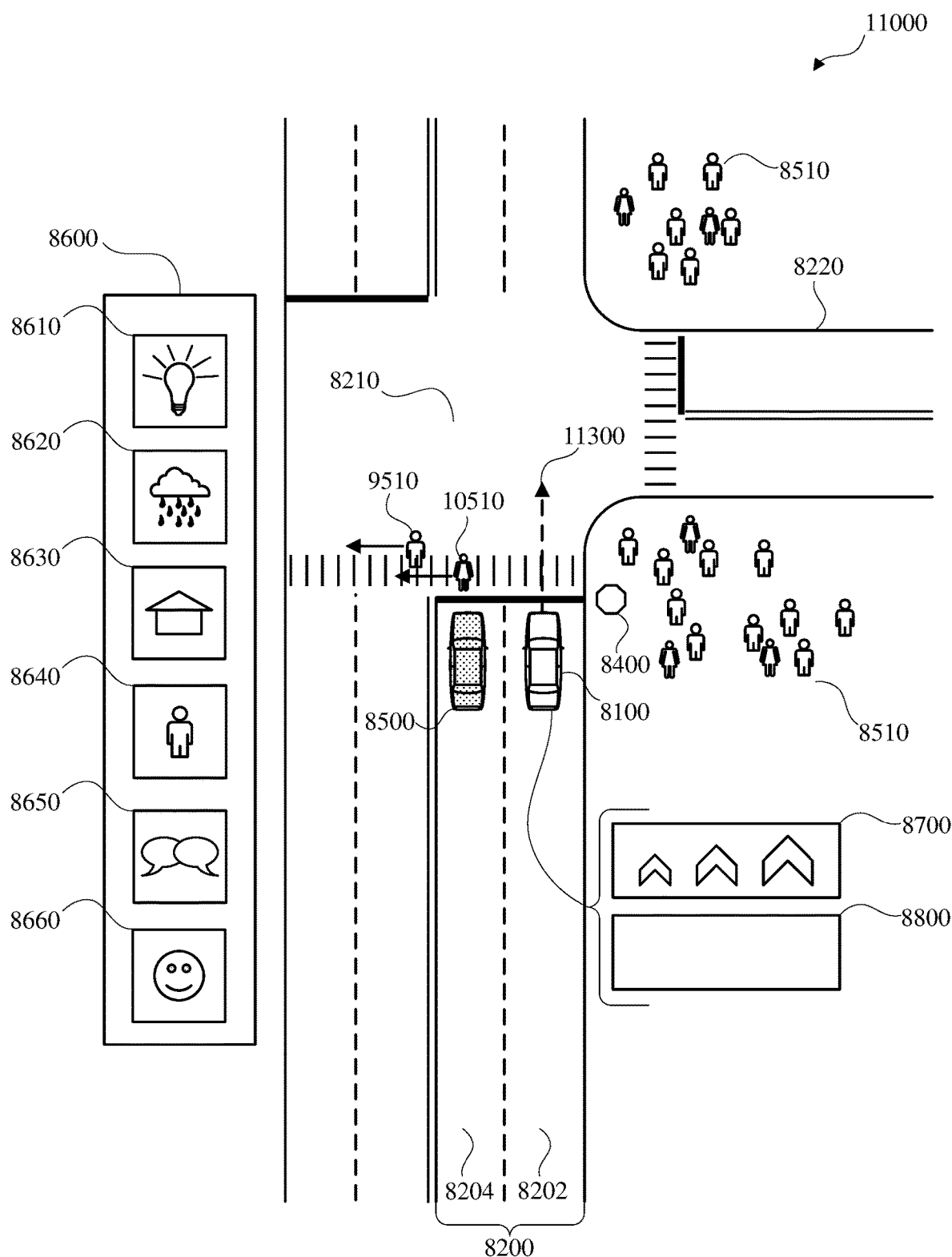
FIG. 11 is a diagram, corresponding to a fourth temporal location, from a sequence of diagrams of an example of structured multivariate contextual vehicle operation with integrated semiotic control for traversing a yield-stop scenario in accordance with implementations of this disclosure.
Figure 12:
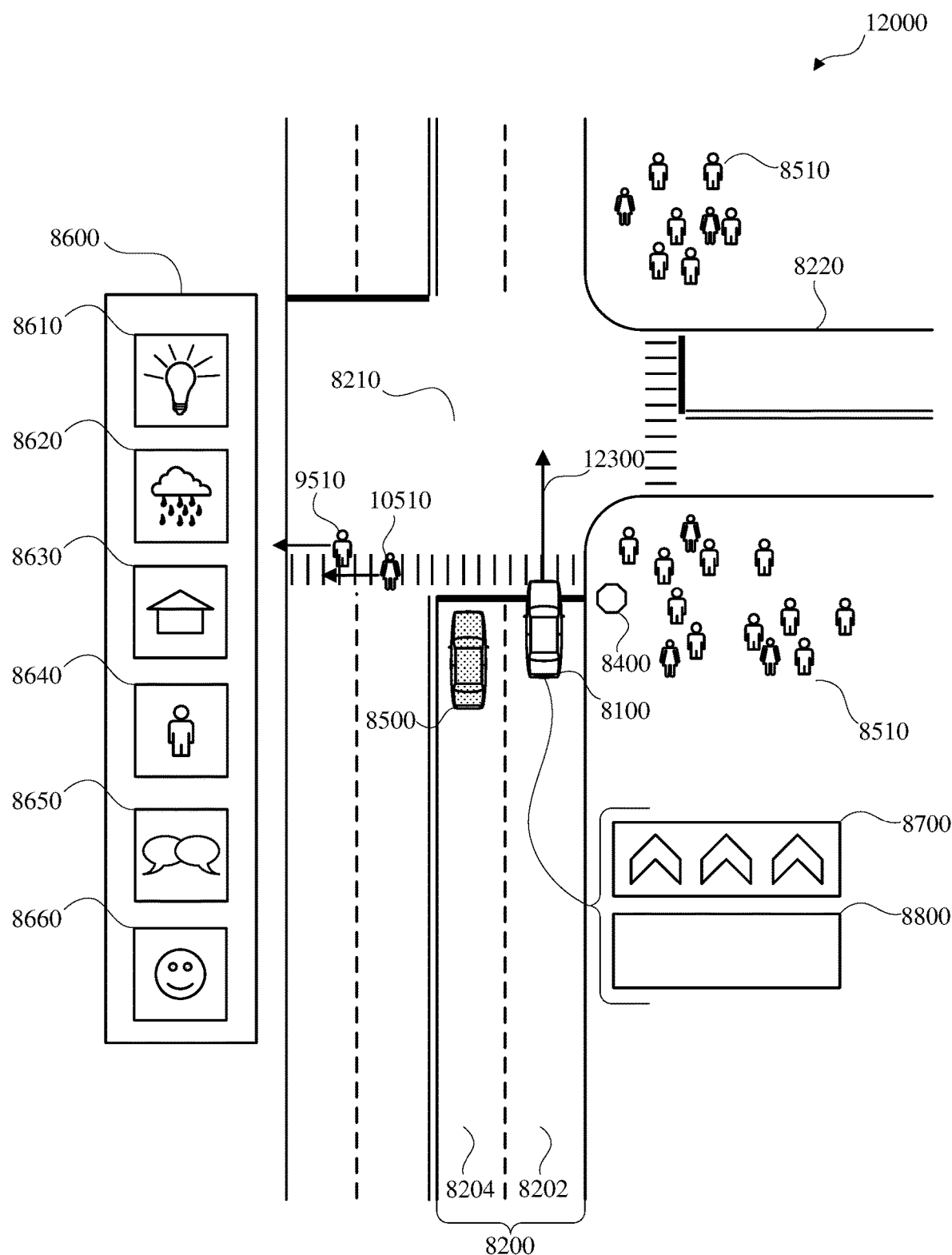
FIG. 12 is a diagram, corresponding to a fifth temporal location, from a sequence of diagrams of an example of structured multivariate contextual vehicle operation with integrated semiotic control for traversing a yield-stop scenario in accordance with implementations of this disclosure.

FIG. 8 is a diagram of the example of structured multivariate contextual vehicle operation with integrated semiotic control for traversing the yield-stop scenario at a first temporal location. FIG. 9 is a diagram of the example of structured multivariate contextual vehicle operation with integrated semiotic control for traversing the yield-stop scenario at a second temporal location that is subsequent to the first temporal location shown in FIG. 8. FIG. 10 is a diagram of the example of structured multivariate contextual vehicle operation with integrated semiotic control for traversing the yield-stop scenario at a third temporal location that is subsequent to the second temporal location shown in FIG. 9. FIG. 11 is a diagram of the example of structured multivariate contextual vehicle operation with integrated semiotic control for traversing the yield-stop scenario at a fourth temporal location that is subsequent to the third temporal location shown in FIG. 10. FIG. 12 is a diagram of the example of structured multivariate contextual vehicle operation with integrated semiotic control for traversing the yield-stop scenario at a fifth temporal location that is subsequent to the fourth temporal location shown in FIG. 11.

In FIG. 8, the yield-stop scenario 8000 includes a vehicle 8100, such as the vehicle 1000 shown in FIG. 1, one of the vehicles 2100/2110 shown in FIG. 2, or any other vehicle implementing structured multivariate contextual vehicle operation with integrated semiotic control, such as an autonomous vehicle, a semi-autonomous vehicle, or any other vehicle implementing autonomous driving, traversing a portion of a current road 8200 in a first lane 8202, adjacent to a second lane 8204, approaching an intersection 8210 with an intersecting road 8220. A current expected path 8300 for the vehicle 8100 is shown using a solid directional line, indicating that a current velocity of the vehicle 8100 is such that the vehicle moving towards the intersection 8210. The yield-stop scenario 8000 includes a traffic control device 8400 for the intersection, a remote vehicle 8500 external object traveling along the road 8200 toward the intersection 8210 in the second lane 8204, and pedestrian 8510 external objects.

Structured multivariate contextual vehicle operation with integrated semiotic control for traversing the yield-stop scenario 8000 at the first temporal location may include identifying operational environment information, which may be similar to the operational environment information identification shown at 4100 in FIG. 4, except as described herein.

For example, traversing the current portion of the vehicle transportation network shown in FIG. 8 at the first temporal location may include identifying operational environment information indicating that the current operational environment has a bright or daytime illumination state, has a wet or rainy weather or precipitation state, includes a residential neighborhood, includes external objects, includes external activities, and includes user configuration information indicating low vehicle control optimization priority.

Identifying the operational environment information may include identifying external activity information, such as social media information, indicating a concert in a residential neighborhood park proximate to, such as adjacent to, the road 8200, and temporally concurrent with, or proximate to, a current temporal location.

Aspects of the current operational environment are indicated at 8600. For example, the bright or daytime illumination state is indicated at 8610, the wet or rainy weather or precipitation state is indicated at 8620, the residential neighborhood is indicated at 8630, the presence of external objects is indicated at 8640, the occurrence of external activities is indicated at 8650, and user configuration information indicating low vehicle control optimization priority is indicated at 8660. The indications 8610, 8620, 8630, 8640, 8650, 8660 are shown for simplicity and clarity of explanation.

Structured multivariate contextual vehicle operation with integrated semiotic control for traversing the yield-stop scenario 8000 at the first temporal location may include identifying a vehicle control action, which may be similar to the vehicle control action identification shown at 4200 in FIG. 4, except as described herein.

For example, for traversing the current portion of the vehicle transportation network shown in FIG. 8 at the first temporal location, a 'Yield-Stop' vehicle control action may be identified, corresponding to controlling the vehicle to become stationary in accordance with the traffic control device 8400 at the intersection 8210 and in accordance with the determination that the operational environment includes pedestrians that may affect the operation of the vehicle, such as at a defined deceleration rate or over a defined deceleration period. For example, the defined deceleration period for controlling the vehicle to become stationary in accordance with the 'Yield-Stop' vehicle control action may be longer than a defined deceleration period for controlling the vehicle to become stationary in accordance with a 'Stop' vehicle control action as shown in FIGS. 5-7.

Structured multivariate contextual vehicle operation with integrated semiotic control for traversing the yield-stop scenario 8000 at the first temporal location may include identifying vehicle control modification information, which may be similar to the vehicle control modification information identification shown at 4300 in FIG. 4, except as described herein.

For example, traversing the current portion of the vehicle transportation network shown in FIG. 8 at the first temporal location may include identifying vehicle control modification information for a 'Yield-Stop Signaling Time' vehicle control parameter corresponding to the identified 'Yield-Stop' vehicle control action, which may indicate a temporal period for outputting a semiotic representation of an operational state of the vehicle concurrent with controlling the vehicle to traverse the current portion of the vehicle transportation network in accordance with the identified 'Yield-Stop' vehicle control action.

In an example, identifying the vehicle control modification information may include identifying defined vehicle control information indicating a defined 'Yield-Stop Signaling Time' vehicle control parameter of 2.5 corresponding to the identified 'Yield-Stop' vehicle control action, identifying vehicle control modification information corresponding to the bright or daytime illumination state indicating a 'Yield-Stop Signaling Time' vehicle control modifier of +0.0 corresponding to the identified 'Yield-Stop' vehicle control action, identifying vehicle control modification information corresponding to the wet or rainy weather or precipitation state indicating a 'Yield-Stop Signaling Time' vehicle control modifier of +0.3 corresponding to the identified 'Yield-Stop' vehicle control action, identifying vehicle control modification information corresponding to the residential neighborhood indicating a 'Yield-Stop Signaling Time' vehicle control modifier of +0.2 corresponding to the identified 'Yield-Stop' vehicle control action, identifying vehicle control modification information corresponding to the presence of external objects indicating a 'Yield-Stop Signaling Time' vehicle control modifier of +0.1 corresponding to the identified 'Yield-Stop' vehicle control action, identifying vehicle control modification information corresponding to the presence of external activities indicating a 'Yield-Stop Signaling Time' vehicle control modifier of +0.15 corresponding to the identified 'Yield-Stop' vehicle control action, and identifying vehicle control modification information corresponding to the user configuration information indicating low vehicle control optimization priority indicating a 'Yield-Stop Signaling Time' vehicle control modifier of +0.05 corresponding to the identified 'Yield-Stop' vehicle control action.

Structured multivariate contextual vehicle operation with integrated semiotic control for traversing the yield-stop scenario 8000 at the first temporal location may include identifying vehicle control information, which may be similar to the vehicle control information identification shown at 4400 in FIG. 4, except as described herein.

For example, for traversing the current portion of the vehicle transportation network shown in FIG. 8 at the first temporal location, identifying the vehicle control information may include identifying a value of the 'Yield-Stop Signaling Time' vehicle control parameter corresponding to the identified 'Yield-Stop' vehicle control action, such as based on a combination, such as a sum, of the defined 'Yield-Stop Signaling Time' vehicle control parameter value of 2.5 corresponding to the identified 'Yield-Stop' vehicle control action, the bright or daytime illumination state 'Yield-Stop Signaling Time' vehicle control modifier of +0.0 corresponding to the identified 'Yield-Stop' vehicle control action, the wet or rainy weather or precipitation state 'Yield-Stop Signaling Time' vehicle control modifier of +0.3 corresponding to the identified 'Yield-Stop' vehicle control action, the residential neighborhood 'Yield-Stop Signaling Time' vehicle control modifier of +0.2 corresponding to the identified 'Yield-Stop' vehicle control action, the presence of external objects 'Yield-Stop Signaling Time' vehicle control modifier of +0.1 corresponding to the identified 'Yield-Stop' vehicle control action, the presence of external activities 'Yield-Stop Signaling Time' vehicle control modifier of +0.15 corresponding to the identified 'Yield-Stop' vehicle control action, and the user configuration information indicating low vehicle control optimization priority 'Yield-Stop Signaling Time' vehicle control modifier of +0.05 corresponding to the identified 'Yield-Stop' vehicle control action, which may be 3.3.

Structured multivariate contextual vehicle operation with integrated semiotic control for traversing the yield-stop scenario 8000 at the first temporal location may include controlling the vehicle to traverse the vehicle transportation network, or a portion thereof, which may be similar to the traversing shown at 4500 in FIG. 4, except as described herein, and which may include controlling the vehicle 8100 to traverse the road 8200 toward the intersection 8210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 8100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 8100 to traverse the road 8200 toward the intersection 8210 in accordance with the vehicle control information, which may include using a velocity control unit of the vehicle 8100 as an output device, or a portion thereof, for outputting the semiotic representation, or a portion thereof, by controlling the velocity control unit of the vehicle 8100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling a deceleration rate, a velocity, the timing of performing a velocity vehicle control action, or a combination thereof.

Controlling the velocity control unit of the vehicle 8100 to output the semiotic representation of the vehicle control information, or a portion thereof, in accordance with the vehicle control information may include controlling velocity of the vehicle 8100, such as by decelerating, or braking, at a defined deceleration rate to transition from a current operating speed of the vehicle 8100 to a stationary state at the intersection 8210 in accordance with the 'Yield-Stop' vehicle control action as modified by related vehicle control modification information, which may output at least a portion of the semiotic representation of at least a portion of the vehicle control information indicating that the vehicle is stopping at the intersection 8120 in accordance with the traffic control device 8400.

The deceleration rate associated with the 'Stop' vehicle control action as modified by related vehicle control modification information for traversing the current portion of the vehicle transportation network corresponding to the stop-and-go scenario 6000 shown in FIG. 6 may exceed the deceleration rate associated with the 'Yield-Stop' vehicle control action as modified by related vehicle control modification information for traversing the current portion of the vehicle transportation network corresponding to the yield-stop scenario 8000 shown in FIG. 8.

In an example, an expected deceleration period for controlling the vehicle 8100 to becoming stationary at the intersection 8210 in accordance with the vehicle control information may be three seconds, the value of the 'Yield-Stop Signaling Time' vehicle control parameter indicated by the vehicle control information may be 3.3 seconds, and prior to initiating deceleration and 3.3 seconds prior to becoming stationary, as indicated by the 'Yield-Stop Signaling Time' vehicle control parameter, the vehicle 8100 may output, or being outputting, the semiotic representation of the vehicle control information using an external luminous presentation unit of the vehicle 8100 to indicate the imminent or expected operational state of the vehicle 8100 corresponding to controlling the vehicle 8100 in accordance with the 'Yield-Stop' vehicle control action.

For example, the vehicle 8100 may output the semiotic representation of yielding and stopping for the 3.3 seconds indicated by the 'Yield-Stop Signaling Time' vehicle control parameter using the external luminous presentation unit of the vehicle 8100 prior to becoming stationary at the intersection 8210. Other sequences of operations or timing may be used.

Although the expected deceleration period described in relation to the yield-stop scenario 8000 shown in FIG. 8 is similar to the expected deceleration period described in relation to the stop-and-go scenario 6000 shown in FIG. 6, the 'Yield-Stop Signaling Time' vehicle control parameter of 3.3 seconds described in relation to the yield-stop scenario 8000 shown in FIG. 8 is significantly greater than the 'Stop Signaling Time' vehicle control parameter of 0.85 seconds described in relation to the stop-and-go scenario 6000 shown in FIG. 6.

In FIG. 8, the current intention indicator 8700 is shown as including a sequence of stop indicators and yield indicators to indicate that traversing the portion of the vehicle transportation network shown in FIG. 8 may include outputting a portion of the semiotic representation of controlling the vehicle 8100 to perform the 'Yield-Stop' vehicle control action using the external luminous presentation unit of the vehicle 8100 to indicate the imminent or expected operational state of the vehicle 8100 corresponding to controlling the vehicle 8100 in accordance with the 'Yield-Stop' vehicle control action.

The portion of the semiotic representation of controlling the vehicle 8100 to perform the 'Yield-Stop' vehicle control action output using the external luminous presentation unit may be output using the external luminous presentation unit for a temporal period, such as 3.3 seconds, which may overlap with a temporal period for outputting the portion of the semiotic representation of controlling the vehicle 8100 to perform the 'Yield-Stop' vehicle control action output by controlling the velocity of the vehicle 8100 by decelerating.

For example, a portion of the temporal period for outputting the portion of the semiotic representation of controlling the vehicle 8100 to perform the 'Yield-Stop' vehicle control action output using the external luminous presentation unit may precede the temporal period for outputting the portion of the semiotic representation of controlling the vehicle 8100 to perform the 'Yield-Stop' vehicle control action output by controlling the velocity of the vehicle 8100, and a portion of the temporal period for outputting the portion of the semiotic representation of controlling the vehicle 8100 to perform the 'Yield-Stop' vehicle control action output using the external luminous presentation unit may be concurrent with the temporal period for outputting the portion of the semiotic representation of controlling the vehicle 8100 to perform the 'Yield-Stop' vehicle control action output by controlling the velocity of the vehicle 8100.

A current rationale indicator 8800 is shown as a blank box to indicate that traversing the portion of the vehicle transportation network shown in FIG. 8 may omit outputting a semiotic representation of the current primary vehicle control basis.

In FIG. 9, the yield-stop scenario 9000 is similar to the yield-stop scenario 8000 shown in FIG. 8, except as described herein. For example, in the yield-stop scenario 9000 shown in FIG. 9, the vehicle 8100 is approaching the intersection 8210.

Structured multivariate contextual vehicle operation with integrated semiotic control for traversing the yield-stop scenario 9000 at the second temporal location may include identifying operational environment information, which may be similar to the operational environment information identification described in relation to the yield-stop scenario 8000 shown in FIG. 8, except as described herein.

For example, for traversing the current portion of the vehicle transportation network shown in FIG. 9 at the second temporal location, identifying the operational environment information may include identifying operational environment information indicating that a first pedestrian 9510 has an expected path 9512 indicating that the first pedestrian 9510 is crossing the intersection 8210, or otherwise determining that a probability of convergence between the first pedestrian 9510 and the vehicle 8100 exceeds a defined warning threshold.

Structured multivariate contextual vehicle operation with integrated semiotic control for traversing the yield-stop scenario 9000 at the second temporal location may include identifying a vehicle control action, which may be similar to the vehicle control action identification described in relation to the yield-stop scenario 8000 shown in FIG. 8, except as described herein.

For example, for traversing the current portion of the vehicle transportation network shown in FIG. 9 at the second temporal location, a 'Yield-Stop' vehicle control action may be identified, corresponding to controlling the vehicle 8100 to become stationary in accordance with the traffic control device 8400 at the intersection 8210.

Identifying the 'Yield-Stop' vehicle control action may be similar to identifying the 'Yield-Stop' vehicle control action as described in relation to the yield-stop scenario 8000 shown in FIG. 8, except as described herein. For example, identifying the 'Yield-Stop' vehicle control action as described in relation to the yield-stop scenario 9000 shown in FIG. 9 may include identifying a primary vehicle control basis in accordance with the determination that the first pedestrian 9510 is crossing the intersection 8210, or that the probability of convergence between the first pedestrian 9510 and the vehicle 8100 exceeds the defined warning threshold.

Structured multivariate contextual vehicle operation with integrated semiotic control for traversing the yield-stop scenario 9000 at the second temporal location may include identifying vehicle control modification information, which may be similar to the vehicle control modification information identification described in relation to the yield-stop scenario 8000 shown in FIG. 8, except as described herein.

For example, traversing the current portion of the vehicle transportation network shown in FIG. 9 at the second temporal location may include identifying one or more parameters for outputting a semiotic representation of the primary vehicle control basis, such as a 'Yield-Stop Show Rational' vehicle control parameter corresponding to the identified 'Yield-Stop' vehicle control action, the primary vehicle control basis, or both.

Structured multivariate contextual vehicle operation with integrated semiotic control for traversing the yield-stop scenario 9000 at the second temporal location may include identifying vehicle control information, which may be similar to the vehicle control information identification described in relation to the yield-stop scenario 8000 shown in FIG. 8, except as described herein.

For example, for traversing the current portion of the vehicle transportation network shown in FIG. 9 at the second temporal location, identifying the vehicle control information may include identifying one or more parameters for outputting the semiotic representation of the primary vehicle control basis, such as a value of the 'Yield-Stop Show Rational' vehicle control parameter corresponding to the identified 'Yield-Stop' vehicle control action, the primary vehicle control basis, or both.

Identifying the vehicle control information for traversing the yield-stop scenario 9000 at the second temporal location may include identifying values for the 'Yield-Stop Show Rational' vehicle control parameters corresponding to the identified 'Yield-Stop' vehicle control action, such as based on a combination of defined 'Yield-Stop Show Rational' vehicle control parameter values corresponding to the identified 'Yield-Stop' vehicle control action, bright or daytime illumination state 'Yield-Stop Show Rational' vehicle control modifiers corresponding to the identified 'Yield-Stop' vehicle control action, wet or rainy weather or precipitation state 'Yield-Stop Show Rational' vehicle control modifiers corresponding to the identified 'Yield-Stop' vehicle control action, residential neighborhood 'Yield-Stop Show Rational' vehicle control modifiers corresponding to the identified 'Yield-Stop' vehicle control action, inclusion of external objects 'Yield-Stop Show Rational' vehicle control modifiers corresponding to the identified 'Yield-Stop' vehicle control action, inclusion of external activities 'Yield-Stop Show Rational' vehicle control modifiers corresponding to the identified 'Yield-Stop' vehicle control action, and low vehicle control optimization priority vehicle control modifiers corresponding to the identified 'Yield-Stop' vehicle control action.

Identifying the vehicle control information for traversing the yield-stop scenario 9000 at the second temporal location may include determining whether to output a semiotic representation of the primary vehicle control basis, which may include determining whether the remote vehicle 8500, or another external object, detected within the operational environment is oriented with respect to the vehicle 9100 such that controlling the vehicle 9100 to traverse the portion of the vehicle transportation network shown in FIG. 9 in accordance with the vehicle control information may affect the operation of the remote vehicle 8500, or other external object, within the operational environment by limiting the operational environment information available to the remote vehicle 8500, or other external object, or a driver or operator thereof.

For example, controlling the vehicle 8100 to traverse the vehicle transportation network, or a portion thereof, in accordance with the vehicle control information may include determining that the relative orientation of the pedestrian 9510, the vehicle 8100, and the remote vehicle 8500, is such that the operational environment information available to the remote vehicle 8500 may be limited by controlling the vehicle 9100 to traverse the portion of the vehicle transportation network shown in FIG. 9 in accordance with the vehicle control information, which may affect the operation of the remote vehicle 8500 within the operational environment by reducing a probability the pedestrian 9510, or the expected path 9512 of the pedestrian 9510, may be identified or detected by the remote vehicle 8500, or a driver or operator thereof.

Structured multivariate contextual vehicle operation with integrated semiotic control for traversing the yield-stop scenario 9000 at the second temporal location may include controlling the vehicle to traverse the vehicle transportation network, or a portion thereof, which may be similar to the traversal described in relation to the yield-stop scenario 8000 shown in FIG. 8, except as described herein, and which may include controlling the vehicle 8100 to traverse the road 8200 toward the intersection 8210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 8100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 8100 to continue to traverse the road 8200 toward the intersection 8210 in accordance with the vehicle control information, which may include using a velocity control unit of the vehicle 8100 as an output device, or a portion thereof, for outputting the semiotic representation, or a portion thereof, by controlling the velocity control unit of the vehicle 8100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling a deceleration rate, a velocity, the timing of performing a velocity vehicle control action, or a combination thereof.

Controlling the velocity control unit of the vehicle 8100 to output the semiotic representation of the vehicle control information, or a portion thereof, in accordance with the vehicle control information may include controlling velocity of the vehicle 8100, such as by continuing to decelerate at the defined deceleration rate to transition from the operating speed of the vehicle 8100 to a stationary state at the intersection 8210 in accordance with the 'Yield-Stop' vehicle control action as modified by related vehicle control modification information, which may output at least a portion of the semiotic representation of at least a portion of the vehicle control information indicating that the vehicle is yielding to the pedestrian 9510 and stopping at the intersection 8120 in accordance with the traffic control device 8400.

In FIG. 9, the current intention indicator 8700 is shown as including the sequence of stop indicators and yield indicators to indicate that traversing the portion of the vehicle transportation network shown in FIG. 9 may include continuing to output a portion of the semiotic representation of controlling the vehicle 8100 to perform the 'Yield-Stop' vehicle control action using the external luminous presentation unit of the vehicle 8100 to indicate the imminent or expected operational state of the vehicle 8100 corresponding to controlling the vehicle 8100 in accordance with the 'Yield-Stop' vehicle control action.

The portion of the semiotic representation of controlling the vehicle 8100 to perform the 'Yield-Stop' vehicle control action output using the external luminous presentation unit may be output using the external luminous presentation unit for a temporal period, which may be concurrent with a temporal period for outputting the portion of the semiotic representation of controlling the vehicle 8100 to perform the 'Yield-Stop' vehicle control action output by controlling the velocity of the vehicle 8100 by decelerating.

Controlling the vehicle 8100 to traverse the road 8200 toward the intersection 8210 in accordance with the vehicle control information may include controlling the vehicle 8100 to output a semiotic representation of the primary vehicle control basis. For example, the current rationale indicator 8800 is shown as including a representation of a pedestrian corresponding to the pedestrian indicated by the current primary vehicle control basis. The relative position of the pedestrian indicator in the current rationale indicator 8800 may correspond to the location of the pedestrian in the vehicle transportation network relative to the vehicle.

In FIG. 10, the yield-stop scenario 10000 is similar to the yield-stop scenario 8000 shown in FIG. 8 and the yield-stop scenario 9000 shown in FIG. 9 except as described herein. For example, in the yield-stop scenario 10000 shown in FIG. 10, the vehicle 8100 is stationary at the intersection 8210.

Structured multivariate contextual vehicle operation with integrated semiotic control for traversing the yield-stop scenario 10000 at the third temporal location may include identifying operational environment information, which may be similar to the operational environment information identification described in relation to the yield-stop scenario 8000 shown in FIG. 8 or the operational environment information identification described in relation to the yield-stop scenario 9000 shown in FIG. 9, except as described herein.

For example, for traversing the current portion of the vehicle transportation network shown in FIG. 10 at the third temporal location, identifying the operational environment information may include identifying that the first pedestrian 9510 is blocking the vehicle 8100, which may indicate that the first pedestrian 9510 is in the intersection 8210 and has an expected path 9512 indicating that the first pedestrian 9510 is crossing the intersection 8210, or otherwise determining that a probability that a current or expected spatiotemporal location of the first pedestrian 9510 is convergent with an expected spatiotemporal location of the vehicle 8100 corresponding to concurrently proceeding through the intersection exceeds a defined threshold.

Identifying the operational environment information may include identifying that a second pedestrian 10510 is blocking the vehicle 8100, which may indicate that the second pedestrian 10510 is crossing the intersection 8210, or otherwise determining that a probability that a current or expected spatiotemporal location of the second pedestrian 10510 is convergent with an expected spatiotemporal location of the vehicle 8100 corresponding to concurrently proceeding through the intersection exceeds the defined threshold.

Structured multivariate contextual vehicle operation with integrated semiotic control for traversing the yield-stop scenario 10000 at the third temporal location may include identifying a vehicle control action, which may be similar to the vehicle control action identification described in relation to the yield-stop scenario 8000 shown in FIG. 8 or the vehicle control action identification described in relation to the yield-stop scenario 9000 shown in FIG. 9, except as described herein.

For example, for traversing the current portion of the vehicle transportation network shown in FIG. 10 at the third temporal location, a 'Yield-Wait' vehicle control action may be identified, corresponding to controlling the vehicle 8100 to remain stationary in accordance with the traffic control device 8400 at the intersection 8210 and in accordance with the determination that the probability that the current or expected respective spatiotemporal location of the first pedestrian 9510, the second pedestrian 10510, or both, is convergent with an expected spatiotemporal location of the vehicle 8100 corresponding to concurrently proceeding through the intersection exceeds the defined threshold.

Identifying the 'Yield-Wait' vehicle control action may include identifying a primary vehicle control basis in accordance with the determination that the first pedestrian 9510 is crossing the intersection 8210, the determination that the second pedestrian 10510 is crossing the intersection 8210, or both, or that the probability that the current or expected respective spatiotemporal location of the first pedestrian 9510, the second pedestrian 10510, or both, is convergent with an expected spatiotemporal location of the vehicle 8100 corresponding to concurrently proceeding through the intersection exceeds the defined threshold.

Structured multivariate contextual vehicle operation with integrated semiotic control for traversing the yield-stop scenario 10000 at the third temporal location may include identifying vehicle control modification information, which may be similar to the vehicle control modification information identification described in relation to the yield-stop scenario 8000 shown in FIG. 8 or the vehicle control modification information identification described in relation to the yield-stop scenario 9000 shown in FIG. 9, except as described herein.

For example, traversing the current portion of the vehicle transportation network shown in FIG. 10 at the third temporal location may include identifying vehicle control modification information for a 'Yield-Wait Show Rational' vehicle control parameter corresponding to the identified 'Yield-Wait' vehicle control action, the primary vehicle control basis, or both, which may indicate one or more parameters for outputting a semiotic representation of the primary vehicle control basis.

Structured multivariate contextual vehicle operation with integrated semiotic control for traversing the yield-stop scenario 10000 at the third temporal location may include identifying vehicle control information, which may be similar to the vehicle control information identification described in relation to the yield-stop scenario 8000 shown in FIG. 8 or the vehicle control information identification described in relation to the yield-stop scenario 9000 shown in FIG. 9, except as described herein.

For example, for traversing the current portion of the vehicle transportation network shown in FIG. 10 at the third temporal location, identifying the vehicle control information may include identifying a value of the 'Yield-Wait Show Rational' vehicle control parameter corresponding to the identified 'Yield-Wait' vehicle control action, the primary vehicle control basis, or both, which may include identifying one or more parameters for outputting the semiotic representation of the primary vehicle control basis.

For example, identifying vehicle control information for traversing the yield-go scenario 10000 at the third temporal location may include identifying values for the 'Yield-Wait Show Rational' vehicle control parameters corresponding to the identified 'Yield-Wait' vehicle control action, such as based on a combination of defined 'Yield-Wait Show Rational' vehicle control parameter values corresponding to the identified 'Yield-Wait' vehicle control action, bright or daytime illumination state 'Yield-Wait Show Rational' vehicle control modifiers corresponding to the identified 'Yield-Wait' vehicle control action, wet or rainy weather or precipitation state 'Yield-Wait Show Rational' vehicle control modifiers corresponding to the identified 'Yield-Wait' vehicle control action, residential neighborhood 'Yield-Wait Show Rational' vehicle control modifiers corresponding to the identified 'Yield-Wait' vehicle control action, inclusion of external objects 'Yield-Wait Show Rational' vehicle control modifiers corresponding to the identified 'Yield-Wait' vehicle control action, inclusion of external activities 'Yield-Wait Show Rational' vehicle control modifiers corresponding to the identified 'Yield-Wait' vehicle control action, and low vehicle control optimization priority vehicle control modifiers corresponding to the identified 'Yield-Wait' vehicle control action.

Structured multivariate contextual vehicle operation with integrated semiotic control for traversing the yield-stop scenario 10000 at the third temporal location may include controlling the vehicle 8100 to traverse the vehicle transportation network, or a portion thereof, which may be similar to the traversing described in relation to the yield-stop scenario 8000 shown in FIG. 8 or the traversing described in relation to the yield-stop scenario 9000 shown in FIG. 9, except as described herein, and which may include controlling the vehicle 8100 to remain stationary at the intersection 8210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 8100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 8100 to remain stationary at the intersection 8210 in accordance with the vehicle control information, which may include using a velocity control unit of the vehicle 8100 as an output device, or a portion thereof, for outputting the semiotic representation, or a portion thereof, by controlling the velocity control unit of the vehicle 8100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 8100 to output the semiotic representation of the vehicle control information, or a portion thereof, in accordance with the vehicle control information may include controlling velocity of the vehicle 8100, such as by maintaining a stationary state at the intersection 8210 in accordance with the 'Yield-Wait' vehicle control action as modified by related vehicle control modification information, which may output at least a portion of the semiotic representation of at least a portion of the vehicle control information indicating that the vehicle is yielding to the pedestrians 9510, 10510.

Although not expressly shown in FIG. 9, in some embodiments, identifying the vehicle operational environment information may include identifying an expected path for an external object as a sequence of expected spatiotemporal locations and corresponding expected actions for the external object, which may include identifying, modeling, or both a pattern of movement or other operations for the external object, such as a pattern based on previously detected movement of the external object, and the vehicle operational modification information may be identified based, in part, on the identified expected path for the external object. For example, an expected path for first external object may indicate a relatively smooth or constant velocity, and an expected path for a second external object may indicate a relatively inconsistent or erratic velocity, and vehicle operational modification information identified based on the respective identified expected paths for both the external objects may indicate, for example, shorter delay periods than vehicle operational modification information identified based on the identified expected path for the first external object.

In FIG. 10, the current intention indicator 8700 is shown as including the sequence of stop indicators and yield indicators to indicate that traversing the portion of the vehicle transportation network shown in FIG. 10 may include outputting a portion of the semiotic representation of controlling the vehicle 8100 to perform the 'Yield-Wait' vehicle control action using the external luminous presentation unit of the vehicle 8100 to indicate the imminent or expected operational state of the vehicle 8100 corresponding to controlling the vehicle 8100 in accordance with the 'Yield-Wait' vehicle control action.

Although the portion of the semiotic representation of controlling the vehicle 8100 to perform the 'Yield-Wait' vehicle control action output using the external luminous presentation unit shown at 8700 in FIG. 10 is similar to the portion of the semiotic representation of controlling the vehicle 8100 to perform the 'Yield-Stop' vehicle control action output using the external luminous presentation unit as shown at 8700 in FIG. 9, the respective semiotic representations may differ.

The portion of the semiotic representation of controlling the vehicle 8100 to perform the 'Yield-Wait' vehicle control action output using the external luminous presentation unit may be output using the external luminous presentation unit for a temporal period, which may be concurrent with a temporal period for outputting the portion of the semiotic representation of controlling the vehicle 8100 to perform the 'Yield-Wait' vehicle control action output by controlling the velocity of the vehicle 8100 by maintaining a stationary state.

Controlling the vehicle 8100 to remain stationary at the intersection 8210 in accordance with the vehicle control information may include controlling the vehicle 8100 to output a semiotic representation of the primary vehicle control basis. For example, the current rationale indicator 8800 is shown as including a first representation of a pedestrian corresponding to the first pedestrian 9510 indicated by the current primary vehicle control basis and a second representation of a pedestrian corresponding to the second pedestrian 10510 indicated by the current primary vehicle control basis. The relative position of the pedestrian indicators in the current rationale indicator 8800 may correspond to the location of the pedestrians 9510, 10510 in the vehicle transportation network relative to the vehicle 8100.

In FIG. 11, the yield-stop scenario 11000 is similar to the yield-stop scenario 8000 shown in FIG. 8, the yield-stop scenario 9000 shown in FIG. 9, and the yield-stop scenario 10000 shown in FIG. 10, except as described herein. For example, in the yield-stop scenario 11000 shown in FIG. 11, the vehicle 8100 is about to proceed through the intersection 8210, as indicated by the broken directional arrow at 1800.

Structured multivariate contextual vehicle operation with integrated semiotic control for traversing the yield-stop scenario 11000 at the fourth temporal location may include identifying operational environment information, which may be similar to the operational environment information identification described in relation to the yield-stop scenario 8000 shown in FIG. 8, the operational environment information identification described in relation to the yield-stop scenario 9000 shown in FIG. 9, or the operational environment information identification described in relation to the yield-stop scenario 10000 shown in FIG. 10, except as described herein.

For example, for traversing the current portion of the vehicle transportation network shown in FIG. 11 at the fourth temporal location, identifying the operational environment information may include identifying that the expected path 1800 of the vehicle 8100 is clear or unblocked. For example, the first pedestrian 9510 and the second pedestrian 10510 may have cleared the expected path 1800 of the vehicle 8100 by traversing the intersection 8210.

Structured multivariate contextual vehicle operation with integrated semiotic control for traversing the yield-stop scenario 11000 at the fourth temporal location may include identifying a vehicle control action, which may be similar to the vehicle control action identification described in relation to the yield-stop scenario 8000 shown in FIG. 8, the vehicle control action identification described in relation to the yield-stop scenario 9000 shown in FIG. 9, or the vehicle control action identification described in relation to the yield-stop scenario 10000 shown in FIG. 10, except as described herein.

For example, for traversing the current portion of the vehicle transportation network shown in FIG. 11 at the fourth temporal location, a 'Proceed' vehicle control action may be identified, corresponding to controlling the vehicle 8100 to traverse the vehicle transportation network, or a portion thereof, by accelerating to a defined operational speed, such as 45 miles-per-hour, through the intersection 8210.

Structured multivariate contextual vehicle operation with integrated semiotic control for traversing the yield-stop scenario 11000 at the fourth temporal location may include identifying vehicle control modification information, which may be similar to the vehicle control modification information identification described in relation to the yield-stop scenario 8000 shown in FIG. 8, the vehicle control modification information identification described in relation to the yield-stop scenario 9000 shown in FIG. 9, or the vehicle control modification information identification described in relation to the yield-stop scenario 10000 shown in FIG. 10, except as described herein.

For example, identifying vehicle control modification information for traversing the yield-stop scenario 11000 at the fourth temporal location may include identifying vehicle control modification information for a 'Proceed Delay' vehicle control parameter corresponding to the identified 'Proceed' vehicle control action, which may indicate a temporal period for controlling the vehicle 8100 to traverse the current portion of the vehicle transportation network in accordance with the identified 'Proceed' vehicle control action by controlling the vehicle 8100 to maintain a current vehicle operational state, such as the stationary state as shown, prior to accelerating, or otherwise proceeding, through the intersection 8210.

In an example, identifying the vehicle control modification information may include identifying defined vehicle control information indicating a defined 'Proceed Delay' vehicle control parameter of 0.25 corresponding to the identified 'Proceed' vehicle control action, identifying vehicle control modification information corresponding to the bright or daytime illumination state indicating a 'Proceed Delay' vehicle control modifier of +0.0 corresponding to the identified 'Proceed' vehicle control action, identifying vehicle control modification information corresponding to the wet or rainy weather or precipitation state indicating a 'Proceed Delay' vehicle control modifier of +0.1 corresponding to the identified 'Proceed' vehicle control action, identifying vehicle control modification information corresponding to the residential neighborhood indicating a 'Proceed Delay' vehicle control modifier of +0.2 corresponding to the identified 'Proceed' vehicle control action, identifying vehicle control modification information corresponding to the inclusion of external objects indicating a 'Proceed Delay' vehicle control modifier of +0.1 corresponding to the identified 'Proceed' vehicle control action, identifying vehicle control modification information corresponding to the inclusion of external activities indicating a 'Proceed Delay' vehicle control modifier of +0.1 corresponding to the identified 'Proceed' vehicle control action, and identifying vehicle control modification information corresponding to the user configuration information indicating low vehicle control optimization priority indicating a 'Proceed Delay' vehicle control modifier of +0.05 corresponding to the identified 'Proceed' vehicle control action.

Structured multivariate contextual vehicle operation with integrated semiotic control for traversing the yield-stop scenario 11000 at the fourth temporal location may include identifying vehicle control information, which may be similar to the vehicle control information identification described in relation to the yield-stop scenario 8000 shown in FIG. 8, the vehicle control information identification described in relation to the yield-stop scenario 9000 shown in FIG. 9, or the vehicle control information identification described in relation to the yield-stop scenario 10000 shown in FIG. 10, except as described herein.

For example, identifying vehicle control information for traversing the yield-stop scenario 11000 at the fourth temporal location may include identifying a value of the 'Proceed Delay' vehicle control parameter corresponding to the identified 'Proceed' vehicle control action, which may be based on a combination, such as a sum, of the defined 'Proceed Delay' vehicle control parameter value of 0.25 corresponding to the identified 'Proceed' vehicle control action, the bright or daytime illumination state 'Proceed Delay' vehicle control modifier value of +0.0 corresponding to the identified 'Proceed' vehicle control action, the wet or rainy weather or precipitation state 'Proceed Delay' vehicle control modifier value of +0.1 corresponding to the identified 'Proceed' vehicle control action, the residential neighborhood 'Proceed Delay' vehicle control modifier value of +0.2 corresponding to the identified 'Proceed' vehicle control action, the inclusion of external objects 'Proceed Delay' vehicle control modifier value of +0.1 corresponding to the identified 'Proceed' vehicle control action, the inclusion of external activities 'Proceed Delay' vehicle control modifier value of +0.1 corresponding to the identified 'Proceed' vehicle control action, and the user configuration information indicating low vehicle control optimization priority 'Proceed Delay' vehicle control modifier value of +0.05 corresponding to the identified 'Proceed' vehicle control action, which may be 0.8 seconds.

Structured multivariate contextual vehicle operation with integrated semiotic control for traversing the yield-stop scenario 11000 at the fourth temporal location may include controlling the vehicle 8100 to traverse the vehicle transportation network, or a portion thereof, which may be similar to the traversing described in relation to the yield-stop scenario 8000 shown in FIG. 8, the traversing described in relation to the yield-stop scenario 9000 shown in FIG. 9, or the traversing described in relation to the yield-stop scenario 10000 shown in FIG. 10, except as described herein, and which may include controlling the vehicle 8100 to remain stationary prior to traversing the road 8200 through the intersection 8210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 8100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 8100 to traverse the road 8200 toward the intersection 8210 in accordance with the vehicle control information, which may include using a velocity control unit of the vehicle 8100 as an output device, or a portion thereof, for outputting the semiotic representation, or a portion thereof, by controlling the velocity control unit of the vehicle 8100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 8100 to output the semiotic representation of the vehicle control information, or a portion thereof, in accordance with the vehicle control information may include controlling velocity of the vehicle 8100, such as by maintaining a stationary state for a temporal period corresponding to the 'Proceed Delay' vehicle control parameter, such as for 0.8 seconds, prior to controlling the velocity of the vehicle 8100 to accelerate through the intersection 8210 in accordance with the 'Proceed' vehicle control action as modified by related vehicle control modification information, which may output at least a portion of the semiotic representation of at least a portion of the vehicle control information indicating that the vehicle is about to proceed through the intersection 8210.

In FIG. 11, the current intention indicator 8700 is shown as including a sequence of three directional indicators to indicate that traversing the portion of the vehicle transportation network shown in FIG. 11 may include outputting a portion of the semiotic representation of controlling the vehicle 8100 to perform the 'Proceed' vehicle control action using the external luminous presentation unit of the vehicle 8100 to indicate the imminent or expected operational state of the vehicle 8100 corresponding to controlling the vehicle 8100 in accordance with the 'Proceed' vehicle control action subsequent to the temporal period corresponding to the 'Proceed Delay' vehicle control parameter.

The portion of the semiotic representation of controlling the vehicle 8100 to perform the 'Proceed' vehicle control action subsequent to the temporal period corresponding to the 'Proceed Delay' vehicle control parameter output using the external luminous presentation unit may be output using the external luminous presentation unit for a temporal period, which may be concurrent with a temporal period for outputting the portion of the semiotic representation of controlling the vehicle 8100 to perform the 'Proceed' vehicle control action subsequent to the temporal period corresponding to the 'Proceed Delay' vehicle control parameter output by controlling the velocity of the vehicle 8100 by maintaining a stationary state.

A current rationale indicator 8800 is shown as a blank box to indicate that traversing the portion of the vehicle transportation network shown in FIG. 11 may omit outputting a semiotic representation of a current primary vehicle control basis.

In FIG. 12, the yield-stop scenario 12000 is similar to the yield-stop scenario 8000 shown in FIG. 8, the yield-stop scenario 9000 shown in FIG. 9, the yield-stop scenario 10000 shown in FIG. 10, and the yield-stop scenario 11000 shown in FIG. 11, except as described herein. For example, in the yield-stop scenario 12000 shown in FIG. 12, the vehicle 8100 is proceeding through the intersection 8210, as indicated by the solid directional arrow at 12300.

Structured multivariate contextual vehicle operation with integrated semiotic control for traversing the yield-stop scenario 12000 at the fifth temporal location may include identifying operational environment information, which may be similar to the operational environment information identification described in relation to the yield-stop scenario 8000 shown in FIG. 8, the operational environment information identification described in relation to the yield-stop scenario 9000 shown in FIG. 9, the operational environment information identification described in relation to the yield-stop scenario 10000 shown in FIG. 10, or the operational environment information identification described in relation to the yield-stop scenario 11000 shown in FIG. 11, except as described herein.

For example, for traversing the current portion of the vehicle transportation network shown in FIG. 12 at the fifth temporal location, identifying the operational environment information may include identifying information indicating that the expected path for proceeding by accelerating through the intersection is clear.

Structured multivariate contextual vehicle operation with integrated semiotic control for traversing the yield-stop scenario 12000 at the fifth temporal location may include identifying a vehicle control action, which may be similar to the vehicle control action identification described in relation to the yield-stop scenario 8000 shown in FIG. 8, the vehicle control action identification described in relation to the yield-stop scenario 9000 shown in FIG. 9, the vehicle control action identification described in relation to the yield-stop scenario 10000 shown in FIG. 10, or the vehicle control action identification described in relation to the yield-stop scenario 11000 shown in FIG. 11, except as described herein.

For example, for traversing the current portion of the vehicle transportation network shown in FIG. 12 at the fifth temporal location, a 'Proceed' vehicle control action, corresponding to controlling the vehicle 8100 to traverse the vehicle transportation network, or a portion thereof, by accelerating through the intersection 8210, may be identified. The 'Proceed' vehicle control action identified for traversing the current portion of the vehicle transportation network shown in FIG. 12 may be the 'Proceed' vehicle control action identified for traversing the current portion of the vehicle transportation network described in relation to FIG. 11, or equivalent thereto, except that identifying the 'Proceed' vehicle control action for traversing the current portion of the vehicle transportation network shown in FIG. 12 at the fifth temporal location may include determining that a temporal period corresponding to a 'Proceed Delay' vehicle control parameter associated with the 'Proceed' vehicle control action has expired.

Structured multivariate contextual vehicle operation with integrated semiotic control for traversing the yield-stop scenario 12000 at the fifth temporal location may include identifying vehicle control modification information, which may be similar to the vehicle control modification information identification described in relation to the yield-stop scenario 8000 shown in FIG. 8, the vehicle control modification information identification described in relation to the yield-stop scenario 9000 shown in FIG. 9, the vehicle control modification information identification described in relation to the yield-stop scenario 10000 shown in FIG. 10, or the vehicle control modification information identification described in relation to the yield-stop scenario 11000 shown in FIG. 11, except as described herein.

For example, identifying vehicle control modification information for traversing the yield-stop scenario 12000 at the fifth temporal location may include identifying vehicle control modification information for a 'Proceed Signaling Time' vehicle control parameter corresponding to the identified 'Proceed' vehicle control action, which may indicate a temporal period for outputting a semiotic representation of an operational state of the vehicle concurrent with controlling the vehicle to traverse the current portion of the vehicle transportation network in accordance with the identified 'Proceed' vehicle control action, such as by accelerating to a defined operational speed through the intersection 8210.

Identifying the vehicle control modification information may include identifying defined vehicle control information indicating a defined 'Proceed Signaling Time' vehicle control parameter of 1.25 corresponding to the identified 'Proceed' vehicle control action, identifying vehicle control modification information corresponding to the bright or daytime illumination state indicating a 'Proceed Signaling Time' vehicle control modifier of +0.0 corresponding to the identified 'Proceed' vehicle control action, identifying vehicle control modification information corresponding to the wet or rainy weather or precipitation state indicating a 'Proceed Signaling Time' vehicle control modifier of +0.1 corresponding to the identified 'Proceed' vehicle control action, identifying vehicle control modification information corresponding to the residential neighborhood indicating a 'Proceed Signaling Time' vehicle control modifier of +0.2 corresponding to the identified 'Proceed' vehicle control action, identifying vehicle control modification information corresponding to the inclusion of external objects indicating a 'Proceed Signaling Time' vehicle control modifier of +0.1 corresponding to the identified 'Proceed' vehicle control action, identifying vehicle control modification information corresponding to the inclusion of external activities indicating a 'Proceed Signaling Time' vehicle control modifier of +0.1 corresponding to the identified 'Proceed' vehicle control action, and identifying vehicle control modification information corresponding to the user configuration information indicating low vehicle control optimization priority indicating a 'Proceed Signaling Time' vehicle control modifier of +0.05 corresponding to the identified 'Proceed' vehicle control action.

Structured multivariate contextual vehicle operation with integrated semiotic control for traversing the yield-stop scenario 12000 at the fifth temporal location may include identifying vehicle control information, which may be similar to the vehicle control information identification described in relation to the yield-stop scenario 8000 shown in FIG. 8, the vehicle control information identification described in relation to the yield-stop scenario 9000 shown in FIG. 9, the vehicle control information identification described in relation to the yield-stop scenario 10000 shown in FIG. 10, or the vehicle control information identification described in relation to the yield-stop scenario 11000 shown in FIG. 11, except as described herein.

For example, identifying vehicle control information for traversing the yield-stop scenario 12000 at the fifth temporal location may include identifying a value of the 'Proceed Signaling Time' vehicle control parameter corresponding to the identified 'Proceed' vehicle control action, which may be based on a combination, such as a sum, of the defined 'Proceed Signaling Time' vehicle control parameter value of 1.25 corresponding to the identified 'Proceed' vehicle control action, the bright or daytime illumination state 'Proceed Signaling Time' vehicle control modifier value of +0.0 corresponding to the identified 'Proceed' vehicle control action, the wet or rainy weather or precipitation state 'Proceed Signaling Time' vehicle control modifier value of +0.1 corresponding to the identified 'Proceed' vehicle control action, the residential neighborhood 'Proceed Signaling Time' vehicle control modifier value of +0.2 corresponding to the identified 'Proceed' vehicle control action, the inclusion of external objects 'Proceed Signaling Time' vehicle control modifier value of +0.1 corresponding to the identified 'Proceed' vehicle control action, the inclusion of external activities 'Proceed Signaling Time' vehicle control modifier value of +0.1 corresponding to the identified 'Proceed' vehicle control action, and the user configuration information indicating low vehicle control optimization priority 'Proceed Signaling Time' vehicle control modifier value of +0.05 corresponding to the identified 'Proceed' vehicle control action, which may be 1.8 seconds.

Structured multivariate contextual vehicle operation with integrated semiotic control for traversing the yield-stop scenario 12000 at the fifth temporal location may include controlling the vehicle to traverse the vehicle transportation network, or a portion thereof, which may be similar to the traversing described in relation to the yield-stop scenario 8000 shown in FIG. 8, the traversing described in relation to the yield-stop scenario 9000 shown in FIG. 9, the traversing described in relation to the yield-stop scenario 10000 shown in FIG. 10, or the traversing described in relation to the yield-stop scenario 11000 shown in FIG. 11, except as described herein, and which may include controlling the vehicle 8100 to traverse the road 8200 through the intersection 8210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 8100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 8100 to traverse the road 8200 through the intersection 8210 in accordance with the vehicle control information, which may include using a velocity control unit of the vehicle 8100 as an output device, or a portion thereof, for outputting the semiotic representation, or a portion thereof, by controlling the velocity control unit of the vehicle 8100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 8100 to output the semiotic representation of the vehicle control information, or a portion thereof, in accordance with the vehicle control information may include controlling the speed of the vehicle 8100, such as by accelerating to transition from a stationary state of the vehicle 8100 to a defined operational speed in accordance with the 'Proceed' vehicle control action as modified by related vehicle control modification information, such as 45 miles-per-hour, which may output at least a portion of the semiotic representation of at least a portion of the vehicle control information indicating that the vehicle is proceeding through the intersection 8210.

In FIG. 12, the current intention indicator 8700 is shown as including three directional indicators to indicate that traversing the portion of the vehicle transportation network shown in FIG. 12 may include outputting a portion of the semiotic representation of controlling the vehicle 8100 to perform the 'Proceed' vehicle control action using the external luminous presentation unit of the vehicle 8100.

The portion of the semiotic representation of controlling the vehicle 8100 to perform the 'Proceed' vehicle control action output using the external luminous presentation unit may be output using the external luminous presentation unit for a temporal period, which may be concurrent with a temporal period for outputting the portion of the semiotic representation of controlling the vehicle 8100 to perform the 'Proceed' vehicle control action output by controlling the velocity of the vehicle 8100.

A current rationale indicator 8800 is shown as a blank box to indicate that traversing the portion of the vehicle transportation network shown in FIG. 12 may omit outputting a semiotic representation of a current primary vehicle control basis.

Although not shown in FIG. 12, subsequent to traversing the intersection 8210 the vehicle 8100 may cease outputting the semiotic representation of the vehicle control information.

Figure 13:
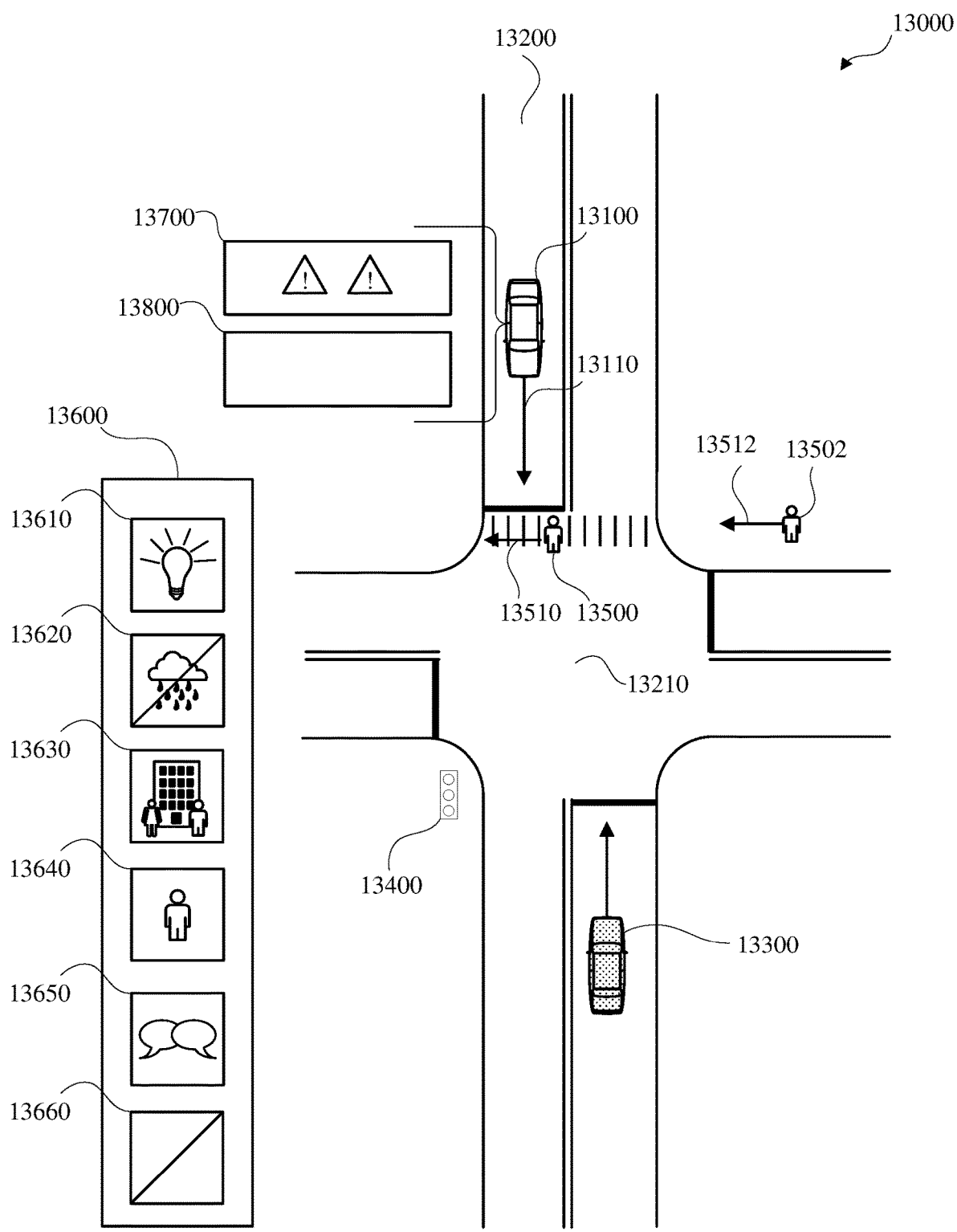
FIG. 13 is a diagram, corresponding to a first temporal location, from a sequence of diagrams of an example of structured multivariate contextual vehicle operation with integrated semiotic control for traversing a yield-go scenario in accordance with implementations of this disclosure.
Figure 14:
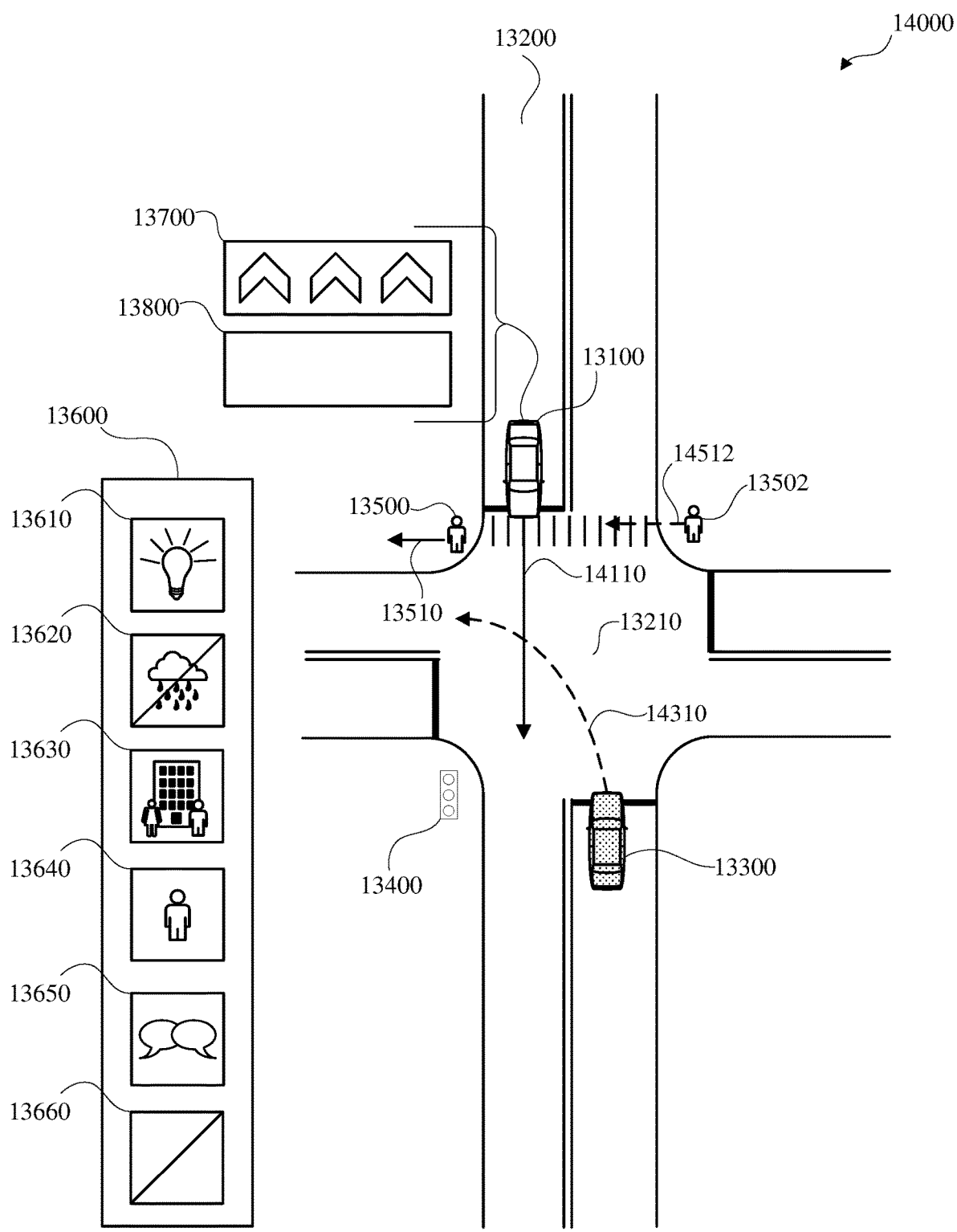
FIG. 14 is a diagram, corresponding to a second temporal location, from a sequence of diagrams of an example of structured multivariate contextual vehicle operation with integrated semiotic control for traversing a yield-go scenario in accordance with implementations of this disclosure.

FIG. 13 and FIG. 14 are a sequence of diagrams of an example of structured multivariate contextual vehicle operation with integrated semiotic control for traversing a yield-go scenario in accordance with implementations of this disclosure. In FIG. 13 and FIG. 14 some aspects of structured multivariate contextual vehicle operation with integrated semiotic control for traversing a yield-go scenario are shown and other aspects are omitted for simplicity and clarity.

FIG. 13 is a diagram of the example of structured multivariate contextual vehicle operation with integrated semiotic control for traversing the yield-go scenario at a first temporal location. FIG. 14 is a diagram of the example of structured multivariate contextual vehicle operation with integrated semiotic control for traversing the yield-go scenario at a second temporal location that is subsequent to the first temporal location shown in FIG. 13.

In FIG. 13, the yield-go scenario 13000 includes a vehicle 13100, such as the vehicle 1000 shown in FIG. 1, one of the vehicles 2100/2110 shown in FIG. 2, or any other vehicle implementing structured multivariate contextual vehicle operation with integrated semiotic control, such as an autonomous vehicle, a semi-autonomous vehicle, or any other vehicle implementing autonomous driving, traversing, along a current expected path 13110, a portion of a current road 13200 approaching an intersection 13210 with an intersecting road. The current expected path 13110 for the vehicle 13100 is shown using a solid directional line, indicating that a current velocity of the vehicle 13100 is such that the vehicle moving towards the intersection 13210. The yield-go scenario 13000 includes a remote vehicle 13300 external object, a traffic control device 13400 for the intersection, such as a traffic light, a first pedestrian 13500 external object, and a second pedestrian 13500 external object.

Structured multivariate contextual vehicle operation with integrated semiotic control for traversing the yield-go scenario 13000 at the first temporal location may include identifying operational environment information, which may be similar to the operational environment information identification shown at 4100 in FIG. 4, except as described herein.

For example, traversing the current portion of the vehicle transportation network shown in FIG. 13 may include identifying operational environment information indicating that the current operational environment has a bright or daytime illumination state, has a clear or dry weather or precipitation state, includes a commercial neighborhood, includes external objects, includes external activities, and omits user configuration information.

For example, identifying the operational environment information may include identifying external activity information, such as social media information, indicating a lunchtime crowd of people in the geographic area of the intersection 13210 and temporally concurrent with, or proximate to, a current temporal location.

Identifying the operational environment information may include identifying that the first pedestrian 13500 has an expected path 13510 indicating that the first pedestrian 13500 is crossing the intersection 13210, or otherwise determining that a probability of convergence between the first pedestrian 13500 and the vehicle 13100 is within a defined cautionary range.

Identifying the operational environment information may include identifying that the second pedestrian 13512 has an expected path 13512 indicating that the second pedestrian 13502 is approaching the intersection 13210, or otherwise determining that a probability of convergence between the second pedestrian 13502 and the vehicle 13100 is within a defined advance range, which may indicate a lower probability of convergence than the defined cautionary range.

Identifying the operational environment information may include identifying expected traffic control device state information indicating an expected permitted right-of-way signal indicating that an expected state of the traffic control device 13400 for a temporal location corresponding to the vehicle 13100 traversing the intersection 13210 is a permitted right-of-way state.

Aspects of the current operational environment are indicated at 13600. For example, the bright or daytime illumination state is indicated at 13610, the clear or dry weather or precipitation state is indicated at 13620, the commercial neighborhood is indicated at 13630, the presence of external objects is indicated at 13640, the occurrence of external activities is indicated at 13650, and the omission of user configuration information is indicated at 13660. The indications 13610, 13620, 13630, 13640, 13650, 13660 are shown for simplicity and clarity of explanation.

Structured multivariate contextual vehicle operation with integrated semiotic control for traversing the yield-go scenario 13000 at the first temporal location may include identifying a vehicle control action, which may be similar to the vehicle control action identification shown at 4200 in FIG. 4, except as described herein.

For example, for traversing the current portion of the vehicle transportation network shown in FIG. 13, a 'Yield-Go' vehicle control action may be identified, corresponding to controlling the vehicle to decelerate from a current speed to a cautionary speed in accordance with the expected permitted right-of-way signal for the traffic control device 13400 at the intersection 13210 and in accordance with the determination that the operational environment includes pedestrians 13500, 13502 that may affect the operation of the vehicle.

Structured multivariate contextual vehicle operation with integrated semiotic control for traversing the yield-go scenario 13000 at the first temporal location may include identifying vehicle control modification information, which may be similar to the vehicle control modification information identification shown at 4300 in FIG. 4, except as described herein.

For example, traversing the current portion of the vehicle transportation network shown in FIG. 13 may include identifying vehicle control modification information for a 'Yield-Go Cautionary Speed' vehicle control parameter corresponding to the identified 'Yield-Go' vehicle control action, which may indicate a velocity for traversing the yield-go scenario 13000 at the first temporal location such that traversing the yield-go scenario 13000 at the first temporal location includes outputting a semiotic representation of the operational state of the vehicle concurrent with controlling the vehicle to traverse the current portion of the vehicle transportation network in accordance with the identified 'Yield-Go' vehicle control action.

In an example, identifying the vehicle control modification information may include identifying defined vehicle control information indicating a defined 'Yield-Go Cautionary Speed' vehicle control parameter of 25 miles-per-hour corresponding to the identified 'Yield-Go' vehicle control action, identifying vehicle control modification information corresponding to the bright or daytime illumination state indicating a 'Yield-Go Cautionary Speed' vehicle control modifier of +0 corresponding to the identified 'Yield-Go' vehicle control action, identifying vehicle control modification information corresponding to the clear or dry weather or precipitation state indicating a 'Yield-Go Cautionary Speed' vehicle control modifier of +0 corresponding to the identified 'Yield-Go' vehicle control action, identifying vehicle control modification information corresponding to the commercial neighborhood indicating a 'Yield-Go Cautionary Speed' vehicle control modifier of −5 corresponding to the identified 'Yield-Go' vehicle control action, identifying vehicle control modification information corresponding to the presence of external objects indicating a 'Yield-Go Cautionary Speed' vehicle control modifier of −2.5 corresponding to the identified 'Yield-Go' vehicle control action, and identifying vehicle control modification information corresponding to the presence of external activities indicating a 'Yield-Go Cautionary Speed' vehicle control modifier of −2.5 corresponding to the identified 'Yield-Go' vehicle control action.

Structured multivariate contextual vehicle operation with integrated semiotic control for traversing the yield-go scenario 13000 at the first temporal location may include identifying vehicle control information, which may be similar to the vehicle control information identification shown at 4400 in FIG. 4, except as described herein.

For example, for traversing the current portion of the vehicle transportation network shown in FIG. 13, identifying the vehicle control information may include identifying a value of the 'Yield-Go Cautionary Speed' vehicle control parameter corresponding to the identified 'Yield-Go' vehicle control action, such as based on a combination, such as a sum, of the defined 'Yield-Go Cautionary Speed' vehicle control parameter value of 25 corresponding to the identified 'Yield-Go' vehicle control action, the bright or daytime illumination state 'Yield-Go Cautionary Speed' vehicle control modifier of +0 corresponding to the identified 'Yield-Go' vehicle control action, the clear or dry weather or precipitation state 'Yield-Go Cautionary Speed' vehicle control modifier of +0 corresponding to the identified 'Yield-Go' vehicle control action, the commercial neighborhood 'Yield-Go Cautionary Speed' vehicle control modifier of −5 corresponding to the identified 'Yield-Go' vehicle control action, the presence of external objects 'Yield-Go Cautionary Speed' vehicle control modifier of −2.5 corresponding to the identified 'Yield-Go' vehicle control action, and the presence of external activities 'Yield-Go Cautionary Speed' vehicle control modifier of −2.5 corresponding to the identified 'Yield-Go' vehicle control action, which may be 15.

Identifying the vehicle control information may include determining one or more aspects of outputting the semiotic representation of the primary vehicle control basis. For example, identifying the vehicle control information may include determining whether to output a semiotic representation of the primary vehicle control basis, which may include determining whether the remote vehicle 13300, or another external object, detected within the operational environment is oriented with respect to the vehicle 13100 such that controlling the vehicle 13100 to traverse the portion of the vehicle transportation network shown in FIG. 13 in accordance with the vehicle control information may affect the operation of the remote vehicle 13300, or other external object, within the operational environment by limiting the operational environment information available to the remote vehicle 13300, or other external object, or a driver or operator thereof.

For example, controlling the vehicle 13100 to traverse the vehicle transportation network, or a portion thereof, in accordance with the vehicle control information may include determining that the relative orientation of the pedestrian 13500, the vehicle 13100, and the remote vehicle 13300, is such that the operation of the remote vehicle 13300 within the yield-go scenario 13000 at the first temporal location may be unaffected by limiting the operational environment information available to the remote vehicle 13300 by controlling the vehicle 13100 to traverse the portion of the vehicle transportation network shown in FIG. 13 in accordance with the vehicle control information and the primary vehicle control basis, and that the operational environment omits other remote vehicles oriented with respect to the vehicle 13100 such that controlling the vehicle 13100 to traverse the portion of the vehicle transportation network shown in FIG. 13 in accordance with the vehicle control information may limit the operational environment information available to the other remote vehicles or respective drivers or operators thereof.

Structured multivariate contextual vehicle operation with integrated semiotic control for traversing the yield-go scenario 13000 at the first temporal location may include controlling the vehicle to traverse the vehicle transportation network, or a portion thereof, which may be similar to the traversing shown at 4500 in FIG. 4, except as described herein, and which may include controlling the vehicle 13100 to traverse the road 13200 toward the intersection 13210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 13100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 13100 to traverse the road 13200 toward the intersection 13210 in accordance with the vehicle control information, which may include using a velocity control unit of the vehicle 13100 as an output device, or a portion thereof, for outputting the semiotic representation, or a portion thereof, by controlling the velocity control unit of the vehicle 13100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by, controlling a deceleration rate, a velocity, the timing of performing a velocity vehicle control action, or a combination thereof.

Controlling the velocity control unit of the vehicle 13100 to output the semiotic representation of the vehicle control information, or a portion thereof, in accordance with the vehicle control information may include controlling the speed of the vehicle 13100, such as by braking to transition from a current speed of the vehicle 13100 to a defined cautionary speed in accordance with the 'Yield-Go' vehicle control action as modified by related vehicle control modification information, such as 15 miles-per-hour, which may output at least a portion of the semiotic representation of at least a portion of the vehicle control information indicating that the vehicle is yielding to the pedestrian 13500 and, subsequent to yielding to the pedestrian 13500, proceeding through the intersection 13210.

In FIG. 13, the current intention indicator 13700 is shown as including yield indicators to indicate that traversing the portion of the vehicle transportation network shown in FIG. 13 may include outputting a portion of the semiotic representation of controlling the vehicle 13100 to perform the 'Yield-Go' vehicle control action using an external luminous presentation unit of the vehicle 13100.

The portion of the semiotic representation of controlling the vehicle 13100 to perform the 'Yield-Go' vehicle control action output using the external luminous presentation unit may be output using the external luminous presentation unit for a temporal period, which may overlap with a temporal period for outputting the portion of the semiotic representation of controlling the vehicle 13100 to perform the 'Yield-Go' vehicle control action output by controlling the velocity of the vehicle 13100.

For example, a portion of the temporal period for outputting the portion of the semiotic representation of controlling the vehicle 13100 to perform the 'Yield-Go' vehicle control action output using the external luminous presentation unit may precede the temporal period for outputting the portion of the semiotic representation of controlling the vehicle 13100 to perform the 'Yield-Go' vehicle control action output by controlling the velocity of the vehicle 13100, and a portion of the temporal period for outputting the portion of the semiotic representation of controlling the vehicle 13100 to perform the 'Yield-Go' vehicle control action output using the external luminous presentation unit may be concurrent with the temporal period for outputting the portion of the semiotic representation of controlling the vehicle 13100 to perform the 'Yield-Go' vehicle control action output by controlling the velocity of the vehicle 13100.

Structured multivariate contextual vehicle operation with integrated semiotic control for traversing the yield-go scenario 13000 at the first temporal location may include determining whether to output a semiotic representation of the primary vehicle control basis, which may include determining whether the remote vehicle 13300, or another external object, detected within the operational environment is oriented with respect to the vehicle 13100 such that controlling the vehicle 13100 to traverse the portion of the vehicle transportation network shown in FIG. 13 in accordance with the vehicle control information may affect the operation of the remote vehicle 13300, or other external object, within the operational environment by limiting the operational environment information available to the remote vehicle 13300.

A current rationale indicator 13800 is shown as a blank box to indicate that traversing the portion of the vehicle transportation network shown in FIG. 13 may omit outputting a semiotic representation of the current primary vehicle control basis in accordance with a determination that the remote vehicle 13300 is oriented with respect to the vehicle 13100 such that the operation of the remote vehicle 13300 within the yield-go scenario 13000 at the first temporal location may be unaffected by limiting the operational environment information available to the remote vehicle 13300 by controlling the vehicle 13100 to traverse the portion of the vehicle transportation network shown in FIG. 13 in accordance with the vehicle control information and the primary vehicle control basis, and that the operational environment omits other remote vehicles oriented with respect to the vehicle 13100 such that controlling the vehicle 13100 to traverse the portion of the vehicle transportation network shown in FIG. 13 in accordance with the vehicle control information may limit the operational environment information available to the other vehicles.

In FIG. 14, the yield-go scenario 14000 is similar to the yield-go scenario 13000 shown in FIG. 13, except as described herein. For example, in the yield-go scenario 14000 shown in FIG. 14, the vehicle 13100 is proceeding through the intersection 13210, as indicated by the solid directional arrow at 14110.

Structured multivariate contextual vehicle operation with integrated semiotic control for traversing the yield-go scenario 14000 at the second temporal location may include identifying operational environment information, which may be similar to the operational environment information identification described in relation to the yield-go scenario 13000 shown in FIG. 13, except as described herein.

For example, for traversing the current portion of the vehicle transportation network shown in FIG. 14 at the second temporal location, identifying the operational environment information may include identifying operational environment information indicating that the expected path 14110 of the vehicle 13100 is clear or unblocked. For example, the pedestrian 13500 may have cleared the expected path 14110 of the vehicle 13100 by traversing the intersection 13210. The operational environment information may indicate that an expected path 14512 for the second pedestrian 13500 intersects spatially with the expected path 14110 of the vehicle 13100 and is temporally divergent from the expected path 14110 of the vehicle 13100, as indicated by the broken directional line at 14512.

The operational environment information may indicate that an expected path 14310 for the remote vehicle 13300 intersects spatially with the expected path 14110 of the vehicle 13100 and is temporally divergent from the expected path 14110 of the vehicle 13100, as indicated by the broken directional line at 14110. For example, the operational environment information may include information indicating the vehicle 13100 has an expected permitted right-of-way such that the remote vehicle 13300 may traverse the intersection 13210 subsequent to the vehicle 13100 traversing the intersection 13210.

Structured multivariate contextual vehicle operation with integrated semiotic control for traversing the yield-go scenario 14000 at the second temporal location may include identifying a vehicle control action, which may be similar to the vehicle control action identification described in relation to the yield-go scenario 13000 shown in FIG. 13, except as described herein.

For example, for traversing the current portion of the vehicle transportation network shown in FIG. 14 at the second temporal location, a 'Proceed' vehicle control action, corresponding to controlling the vehicle 13100 to traverse the vehicle transportation network, or a portion thereof, by accelerating to a defined operational speed, such as 45 miles per hour, may be identified.

Structured multivariate contextual vehicle operation with integrated semiotic control for traversing the yield-go scenario 14000 at the second temporal location may include identifying vehicle control modification information, which may be similar to the vehicle control modification information identification described in relation to the yield-go scenario 13000 shown in FIG. 13, except as described herein.

For example, identifying vehicle control modification information for traversing the yield-go scenario 14000 at the second temporal location may include identifying vehicle control modification information for a 'Proceed Signaling' vehicle control parameter corresponding to the identified 'Proceed' vehicle control action, which may indicate whether to output a semiotic representation of an operational state of the vehicle 13100 concurrent with controlling the vehicle 13100 to traverse the current portion of the vehicle transportation network in accordance with the identified 'Proceed' vehicle control action.

For example, the 'Proceed Signaling' vehicle control parameter corresponding to the identified 'Proceed' vehicle control action may have a value of 'True', 1, 'include', 'show', or another value indicating that a semiotic representation of an operational state of the vehicle 13100 concurrent with controlling the vehicle 13100 to traverse the current portion of the vehicle transportation network in accordance with the identified 'Proceed' vehicle control action may be output. Although not shown in FIG. 14, the 'Proceed Signaling' vehicle control parameter corresponding to the identified 'Proceed' vehicle control action may have a value of 'False', 0, 'omit', 'do not show', or another value indicating that outputting a semiotic representation of the operational state of the vehicle 13100 concurrent with controlling the vehicle 13100 to traverse the current portion of the vehicle transportation network in accordance with the identified 'Proceed' vehicle control action may be omitted.

In an example, identifying the vehicle control modification information may include identifying defined vehicle control information indicating a defined 'Proceed Signaling' vehicle control parameter of 'False' corresponding to the identified 'Proceed' vehicle control action, identifying vehicle control modification information corresponding to the bright or daytime illumination state indicating a 'Proceed Signaling' vehicle control modifier of 'False' corresponding to the identified 'Proceed' vehicle control action, identifying vehicle control modification information corresponding to the dry or clear weather or precipitation state indicating a 'Proceed Signaling' vehicle control modifier of 'False' corresponding to the identified 'Proceed' vehicle control action, identifying vehicle control modification information corresponding to the commercial neighborhood indicating a 'Proceed Signaling' vehicle control modifier of 'False' corresponding to the identified 'Proceed' vehicle control action, identifying vehicle control modification information corresponding to the inclusion of external objects indicating a 'Proceed Signaling' vehicle control modifier of 'True' corresponding to the identified 'Proceed' vehicle control action, and identifying vehicle control modification information corresponding to the inclusion of external activities indicating a 'Proceed Signaling' vehicle control modifier of 'True' corresponding to the identified 'Proceed' vehicle control action.

Structured multivariate contextual vehicle operation with integrated semiotic control for traversing the yield-go scenario 14000 at the second temporal location may include identifying vehicle control information, which may be similar to the vehicle control information identification described in relation to the yield-go scenario 13000 shown in FIG. 13, except as described herein.

For example, identifying vehicle control information for traversing the yield-go scenario 14000 at the second temporal location may include identifying a value of the 'Proceed Signaling' vehicle control parameter corresponding to the identified 'Proceed' vehicle control action, such as based on a combination of the defined 'Proceed Signaling' vehicle control parameter value of 'False' corresponding to the identified 'Proceed' vehicle control action, the bright or daytime illumination state 'Proceed Signaling' vehicle control modifier of 'False' corresponding to the identified 'Proceed' vehicle control action, the dry or clear weather or precipitation state 'Proceed Signaling' vehicle control modifier of 'False' corresponding to the identified 'Proceed' vehicle control action, the commercial neighborhood 'Proceed Signaling' vehicle control modifier of 'False' corresponding to the identified 'Proceed' vehicle control action, the inclusion of external objects 'Proceed Signaling' vehicle control modifier of 'True' corresponding to the identified 'Proceed' vehicle control action, and the inclusion of external activities 'Proceed Signaling' vehicle control modifier of 'True' corresponding to the identified 'Proceed' vehicle control action.

Structured multivariate contextual vehicle operation with integrated semiotic control for traversing the yield-go scenario 14000 at the second temporal location may include controlling the vehicle to traverse the vehicle transportation network, or a portion thereof, which may be similar to the traversing described in relation to the yield-go scenario 13000 shown in FIG. 13, except as described herein, and which may include controlling the vehicle 13100 to traverse the road 13200 through the intersection 13210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 13100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 13100 to traverse the road 13200 toward the intersection 13210 in accordance with the vehicle control information, which may include using a velocity control unit of the vehicle 13100 as an output device, or a portion thereof, for outputting the semiotic representation, or a portion thereof, by controlling the velocity control unit of the vehicle 13100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 13100 to output the semiotic representation of the vehicle control information, or a portion thereof, in accordance with the vehicle control information may include controlling the speed of the vehicle 13100, such as by accelerating to transition from a current cautionary speed of the vehicle 13100 to a defined operational speed in accordance with the 'Proceed' vehicle control action as modified by related vehicle control modification information, such as 45 miles-per-hour, which may output at least a portion of the semiotic representation of at least a portion of the vehicle control information indicating that the vehicle is proceeding through the intersection 13210.

In FIG. 14, the current intention indicator 13700 is shown as including three directional indicators to indicate that traversing the portion of the vehicle transportation network shown in FIG. 14 may include outputting a portion of the semiotic representation of controlling the vehicle 13100 to perform the 'Proceed' vehicle control action using the external luminous presentation unit of the vehicle 13100.

The portion of the semiotic representation of controlling the vehicle 13100 to perform the 'Proceed' vehicle control action output using the external luminous presentation unit may be output using the external luminous presentation unit for a temporal period, which may be concurrent with a temporal period for outputting the portion of the semiotic representation of controlling the vehicle 13100 to perform the 'Proceed' vehicle control action output by controlling the velocity of the vehicle 13100.

A current rationale indicator 13800 is shown as a blank box to indicate that traversing the portion of the vehicle transportation network shown in FIG. 14 may omit outputting a semiotic representation of a current primary vehicle control basis.

Although not shown in FIG. 14, subsequent to traversing the intersection 13210 the vehicle 13100 may cease outputting the semiotic representation of the vehicle control information.

Figure 15:
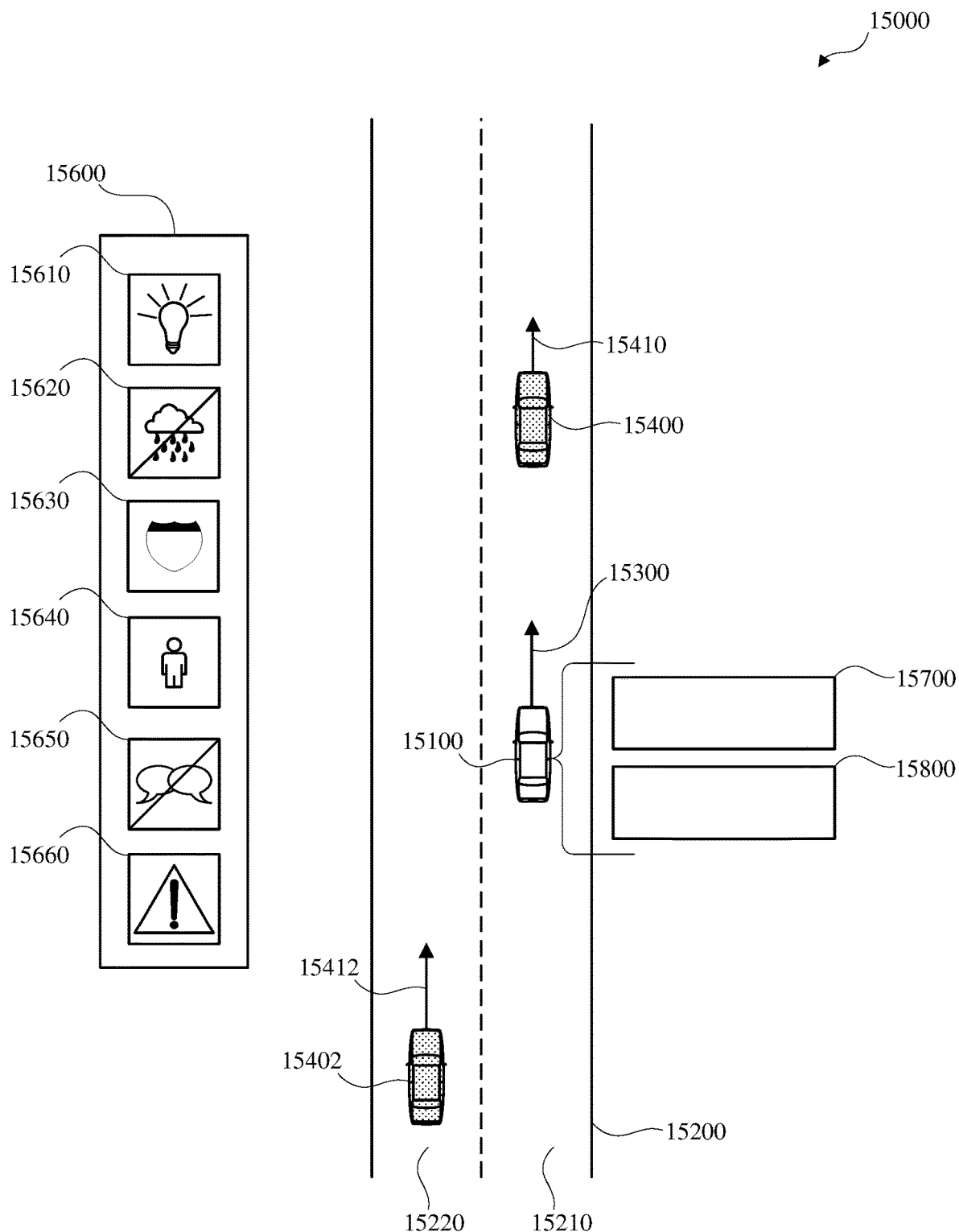
FIG. 15 is a diagram, corresponding to a first temporal location, from a sequence of diagrams of an example of structured multivariate contextual vehicle operation with integrated semiotic control for traversing a lane change scenario in accordance with implementations of this disclosure.
Figure 16:
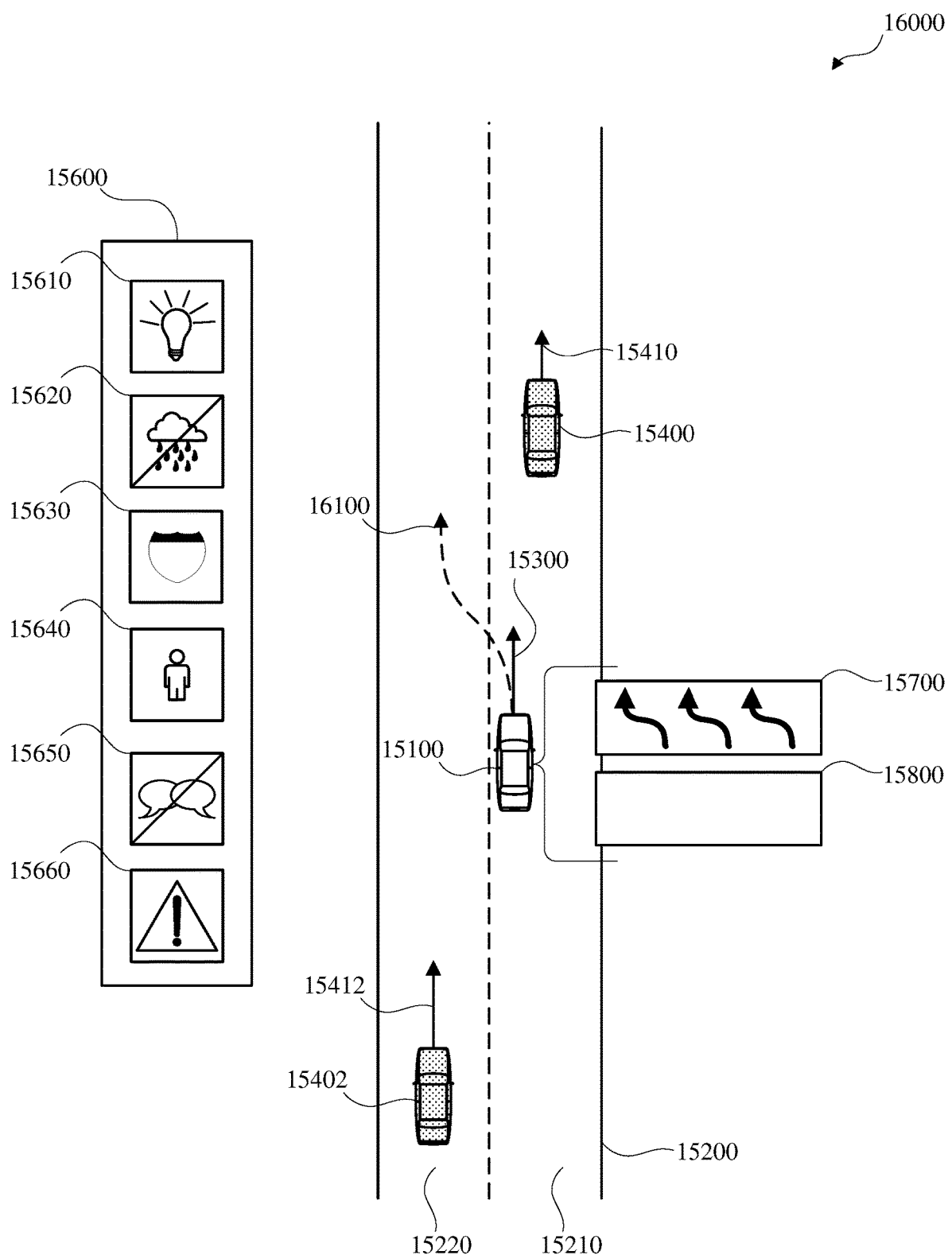
FIG. 16 is a diagram, corresponding to a second temporal location, from a sequence of diagrams of an example of structured multivariate contextual vehicle operation with integrated semiotic control for traversing a lane change scenario in accordance with implementations of this disclosure.

FIG. 15 and FIG. 16 are a sequence of diagrams of an example of structured multivariate contextual vehicle operation with integrated semiotic control for traversing a lane change scenario in accordance with implementations of this disclosure. In FIG. 15 and FIG. 16 some aspects of structured multivariate contextual vehicle operation with integrated semiotic control for traversing a lane change scenario are shown and other aspects are omitted for simplicity and clarity.

FIG. 15 is a diagram of the example of structured multivariate contextual vehicle operation with integrated semiotic control for traversing the lane change scenario at a first temporal location. FIG. 16 is a diagram of the example of structured multivariate contextual vehicle operation with integrated semiotic control for traversing the lane change scenario at a second temporal location that is subsequent to the first temporal location shown in FIG. 15.

In FIG. 15, the lane change scenario 15000 includes a vehicle 15100, such as the vehicle 1000 shown in FIG. 1, one of the vehicles 2100/2110 shown in FIG. 2, or any other vehicle implementing structured multivariate contextual vehicle operation with integrated semiotic control, such as an autonomous vehicle, a semi-autonomous vehicle, or any other vehicle implementing autonomous driving, traversing a portion of a current road 15200 in a first lane 15210 in a direction of travel and adjacent to a second lane 15220 having the direction of travel. A current expected path 15300 for the vehicle 15100 is shown using a solid directional line to indicate a current velocity of the vehicle 15100.

The lane change scenario 15000 includes a first remote vehicle 15400 external object ahead of the vehicle 15100 in the first lane 15210 and a second remote vehicle 15402 external object behind the vehicle 15100 in the adjacent lane 15220. The expected path 15410 is shown for the first remote vehicle 15400 and an expected path 15412 is shown for the second remote vehicle 15402.

Structured multivariate contextual vehicle operation with integrated semiotic control for traversing the lane change scenario 15000 at the first temporal location may include identifying operational environment information, which may be similar to the operational environment information identification shown at 4100 in FIG. 4, except as described herein.

For example, traversing the current portion of the vehicle transportation network shown in FIG. 15 may include identifying operational environment information indicating that the current operational environment has a bright or daytime illumination state, has a clear or dry weather or precipitation state, includes a highway area, includes external objects, omits external activities, and includes user configuration information indicating low vehicle control optimization priority.

Aspects of the current operational environment are indicated at 15600. For example, the bright or daytime illumination state is indicated at 15610, the clear or dry weather or precipitation state is indicated at 15620, the highway area is indicated at 15630, the presence of external objects is indicated at 15640, the omission of external activities is indicated at 15650, and the user configuration information indicating low vehicle control optimization priority is indicated at 15660. The indications 15610, 15620, 15630, 15640, 15650, 15660 are shown for simplicity and clarity of explanation.

Structured multivariate contextual vehicle operation with integrated semiotic control for traversing the lane change scenario 15000 at the first temporal location may include identifying a vehicle control action, which may be similar to the vehicle control action identification shown at 4200 in FIG. 4, except as described herein.

For example, for traversing the current portion of the vehicle transportation network shown in FIG. 15 at the first temporal location, a 'Maintain' vehicle control action may be identified, corresponding to controlling the vehicle to maintain current operational parameters to traverse the road 15200 in the first lane 15210.

Structured multivariate contextual vehicle operation with integrated semiotic control for traversing the lane change scenario 15000 at the first temporal location may include identifying vehicle control modification information, which may be similar to the vehicle control modification information identification shown at 4300 in FIG. 4, except as described herein.

For example, for traversing the current portion of the vehicle transportation network shown in FIG. 15 at the first temporal location, identifying the vehicle control modification information may include identifying vehicle control modification information corresponding to the bright or daytime illumination state, the dry or clear weather or precipitation state, the highway area, the inclusion of external objects, the omission of external activities, and the user configuration information indicating low vehicle control optimization priority.

Structured multivariate contextual vehicle operation with integrated semiotic control for traversing the lane change scenario 15000 at the first temporal location may include identifying vehicle control information, which may be similar to the vehicle control information identification shown at 4400 in FIG. 4, except as described herein.

For example, for traversing the current portion of the vehicle transportation network shown in FIG. 15 at the first temporal location, the vehicle control information may be identified based on current operational parameters for the vehicle, the identified vehicle control action, the identified vehicle control modification information, or a combination thereof, and may indicate operational parameters consistent with the current operational parameters.

Structured multivariate contextual vehicle operation with integrated semiotic control for traversing the lane change scenario 15000 at the first temporal location may include controlling the vehicle to traverse the vehicle transportation network, or a portion thereof, which may be similar to the traversing shown at 4500 in FIG. 4, except as described herein, and which may include controlling the vehicle 15100 to traverse the road 15200 in the current lane 15210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 15100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 15100 to traverse the road 15200 in the current lane 15210 in accordance with the vehicle control information, which may include using a velocity control unit of the vehicle 15100 as an output device, or a portion thereof, for outputting the semiotic representation, or a portion thereof, by controlling the velocity control unit of the vehicle 15100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by, controlling a velocity, the timing of performing a velocity vehicle control action, or a combination thereof.

Controlling the velocity control unit of the vehicle 15100 to output the semiotic representation of the vehicle control information, or a portion thereof, in accordance with the vehicle control information may include controlling the speed of the vehicle 15100, such as by maintaining a current speed of the vehicle 15100 and a current orientation of the vehicle 15100 with respect to the current lane 15210 in accordance with the 'Maintain' vehicle control action as modified by related vehicle control modification information, such as 65 miles-per-hour and substantially in the center of the current lane 15210, which may output at least a portion of the semiotic representation of at least a portion of the vehicle control information indicating that the vehicle 15100 is traversing the road 15200 in the current lane 15210.

A current intention indicator 15700 is shown as a blank box to indicate that traversing the portion of the vehicle transportation network shown in FIG. 15 may omit outputting a portion of the semiotic representation of controlling the vehicle 15100 to perform the 'Maintain' vehicle control action using an external luminous presentation unit of the vehicle 15100.

A current rationale indicator 15800 is shown as a blank box to indicate that traversing the portion of the vehicle transportation network shown in FIG. 15 may omit outputting a semiotic representation of the current primary vehicle control basis.

In FIG. 16, the lane change scenario 16000 is similar to the lane change scenario 15000 shown in FIG. 15 except as described herein. For example, in the lane change scenario 16000 shown in FIG. 16, the vehicle 15100 is oriented in the first lane 15210 relatively proximate to the second lane 15220.

Structured multivariate contextual vehicle operation with integrated semiotic control for traversing the lane change scenario 16000 at the second temporal location may include identifying operational environment information, which may be similar to the operational environment information identification described in relation to the lane change scenario 15000 shown in FIG. 15, except as described herein.

For example, for traversing the current portion of the vehicle transportation network shown in FIG. 16 at the second temporal location, identifying the operational environment information may include identifying that the second lane 15220 is available for a lane change.

Structured multivariate contextual vehicle operation with integrated semiotic control for traversing the lane change scenario 16000 at the second temporal location may include identifying a vehicle control action, which may be similar to the vehicle control action identification described in relation to the lane change scenario 15000 shown in FIG. 15, except as described herein.

For example, for traversing the current portion of the vehicle transportation network shown in FIG. 16 at the second temporal location, a 'Lane Change' vehicle control action may be identified, corresponding to controlling the vehicle to traverse the vehicle transportation network by changing lanes from the current lane 15210 to the adjacent lane 15220, which may include controlling the vehicle to control a velocity of the vehicle, such as by adjusting a trajectory of the vehicle 15100 to transition from the current lane 15210 to the adjacent lane 15220 as indicated by the broken directional line at 16100.

Structured multivariate contextual vehicle operation with integrated semiotic control for traversing the lane change scenario 16000 at the second temporal location may include identifying vehicle control modification information, which may be similar to the vehicle control modification information identification described in relation to the lane change scenario 15000 shown in FIG. 15, except as described herein.

For example, traversing the current portion of the vehicle transportation network shown in FIG. 16 at the second temporal location may include identifying vehicle control modification information for a 'Lane Change Signaling Time' vehicle control parameter corresponding to the identified 'Lane Change' vehicle control action, which may indicate a temporal period for outputting a semiotic representation of an operational state of the vehicle concurrent with controlling the vehicle to traverse the current portion of the vehicle transportation network in accordance with the identified 'Lane Change' vehicle control action.

In an example, identifying the vehicle control modification information may include identifying defined vehicle control information indicating a defined 'Lane Change Signaling Time' vehicle control parameter of 2.25 corresponding to the identified 'Lane Change' vehicle control action, identifying vehicle control modification information corresponding to the bright or daytime illumination state indicating a 'Lane Change Signaling Time' vehicle control modifier of +0.0 corresponding to the identified 'Lane Change' vehicle control action, identifying vehicle control modification information corresponding to the dry or clear weather or precipitation state indicating a 'Lane Change Signaling Time' vehicle control modifier of +0.0 corresponding to the identified 'Lane Change' vehicle control action, identifying vehicle control modification information corresponding to the highway area indicating a 'Lane Change Signaling Time' vehicle control modifier of +0.5 corresponding to the identified 'Lane Change' vehicle control action, identifying vehicle control modification information corresponding to the inclusion of external objects indicating a 'Lane Change Signaling Time' vehicle control modifier of +0.2 corresponding to the identified 'Lane Change' vehicle control action, identifying vehicle control modification information corresponding to the omission of external activities indicating a 'Lane Change Signaling Time' vehicle control modifier of +0.0 corresponding to the identified 'Lane Change' vehicle control action, and identifying vehicle control modification information corresponding to the user configuration information indicating low vehicle control optimization priority indicating a 'Lane Change Signaling Time' vehicle control modifier of +0.05 corresponding to the identified 'Lane Change' vehicle control action.

Structured multivariate contextual vehicle operation with integrated semiotic control for traversing the lane change scenario 16000 at the second temporal location may include identifying vehicle control information, which may be similar to the vehicle control information identification described in relation to the lane change scenario 15000 shown in FIG. 15, except as described herein.

For example, for traversing the current portion of the vehicle transportation network shown in FIG. 16 at the second temporal location, identifying the vehicle control information may include identifying a value of the 'Lane Change Signaling Time' vehicle control parameter corresponding to the identified 'Lane Change' vehicle control action, such as based on a combination, such as a sum, of the defined 'Lane Change Signaling Time' vehicle control parameter value of 2.25 corresponding to the identified 'Lane Change' vehicle control action, the bright or daytime illumination state 'Lane Change Signaling Time' vehicle control modifier of +0.0 corresponding to the identified 'Lane Change' vehicle control action, the dry or clear weather or precipitation state 'Lane Change Signaling Time' vehicle control modifier of +0.0 corresponding to the identified 'Lane Change' vehicle control action, the highway area 'Lane Change Signaling Time' vehicle control modifier of +0.5 corresponding to the identified 'Lane Change' vehicle control action, the inclusion of external objects 'Lane Change Signaling Time' vehicle control modifier of +0.2 corresponding to the identified 'Lane Change' vehicle control action, the omission of external activities 'Lane Change Signaling Time' vehicle control modifier of +0.0 corresponding to the identified 'Lane Change' vehicle control action, and the low vehicle control optimization priority 'Lane Change Signaling Time' vehicle control modifier of +0.05 corresponding to the identified 'Lane Change' vehicle control action, which may be 3.0 seconds.

Structured multivariate contextual vehicle operation with integrated semiotic control for traversing the lane change scenario 16000 at the second temporal location may include controlling the vehicle to traverse the vehicle transportation network, or a portion thereof, which may be similar to the traversing described in relation to the lane change scenario 15000 shown in FIG. 15, except as described herein, and which may include controlling the vehicle 15100 to traverse the road 15200 by changing from the current lane 15210 to the adjacent lane 15220 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

Controlling the vehicle 15100 to traverse the road 15200 by changing from the current lane 15210 to the adjacent lane 15220 in accordance with the vehicle control information by controlling the vehicle 15100 to output the semiotic representation of the vehicle control information may include controlling an output device, a portion thereof, or a combination of output devices, or portions thereof, of the vehicle to output the semiotic representation of the vehicle control information, or a portion thereof.

For example, the vehicle control information may include information for controlling the velocity of the vehicle 15100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 15100 to traverse the road 15200 by changing from the current lane 15210 to the adjacent lane 15220 in accordance with the vehicle control information, which may include using a velocity control unit of the vehicle 15100 as an output device, or a portion thereof, for outputting the semiotic representation, or a portion thereof, by controlling the velocity control unit of the vehicle 15100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by, controlling a deceleration rate, a velocity, a trajectory, the timing of performing a velocity vehicle control action, or a combination thereof.

Controlling the velocity control unit of the vehicle 15100 to output the semiotic representation of the vehicle control information, or a portion thereof, in accordance with the vehicle control information may include controlling the relative orientation of the vehicle 15100 to the current lane 15210 and the adjacent lane 15220, such as by adjusting a trajectory of the vehicle 15100 to orient the vehicle 15100 relatively near the edge of the current lane 15210 adjacent to the adjacent lane 15220 in accordance with the 'Lane Change' vehicle control action as modified by related vehicle control modification information, such as for a temporal period, such as 3.0 seconds, in accordance with the 'Lane Change Signaling Time' vehicle control parameter corresponding to the identified 'Lane Change' vehicle control action prior to, or concurrent with, controlling the vehicle to transition from the current lane 15210 to the adjacent lane 15220 in accordance with the 'Lane Change' vehicle control action, which may output at least a portion of the semiotic representation of at least a portion of the vehicle control information indicating that the vehicle is changing from the current lane 15210 to the adjacent lane 15220.

The vehicle 15100 may include an external luminous presentation unit, the vehicle control information may include information for outputting the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, using the external luminous presentation unit, and controlling the vehicle 15100 to traverse the road 15200 by changing from the current lane 15210 to the adjacent lane 15220 in accordance with the vehicle control information may include using the external luminous presentation unit of the vehicle 15100 as the output device, or a portion thereof, by controlling the external luminous presentation unit of the vehicle 15100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by illuminating, such as by periodically flashing, a turn signal, for a temporal period, such as 3.0 seconds, in accordance with the 'Lane Change Signaling Time' vehicle control parameter corresponding to the identified 'Lane Change' vehicle control action prior to, or concurrent with, controlling the vehicle to transition from the current lane 15210 to the adjacent lane 15220 in accordance with the 'Lane Change' vehicle control action.

The current intention indicator 15700 is shown as including a sequence of three directional arrows to indicate that traversing the portion of the vehicle transportation network shown in FIG. 16 may include outputting the semiotic representation, or a portion thereof, of controlling the vehicle to perform the 'Lane Change' vehicle control action using an external luminous presentation unit. The semiotic representation of controlling the vehicle to perform the 'Lane Change' vehicle control action, or a portion thereof, may be output using the external luminous presentation unit for a temporal period, such as 3.0 seconds, in accordance with the 'Lane Change Signaling Time' vehicle control parameter corresponding to the identified 'Lane Change' vehicle control action prior to, or concurrent with, controlling the vehicle to transition from the current lane 15210 to the adjacent lane 15220 in accordance with the 'Lane Change' vehicle control action.

The current rationale indicator 15800 is shown as a blank box to indicate that traversing the portion of the vehicle transportation network shown in FIG. 16 may omit outputting a semiotic representation of the current primary vehicle control basis.

Although not shown in FIG. 15 and FIG. 16, subsequent to controlling the vehicle 15100 to traverse a portion of the vehicle transportation network by controlling the vehicle 15100 to output the semiotic representation of the vehicle control information indicating the identified 'Lane Change' vehicle control action by controlling the velocity control unit of the vehicle 15100 to output a portion of the semiotic representation of the vehicle control information by adjusting a trajectory of the vehicle 15100 to orient the vehicle 15100 relatively near the edge of the current lane 15210 adjacent to the adjacent lane 15220 in accordance with the 'Lane Change' vehicle control action as modified by related vehicle control modification information and controlling the external luminous presentation unit of the vehicle 15100 to output a portion of the semiotic representation of the vehicle control information in accordance with the vehicle control information as modified by related vehicle control modification information for a temporal period, such as 3.0 seconds, in accordance with the 'Lane Change Signaling Time' vehicle control parameter corresponding to the identified 'Lane Change' vehicle control action, the vehicle 15100 may control the velocity control unit of the vehicle 15100 to transition from the current lane 15210 adjacent to the adjacent lane 15220 in accordance with the 'Lane Change' vehicle control action.

The portion of the semiotic representation of controlling the vehicle 15100 to perform the 'Lane Change' vehicle control action output using the external luminous presentation unit may be output using the external luminous presentation unit for a temporal period subsequent to the temporal period in accordance with the 'Lane Change Signaling Time' vehicle control parameter corresponding to the identified 'Lane Change' vehicle control action, which may overlap with controlling the vehicle 15100 to perform the 'Lane Change' vehicle control action. Subsequent to controlling the vehicle 15100 to perform the 'Lane Change' vehicle control action the vehicle 15100 may cease outputting the semiotic representation of the vehicle control information.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An autonomous vehicle configured to traverse a portion of a vehicle transportation network, the autonomous vehicle comprising:
    a processor configured to execute instructions stored on a non-transitory computer readable medium to:
        identify operational environment information representing a current operational environment for the autonomous vehicle, such that the operational environment information includes:
            empirical information representing an empirical aspect of the current operational environment;
            vehicle transportation network information representing a defined aspect of the vehicle transportation network in the current operational environment;
            external object information representing an external object in the current operational environment;
            external activity information representing an external activity for the current operational environment; and
            user defined configuration information;
        identify a vehicle control action for controlling the autonomous vehicle to traverse a portion of a vehicle transportation network, wherein the current operational environment for the autonomous vehicle includes the portion of the vehicle transportation network, and wherein identifying the vehicle control action includes identifying a primary vehicle control basis corresponding to the vehicle control action;
        identify vehicle control modification information in response to the operational environment information;
        identify vehicle control information in response to the vehicle control modification information and the vehicle control action; and
        control the autonomous vehicle to traverse a portion of a vehicle transportation network in accordance with the vehicle control information by controlling the autonomous vehicle to traverse the portion of the vehicle transportation network in accordance with the vehicle control information such that controlling the autonomous vehicle to traverse the portion of the vehicle transportation network in accordance with the vehicle control information includes controlling the autonomous vehicle to output a semiotic representation of the vehicle control information such that the semiotic representation of the vehicle control information includes:
            a semiotic representation of an operational state of the autonomous vehicle concurrent with traversing the portion of the vehicle transportation network in accordance with the vehicle control information; and
a semiotic representation of the primary vehicle control basis.

2. The autonomous vehicle of claim 1, wherein the processor is configured to execute the instructions to control the autonomous vehicle to output the semiotic representation of the vehicle control information by controlling an output device of the autonomous vehicle to output at least a portion of the semiotic representation of the vehicle control information, wherein the output device includes at least one of an external luminous presentation unit of the autonomous vehicle, an external aural presentation unit of the autonomous vehicle, a directional state control unit of the autonomous vehicle, or a kinetic state control unit of the autonomous vehicle.

3. The autonomous vehicle of claim 1, wherein the processor is configured to execute the instructions to control the autonomous vehicle to output the semiotic representation of the vehicle control information by controlling an electronic communication network control unit of the autonomous vehicle to output information indicating at least a portion of the semiotic representation of the vehicle control information.

4. The autonomous vehicle of claim 1, wherein the processor is configured to execute the instructions to:
in response to a determination that sensor information from a sensor of the autonomous vehicle indicating the natural or artificial aspect is available, identify the empirical information based on the sensor information;
in response to a determination that the sensor information is unavailable, identify expected empirical information as the empirical information;
in response to a determination that the vehicle transportation network information is unavailable, identify expected vehicle transportation network information as the vehicle transportation network information;
in response to a determination that information corresponding to the external object is available, identify the external object information based on the information corresponding to the external object;
in response to a determination that the information corresponding to the external object is unavailable, identify expected external object information as the external object information;
in response to a determination that information indicating the external activity is available, identify the external activity information based on the information indicating the external activity;
in response to a determination that the information indicating the external activity is unavailable, identify expected external activity information as the external activity information; and
in response to a determination that configuration information indicating the user-defined configuration information is unavailable, identify an expected configuration as the user-defined configuration information.

5. The autonomous vehicle of claim 1, wherein the processor is configured to execute the instructions to identify the vehicle control modification information by:
identifying a vehicle control modification table corresponding to the empirical information, the vehicle transportation network information, the external object information, the external activity information, and the user-defined configuration information; and
identifying the vehicle control modification information from the vehicle control modification table.

6. The autonomous vehicle of claim 1, wherein the processor is configured to execute the instructions to identify the vehicle control modification information in response to the operational environment information, such that the vehicle control modification information includes a plurality of vehicle control modifiers, and such that the plurality of vehicle control modifiers includes:
at least one vehicle control modifier corresponding to the empirical information;
at least one vehicle control modifier corresponding to the vehicle transportation network information;
at least one vehicle control modifier corresponding to the external object information;
at least one vehicle control modifier corresponding to the external activity information; and
at least one vehicle control modifier corresponding to the user-defined configuration information.

7. The autonomous vehicle of claim 6, wherein the processor is configured to execute the instructions to:
identify defined vehicle control information such that the defined vehicle control information is independent of the current operational environment; and
identify the vehicle control information such that the vehicle control information includes a combination of the defined vehicle control information and the vehicle control modification information.

8. The autonomous vehicle of claim 7, wherein the processor is configured to execute the instructions to modify the defined vehicle control information based on each vehicle control modifier from the plurality of vehicle control modifiers to identify the combination of the defined vehicle control information and the vehicle control modification information.

9. The autonomous vehicle of claim 8, wherein the processor is configured to execute the instructions to modify the defined vehicle control information based on each vehicle control modifier from the plurality of vehicle control modifiers such that, on a condition that a vehicle control modifier from the plurality of vehicle control modifiers indicates a constraint, an aspect of the semiotic representation of the vehicle control information corresponding to the vehicle control modifier is constrained by the constraint.

10. A vehicle configured to traverse a portion of a vehicle transportation network, the vehicle comprising:
a processor configured to execute instructions stored on a non-transitory computer readable medium to:
identify operational environment information representing a current operational environment for the vehicle, such that the operational environment information includes information representing an identified aspect of the current operational environment;
identify a vehicle control action for controlling the vehicle to traverse a portion of a vehicle transportation network, wherein the current operational environment for the vehicle includes the portion of the vehicle transportation network;
identify vehicle control modification information in response to the information representing the identified aspect of the current operational environment;
identify vehicle control information in response to the vehicle control modification information and the vehicle control action; and
control the vehicle to traverse a portion of a vehicle transportation network in accordance with the vehicle control information by controlling the vehicle to traverse the portion of the vehicle transportation network in accordance with the vehicle control information such that controlling the vehicle to traverse the portion of the vehicle transportation network in accordance with the vehicle control information includes controlling the vehicle to output a semiotic representation of the vehicle control information.

11. The vehicle of claim 10, wherein the processor is configured to execute the instructions to output the semiotic representation of the vehicle control information such that the semiotic representation of the vehicle control information includes a semiotic representation of an operational state of the vehicle concurrent with controlling the vehicle to traverse the portion of the vehicle transportation network in accordance with the vehicle control information.

12. The vehicle of claim 10, wherein the processor is configured to execute the instructions to:
  identify the vehicle control action such that identifying the vehicle control action includes identifying a primary vehicle control basis corresponding to the vehicle control action; and
  output the semiotic representation of the vehicle control information such that the semiotic representation of the vehicle control information includes a semiotic representation of the primary vehicle control basis.

13. The vehicle of claim 10, wherein the processor is configured to execute the instructions to control an output device of the vehicle to output at least a portion of the semiotic representation of the vehicle control information, wherein the output device includes at least one of an external luminous presentation unit of the vehicle, an external aural presentation unit of the vehicle, a directional state control unit of the vehicle, or a kinetic state control unit of the vehicle.

14. The vehicle of claim 10, wherein the processor is configured to execute the instructions to identify the operational environment information representing the current operational environment such that the identified aspect of the current operational environment corresponds to:
  an empirical aspect of the current operational environment;
  a defined aspect of the vehicle transportation network in the current operational environment;
  an external object in the current operational environment;
  an external activity for the current operational environment; or
  a user defined configuration.

15. The vehicle of claim 10, wherein the processor is configured to execute the instructions to identify the vehicle control modification information by:
  identifying a vehicle control modification table corresponding to the information representing the identified aspect of the current operational environment; and
  identifying the vehicle control modification information from the vehicle control modification table.

16. The vehicle of claim 10, wherein the processor is configured to execute the instructions to:
  identify defined vehicle control information such that the defined vehicle control information is independent of the current operational environment; and
  identify the vehicle control information such that the vehicle control information includes a combination of the defined vehicle control information and the vehicle control modification information.

17. The vehicle of claim 16, wherein the processor is configured to execute the instructions to:
  identify the operational environment information such that the operational environment information includes respective information representing each respective aspect from a plurality of aspects of the current operational environment that includes the identified aspect of the current operational environment;
  identify the vehicle control modification information such that the vehicle control modification information includes a plurality of vehicle control modifiers, wherein each vehicle control modifier from the plurality of vehicle control modifiers corresponds with respective information representing each respective aspect from the plurality of aspects of the current operational environment; and
  modify the defined vehicle control information based on each vehicle control modifier from the plurality of vehicle control modifiers to identify the combination of the defined vehicle control information and the vehicle control modification information.

18. The vehicle of claim 17, wherein the processor is configured to execute the instructions to modify the defined vehicle control information based on each vehicle control modifier from the plurality of vehicle control modifiers such that, on a condition that a vehicle control modifier from the plurality of vehicle control modifiers indicates a constraint, an aspect of the semiotic representation of the vehicle control information corresponding to the vehicle control modifier is constrained by the constraint.

19. The vehicle of claim 10, wherein the vehicle is an autonomous vehicle.

20. An autonomous vehicle configured to traverse a portion of a vehicle transportation network, the autonomous vehicle comprising:
  a processor configured to execute instructions stored on a non-transitory computer readable medium to:
    identify operational environment information representing a current operational environment for the autonomous vehicle, such that the operational environment information includes information representing an identified aspect of the current operational environment;
    identify a vehicle control action for controlling the autonomous vehicle to traverse a portion of a vehicle transportation network, wherein the current operational environment for the autonomous vehicle includes the portion of the vehicle transportation network, and wherein identifying the vehicle control action includes identifying a primary vehicle control basis corresponding to the vehicle control action;
    identify vehicle control modification information in response to the operational environment information by:
      identifying defined vehicle control information such that the defined vehicle control information is independent of the current operational environment; and
      identifying the vehicle control information such that the vehicle control information includes a combination of the defined vehicle control information and the vehicle control modification information;
    identify vehicle control information in response to the vehicle control modification information and the vehicle control action; and
    control the autonomous vehicle to traverse a portion of a vehicle transportation network in accordance with the vehicle control information by controlling the autonomous vehicle to traverse the portion of the vehicle transportation network in accordance with the vehicle control information such that controlling the autonomous vehicle to traverse the portion of the vehicle transportation network in accordance with the vehicle control information includes controlling the autonomous vehicle to output a semiotic representation of the vehicle control information such that the semiotic representation of the vehicle control information includes:
a semiotic representation of an operational state of the autonomous vehicle concurrent with traversing the portion of the vehicle transportation network in accordance with the vehicle control information; and
a semiotic representation of the primary vehicle control basis.

\* \* \* \* \*